United States Patent
Lehman et al.

(10) Patent No.: US 12,385,201 B2
(45) Date of Patent: Aug. 12, 2025

(54) POWER UNIT WITH SALT SPREADER AND SALT SPREADER FOR USE THEREWITH

(71) Applicant: VENTURE PRODUCTS, INC., Orville, OH (US)

(72) Inventors: Roscoe J. Lehman, Dalton, OH (US); Christopher A. Nolt, Dundee, OH (US); Chad R. Badger, Fredericksburg, OH (US)

(73) Assignee: Venture Products, Inc., Orrville, OH (US)

( * ) Notice: Subject to any disclaimer, the term of this patent is extended or adjusted under 35 U.S.C. 154(b) by 670 days.

(21) Appl. No.: 17/537,817

(22) Filed: Nov. 30, 2021

(65) Prior Publication Data

US 2022/0090338 A1   Mar. 24, 2022

Related U.S. Application Data

(62) Division of application No. 16/150,784, filed on Oct. 3, 2018, now Pat. No. 11,214,936.
(Continued)

(51) Int. Cl.
  *A01B 59/06*   (2006.01)
  *A01B 61/02*   (2006.01)
  (Continued)

(52) U.S. Cl.
  CPC ............ *E01H 5/045* (2013.01); *A01B 59/062* (2013.01); *A01B 61/02* (2013.01); *B60K 17/28* (2013.01);
  (Continued)

(58) Field of Classification Search
  CPC ....... A01B 59/062; A01B 61/02; E01H 5/045; E01H 5/092
  See application file for complete search history.

(56) References Cited

U.S. PATENT DOCUMENTS

| 2,088,564 A | 8/1937 | Anthony et al. |
| 2,854,766 A | 10/1958 | Miller |

(Continued)

FOREIGN PATENT DOCUMENTS

| CH | 702870 A2 | 9/2011 |
| CH | 702870 B1 | 11/2014 |
| EP | 2639358 A1 | 9/2013 |
| EP | 2639358 B1 | 6/2018 |

OTHER PUBLICATIONS

Ventrac, Parts Manual 4500Z, Weight Transfer, p. 126.
Venture Products, Inc., Power Broom, Owner/Operator's Manual & Parts List, HB580, Aug. 7, 2008.

*Primary Examiner* — Jamie L McGowan
(74) *Attorney, Agent, or Firm* — Sand, Sebolt & Wernow Co., LPA

(57) ABSTRACT

Skid-steer type power unit engageable with an implement using an attachment assembly including an attachment frame and a hitch. An arcuate frame member is located forwardly of the attachment frame and is engaged therewith in such a way that the frame member pivots about a vertical axis located forwardly of the frame member and generally centrally positioned relative to the attachment frame. The frame member pivots in response to actuation of a hydraulic cylinder. The power unit includes a system for transferring weight of the implement rearwardly onto the power unit. A belt-drive power-take off system on the power unit powers the implement's operation. An underbelly drop spreader is located between the front and rear wheels of the power unit and a brine delivery system distributes brine from nozzles located rearwardly of the rear wheels. A unique control panel permits operation of all systems on the power unit and implement.

20 Claims, 28 Drawing Sheets

Related U.S. Application Data

(60) Provisional application No. 62/696,161, filed on Jul. 10, 2018.

(51) Int. Cl.
  *B60K 17/28* (2006.01)
  *B60K 25/02* (2006.01)
  *E01C 19/20* (2006.01)
  *E01H 3/02* (2006.01)
  *E01H 5/04* (2006.01)
  *E01H 5/09* (2006.01)
  *E01H 10/00* (2006.01)
  *E02F 3/36* (2006.01)

(52) U.S. Cl.
  CPC ............ *B60K 25/02* (2013.01); *E01C 19/20* (2013.01); *E01H 3/02* (2013.01); *E01H 5/092* (2013.01); *E01H 10/007* (2013.01); *E02F 3/3663* (2013.01); *E02F 3/3672* (2013.01); *B60K 2025/022* (2013.01); *E01H 5/098* (2013.01)

(56) References Cited

U.S. PATENT DOCUMENTS

| | | | |
|---|---|---|---|
| 2,981,341 A | 4/1961 | Dilworth | |
| 2,996,934 A | 8/1961 | White | |
| 3,065,556 A | 11/1962 | Kampert | |
| 3,118,571 A | 1/1964 | Ward | |
| 3,250,026 A | 5/1966 | Jocher et al. | |
| 3,259,123 A | 7/1966 | Sangivanni | |
| 3,311,186 A | 3/1967 | Igor | |
| 3,319,731 A | 5/1967 | Kenkel | |
| 3,327,796 A | 6/1967 | Hanmer | |
| 3,404,470 A | 10/1968 | Raiti | |
| 3,463,510 A | 8/1969 | Van Syoc | |
| 3,465,607 A | 9/1969 | Erdman | |
| 3,483,938 A | 12/1969 | Enters | |
| 3,559,893 A | 2/1971 | Gruben | |
| 3,583,494 A * | 6/1971 | Thompson | A01B 3/26 172/285 |
| 3,613,462 A | 10/1971 | Stibbe | |
| 3,688,847 A * | 9/1972 | Deeter | E02F 3/7627 37/231 |
| 3,825,072 A | 7/1974 | Collins | |
| 3,841,425 A | 10/1974 | Harkness | |
| 3,884,320 A | 5/1975 | Auguste Leveau | |
| 3,888,544 A | 6/1975 | Bennett | |
| 3,919,893 A | 11/1975 | Boehm et al. | |
| 3,951,223 A | 4/1976 | Kamlukin | |
| 3,964,622 A | 6/1976 | Blair et al. | |
| 4,019,753 A | 4/1977 | Kestel | |
| 4,029,237 A | 6/1977 | Miconi | |
| RE29,356 E | 8/1977 | Bennett | |
| 4,062,496 A | 12/1977 | Melton | |
| 4,074,448 A | 2/1978 | Niemela | |
| RE29,957 E | 4/1979 | Kasper | |
| 4,226,034 A | 10/1980 | Benjamin et al. | |
| 4,241,614 A | 12/1980 | Gould | |
| 4,324,055 A | 4/1982 | Hippensteel et al. | |
| 4,325,210 A | 4/1982 | Marto | |
| 4,438,873 A | 3/1984 | Kaercher, Jr. | |
| 4,491,275 A | 1/1985 | Holsworth | |
| 4,552,226 A | 11/1985 | Platter | |
| 4,597,468 A | 7/1986 | Friedrich | |
| 4,618,016 A | 10/1986 | van der Lely | |
| 4,684,062 A | 8/1987 | Bagwell | |
| 4,685,228 A | 8/1987 | Gisler et al. | |
| 4,717,166 A | 1/1988 | Vachon | |
| 4,763,744 A | 8/1988 | McVicar et al. | |
| 4,773,598 A | 9/1988 | Jones | |
| 4,773,666 A | 9/1988 | Koberlein et al. | |
| 4,778,195 A | 10/1988 | Vachon | |
| 4,797,025 A | 1/1989 | Kennedy | |
| 4,813,215 A | 3/1989 | Chase et al. | |
| 4,825,970 A | 5/1989 | McVicar | |
| 5,012,632 A | 5/1991 | Kuhn | |
| 5,028,017 A | 7/1991 | Simmons et al. | |
| 5,040,615 A | 8/1991 | Fletcher | |
| 5,082,065 A | 1/1992 | Fletcher | |
| 5,088,215 A | 2/1992 | Ciula | |
| 5,141,385 A | 8/1992 | Tibbatts et al. | |
| 5,267,696 A | 12/1993 | Balmer | |
| 5,310,119 A | 5/1994 | Musso, Jr. et al. | |
| 5,333,795 A | 8/1994 | Jessen | |
| 5,361,566 A | 11/1994 | Hohnl | |
| 5,363,924 A | 11/1994 | Foley | |
| 5,403,144 A | 4/1995 | Staben, Jr. | |
| 5,447,204 A | 9/1995 | Asal et al. | |
| 5,452,979 A | 9/1995 | Cosenza | |
| 5,483,787 A | 1/1996 | Berrios | |
| 5,515,623 A | 5/1996 | Weeks | |
| 5,533,676 A | 7/1996 | Conley | |
| 5,638,618 A | 6/1997 | Niemela et al. | |
| 5,706,591 A | 1/1998 | Wissmiller | |
| 5,762,359 A | 6/1998 | Webber et al. | |
| 5,779,429 A | 7/1998 | Poole | |
| 5,802,994 A | 9/1998 | Kinkead | |
| 5,810,096 A | 9/1998 | Defrancq | |
| 5,832,703 A | 11/1998 | Evans | |
| 5,950,336 A * | 9/1999 | Liebl | E01H 5/06 37/231 |
| 5,984,819 A | 11/1999 | McComber | |
| 6,050,008 A | 4/2000 | Doornek et al. | |
| 6,056,247 A | 5/2000 | Hoglund | |
| 6,105,679 A | 8/2000 | Schubert et al. | |
| 6,122,797 A | 9/2000 | Vanderlinden | |
| 6,125,954 A | 10/2000 | Oota | |
| 6,144,295 A | 11/2000 | Adams | |
| 6,173,590 B1 | 1/2001 | Witchey | |
| 6,173,904 B1 | 1/2001 | Doherty et al. | |
| 6,176,071 B1 | 1/2001 | Thorman et al. | |
| 6,178,668 B1 * | 1/2001 | Gustafson | B62D 49/065 37/231 |
| 6,203,112 B1 | 3/2001 | Cook et al. | |
| 6,220,532 B1 | 4/2001 | Manon et al. | |
| 6,282,873 B1 | 9/2001 | Wilken | |
| 6,334,292 B1 | 1/2002 | Walch et al. | |
| 6,336,600 B1 | 1/2002 | Jessen | |
| 6,339,917 B1 | 1/2002 | Dillon | |
| 6,382,523 B1 | 5/2002 | Hedegard | |
| 6,394,735 B2 | 5/2002 | Hollinrake | |
| 6,446,879 B1 | 9/2002 | Kime | |
| 6,524,205 B1 | 2/2003 | Irikura | |
| 6,547,685 B2 | 4/2003 | Kawada | |
| 6,564,481 B2 | 5/2003 | Wakitani | |
| 6,606,844 B2 | 8/2003 | Dillon | |
| 6,651,413 B2 | 11/2003 | Papke | |
| 6,659,376 B2 | 12/2003 | Savard | |
| 6,702,208 B1 | 3/2004 | Hadler et al. | |
| 6,708,773 B1 | 3/2004 | Kinkead | |
| 6,742,290 B2 | 6/2004 | Hanafusa | |
| 6,786,435 B2 | 9/2004 | Mishra | |
| 6,830,111 B2 | 12/2004 | Page | |
| 6,860,039 B2 | 3/2005 | Schultz et al. | |
| 6,932,730 B2 | 8/2005 | Borling | |
| 6,941,685 B2 | 9/2005 | Goy et al. | |
| 6,988,560 B2 | 1/2006 | Bay | |
| 7,028,423 B1 | 4/2006 | Curry | |
| 7,043,890 B2 | 5/2006 | Lofton | |
| 7,086,821 B1 | 8/2006 | Reicks | |
| 7,089,692 B2 | 8/2006 | Strait | |
| 7,137,214 B2 | 11/2006 | Hoerle et al. | |
| 7,201,453 B2 | 4/2007 | Vandewinckel et al. | |
| 7,219,453 B2 | 5/2007 | Baker | |
| 7,275,700 B2 | 10/2007 | Miles, Jr. | |
| 7,302,765 B1 * | 12/2007 | Jorgenson | E02F 3/627 37/231 |
| 7,370,818 B2 | 5/2008 | Ward | |
| 7,419,011 B2 | 9/2008 | Curtis et al. | |
| 7,427,247 B2 | 9/2008 | Melone | |
| 7,520,348 B2 | 4/2009 | Bergsten | |
| 7,610,985 B2 | 11/2009 | Ohashi | |

(56) References Cited

U.S. PATENT DOCUMENTS

| | | |
|---|---|---|
| 7,665,284 B1 | 2/2010 | Funk |
| 7,678,000 B2 | 3/2010 | Harnetiaux |
| 7,699,577 B2 | 4/2010 | Lougheed et al. |
| 7,717,353 B2 | 5/2010 | Matulis |
| 7,788,829 B2 | 9/2010 | Stephan |
| 7,818,903 B2 * | 10/2010 | Elliot .................. A01B 59/064 37/468 |
| 7,839,301 B2 | 11/2010 | Doherty et al. |
| 7,941,947 B2 | 5/2011 | Stephan |
| 7,954,573 B2 | 6/2011 | Jessen |
| 7,975,407 B2 | 7/2011 | Dilworth et al. |
| 7,980,569 B2 | 7/2011 | Azure |
| 7,997,016 B2 | 8/2011 | Yamazaki |
| 8,025,245 B2 | 9/2011 | Truan et al. |
| 8,050,827 B2 | 11/2011 | Hasegawa |
| 8,056,828 B1 | 11/2011 | Kline et al. |
| 8,056,862 B1 | 11/2011 | Tomerlin et al. |
| 8,146,844 B2 | 4/2012 | Kisenwether |
| 8,191,288 B2 | 6/2012 | Weagley et al. |
| D673,586 S | 1/2013 | Truan et al. |
| 8,393,049 B2 | 3/2013 | Vogel |
| 8,403,095 B1 | 3/2013 | Ecklein |
| 8,418,776 B2 | 4/2013 | Pirotais |
| 8,465,071 B2 | 6/2013 | Risi et al. |
| 8,465,073 B2 | 6/2013 | Roeder |
| 8,511,933 B2 | 8/2013 | Menzenbach et al. |
| 8,517,136 B2 | 8/2013 | Hurd et al. |
| 8,517,138 B2 | 8/2013 | Sashikuma et al. |
| 8,567,166 B2 | 10/2013 | Minoura et al. |
| 8,621,769 B2 | 1/2014 | Weagley et al. |
| 8,757,073 B2 | 1/2014 | Beaujot |
| 8,668,154 B2 | 3/2014 | O'Daniel |
| 8,695,238 B2 | 4/2014 | Warchola et al. |
| 8,739,436 B2 * | 6/2014 | Hill ...................... A01B 59/002 37/231 |
| 8,752,855 B2 * | 6/2014 | Dilworth ................ B62D 49/04 280/481 |
| 8,763,715 B2 | 7/2014 | Osgood |
| 8,919,813 B2 | 12/2014 | Wrensch |
| 9,010,665 B1 * | 4/2015 | Peterson .............. A01C 15/122 239/667 |
| 9,078,388 B2 | 7/2015 | Meurs |
| 9,078,391 B2 | 7/2015 | Pichlmaier |
| 9,080,297 B2 | 7/2015 | Hanson |
| 9,109,332 B1 | 8/2015 | Stone, Jr. |
| 9,155,245 B2 | 10/2015 | Jordon et al. |
| 9,233,382 B2 | 1/2016 | Ossian et al. |
| 9,271,441 B2 | 3/2016 | Truan et al. |
| 9,296,571 B2 | 3/2016 | Truan et al. |
| 9,322,140 B2 | 4/2016 | Vanderlinden |
| 9,359,734 B2 | 6/2016 | Favorito et al. |
| 9,567,716 B2 | 2/2017 | Rainwater et al. |
| 9,592,862 B2 | 3/2017 | Pugh |
| 9,598,829 B2 | 3/2017 | Betts |
| 9,603,303 B2 | 3/2017 | Hoppel |
| 9,611,605 B1 | 4/2017 | Pennock |
| 9,623,903 B2 | 4/2017 | Cook |
| D785,680 S | 5/2017 | Dipino |
| 9,687,890 B2 | 6/2017 | Tacke |
| 9,725,114 B1 | 8/2017 | Brown |
| 9,730,383 B2 | 8/2017 | Greulich et al. |
| 9,738,312 B2 | 8/2017 | Watling |
| 9,750,184 B2 | 9/2017 | Reichard |
| 9,826,680 B2 | 11/2017 | Dixon |
| 9,869,067 B2 | 1/2018 | Barker et al. |
| 9,976,267 B2 | 5/2018 | Steiner |
| 10,088,019 B2 | 10/2018 | Al-Hawaj |
| 10,132,390 B2 | 11/2018 | Gunton |
| 10,227,743 B2 | 3/2019 | Nakazawa et al. |
| 10,271,537 B2 | 4/2019 | Papke |
| 10,328,795 B2 | 6/2019 | Long |
| 10,472,783 B2 | 11/2019 | Rich |
| 10,744,831 B2 | 8/2020 | Rich |
| 10,753,322 B1 | 8/2020 | Noonan et al. |
| 10,760,594 B2 | 9/2020 | Reitemann |
| 10,801,172 B2 | 10/2020 | Moorman |
| 10,808,368 B2 | 10/2020 | Rainwater et al. |
| 10,849,262 B2 * | 12/2020 | Kinkead ............... A01B 63/008 |
| 11,015,312 B2 | 5/2021 | Becwar |
| 11,118,321 B2 | 9/2021 | Lehman et al. |
| 11,122,732 B2 | 9/2021 | Rich |
| 11,214,936 B2 | 1/2022 | Lehman et al. |
| 11,219,158 B2 | 1/2022 | Hoffman et al. |
| 11,255,068 B2 | 2/2022 | Azure et al. |
| 11,293,529 B2 | 4/2022 | Forbes et al. |
| 11,299,040 B2 | 4/2022 | Moore |
| 11,686,057 B2 | 6/2023 | Rich |
| 2002/0073581 A1 | 6/2002 | Takeuchi |
| 2002/0189435 A1 | 12/2002 | Domann |
| 2004/0018078 A1 | 1/2004 | Vicars, III et al. |
| 2004/0145134 A1 | 7/2004 | Bares |
| 2005/0189432 A1 | 9/2005 | Kime |
| 2005/0193597 A1 | 9/2005 | Sutton et al. |
| 2005/0204587 A1 * | 9/2005 | Kime ...................... E01H 5/06 37/266 |
| 2005/0246088 A1 | 11/2005 | Doherty et al. |
| 2006/0005433 A1 * | 1/2006 | Curtis ..................... E01H 5/063 37/231 |
| 2007/0056754 A1 | 3/2007 | Kollath et al. |
| 2007/0084946 A1 | 4/2007 | Neville |
| 2007/0132204 A1 | 6/2007 | Sewell |
| 2007/0169951 A1 | 7/2007 | Clement et al. |
| 2007/0272421 A1 * | 11/2007 | Elliott .................. A01B 59/064 172/445.1 |
| 2008/0210483 A1 * | 9/2008 | Takahashi ............... B60K 23/04 180/250 |
| 2008/0222925 A1 * | 9/2008 | Belzile .................. A01B 59/06 37/231 |
| 2008/0257632 A1 * | 10/2008 | Takeshima ............... B62P 21/00 180/312 |
| 2009/0038186 A1 * | 2/2009 | Osswald ............... B62D 49/085 37/468 |
| 2009/0078488 A1 | 3/2009 | Bock et al. |
| 2009/0081017 A1 | 3/2009 | Bock |
| 2009/0206589 A1 * | 8/2009 | Osswald ................ B62D 21/14 187/234 |
| 2009/0307938 A1 | 12/2009 | Koch et al. |
| 2009/0307941 A1 | 12/2009 | Gamble, II |
| 2009/0307942 A1 | 12/2009 | Gamble, II et al. |
| 2010/0064555 A1 | 3/2010 | Stephan |
| 2010/0131157 A1 | 5/2010 | Kahle et al. |
| 2010/0133365 A1 | 6/2010 | Bailey |
| 2011/0083412 A1 | 4/2011 | Jackson |
| 2014/0173946 A1 | 6/2014 | Gerrits |
| 2014/0174838 A1 | 6/2014 | Glomski et al. |
| 2014/0286739 A1 | 9/2014 | Helmsderfer et al. |
| 2015/0047232 A1 | 2/2015 | Kassander |
| 2015/0083447 A1 | 3/2015 | Lewis |
| 2015/0176250 A1 * | 6/2015 | Stutchbury ............ E02F 9/0833 180/242 |
| 2016/0016470 A1 | 1/2016 | Pichlmaier |
| 2016/0039480 A1 | 2/2016 | Pichlmaier |
| 2016/0316615 A1 | 11/2016 | Papke |
| 2017/0290258 A1 | 10/2017 | Mollick |
| 2018/0238016 A1 | 8/2018 | Seacat et al. |
| 2018/0346007 A1 | 12/2018 | Fielder |
| 2019/0316308 A1 | 10/2019 | Bergman |
| 2020/0113117 A1 | 4/2020 | Bhosale et al. |
| 2020/0282826 A1 | 9/2020 | Moore |
| 2020/0329624 A1 | 10/2020 | Thorsell |
| 2021/0127577 A1 | 5/2021 | Weihl |
| 2021/0301488 A1 | 9/2021 | Becwar |
| 2022/0090338 A1 | 3/2022 | Lehman |
| 2022/0104425 A1 | 4/2022 | Cook |
| 2022/0205201 A1 | 6/2022 | Jager |
| 2022/0389675 A1 | 12/2022 | Carducci |
| 2023/0203769 A1 | 6/2023 | Veihl |

\* cited by examiner

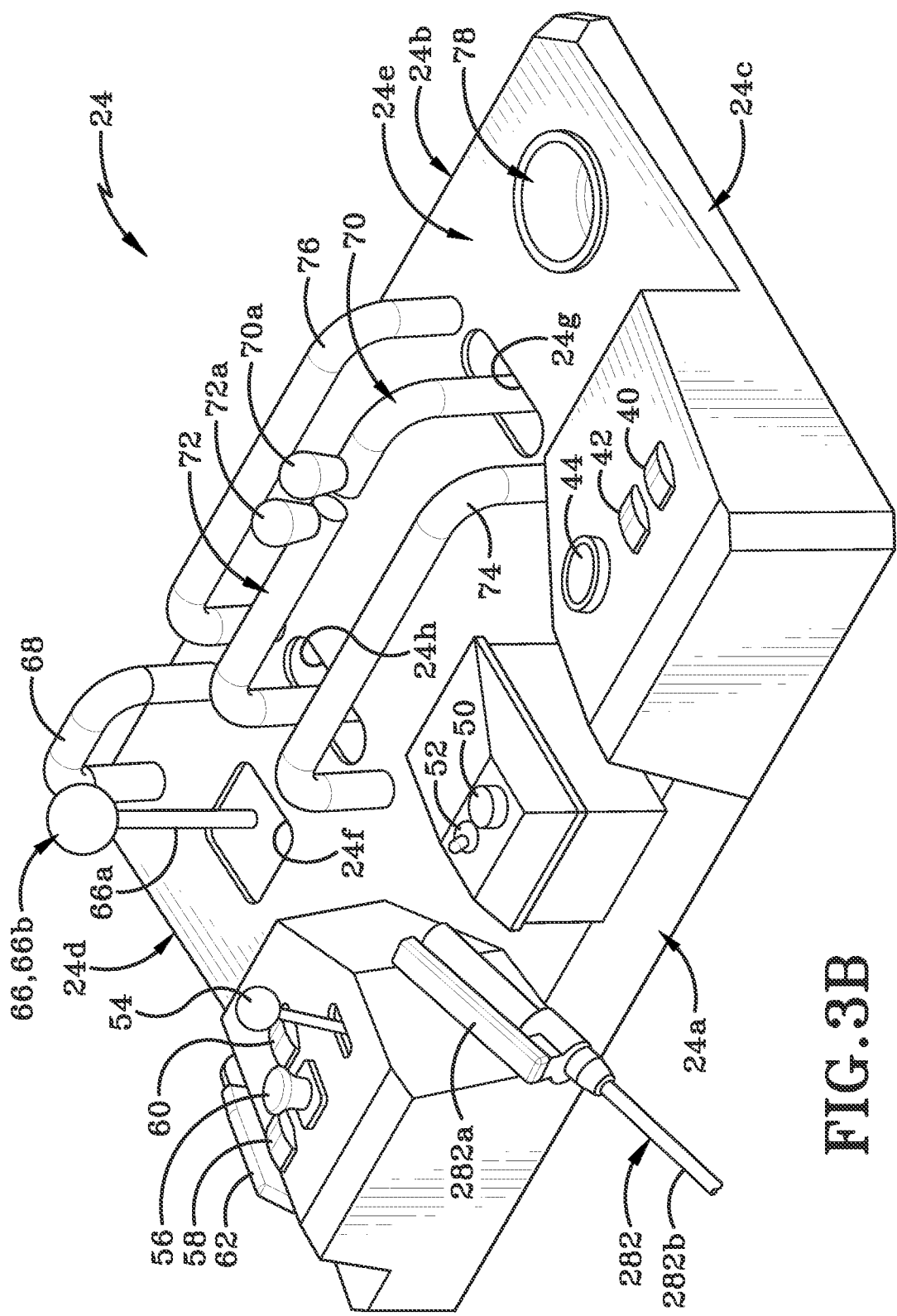

POWER UNIT WITH SALT SPREADER AND SALT SPREADER FOR USE THEREWITH

CROSS-REFERENCE TO RELATED APPLICATION

This application is a Divisional of U.S. patent application Ser. No. 16/150,784 filed Oct. 3, 2018, which application claims the benefit of U.S. Provisional Application Ser. No. 62/696,161, filed Jul. 10, 2018, the disclosures of which is incorporated herein by reference.

TECHNICAL FIELD

The present disclosure generally relates to vehicles. More particularly, the present disclosure is directed to a skid steer style vehicle having one or more implements mounted thereon. Specifically, the present disclosure relates to a vehicle with a belt-drive power transfer system, that includes a novel attachment assembly for at least one snow and/or ice removal implement, and that has a novel control system.

BACKGROUND INFORMATION

A large number of snow removal devices are currently on the market. These removal devices range from hand-held shovels, through to small household-sized snowblowers, and on to large snowplows and salting and sanding vehicles used to clear city streets and large areas such as airport runways.

There exists a need for intermediate-sized snow tools capable of handling largescale snow and ice removal in small areas but only a few suitable vehicles for this purpose have been proposed in the past. So-called "walking universities" and large business campuses have miles of sidewalks and paved walkways that need to be cleared of snow and ice quickly and efficiently. However many of the areas that need to be cleared offer very little space to maneuver vehicles that are of a size that would typically be used to remove large quantities of snow and ice. A skid steer is a machine that uses two pairs of tires that are operated independently. A difference in speed between the two pairs of tires is what allows the unit to turn left and right. The tires can sometimes be replaced with tracks. Skid steers are often large units that have a cab and an operator seat. However there are smaller stand-on and walk-behind units available. Control is provided by two levers that control the speeds of the two pairs of tires independently, with another lever or levers controlling the main functionality. Often the main function is a set of lifting arms with a bucket; however, there are skid steers that have snow blade and snow blower options available.

Stand-on skid steers have been created by a number of companies. Some of these stand-on skid steers are designed for snow removal, with an attached blade, a snow scoop, or a snow blower. There are additionally other known skid steer type vehicles that are utilized for winder services.

PRIOR ART snow removal machines that are currently on the market tend to only have one attachment or they do not have an efficient system for changing attachments. Switching between two attachments in less than sixty seconds, such as is possible with the power unit disclosed herein, enables operators more options when clearing snow. The operators are therefore more likely to choose to use an attachment appropriate to a particular situation. For example, plowing snow works well when there is a large amount of snow but is inefficient and difficult when there are smaller amounts of snow. So when there are large amounts of snow, an operator may select to engage a snowplow blade. When there are small amounts of snow, a rotating snow broom may be engaged with the power unit.

Previously known hydraulic Power Take-Off (PTO) systems are bulky, get hot, and suffer from losses in the system. In addition, repairing problems that occur within these PRIOR ART hydraulic systems is costly in both money and manpower. The power unit in accordance with the present disclosure, on the other hand, includes a belt-drive PTO. The belt-driven PTO allows for a more efficient power transfer between the power unit and any attachments engaged therewith. The belt-drive PTO may also reduce the cost and time commitment for the owner of the power unit in repairs. The belt-drive PTO was developed in order to harness the power of the engine on the power unit without bulky and costly hydraulics. The PTO on the power unit also helps to maximize power transfer efficiency.

PRIOR ART snow and ice removal equipment typically use rotating broadcast spreaders to spread salt or ice-melting materials. Broadcast spreaders are inaccurate and can distribute salt in locations where salt is not required or desired. If, for example, a sidewalk to be cleared runs adjacent a flowerbed, a broadcast spreader may inadvertently distribute some of the salt onto the flowerbed and thereby change the acidity or alkalinity of the soil.

In PRIOR ART machines, brine systems are typically provided with nozzles located proximate a front end of the PRIOR ART machines. This arrangement causes the PRIOR ART machine to drive through the recently laid-down brine. The brine then tends to be thrown back onto the PRIOR ART machine, reducing its effective life span. Driving through the brine also causes some of the brine to be displaced from its intended position on the sidewalk or other surface being cleared of snow or ice, thus reducing the effectiveness of treating the surface with brine.

SUMMARY

While a number of snow removal and snow treatment vehicles have been proposed in the prior art, there remains a need for an effective solution to treat snow and ice-covered walkways in a safe, fast, and efficient manner. The apparatus and method disclosed herein addresses this need. Provided herein is skid steer style snow and ice removal vehicle that may treat a large area of real estate while maintaining maneuverability and effectiveness in tight spaces, such as on sidewalks.

A skid-steer type power unit is disclosed herein that is engageable with an implement using an attachment assembly including an attachment frame and a hitch. An arcuate frame member is located forwardly of the attachment frame and is engaged therewith in such a way that the frame member pivots about a vertical axis located forwardly of the frame member and generally centrally positioned relative to the attachment frame. The frame member pivots in response to actuation of a hydraulic cylinder. The power unit includes a system for transferring weight of the implement rearwardly onto the power unit. A belt-drive power-take off system on the power unit powers the implement's operation. An underbelly drop spreader is located between the front and rear wheels of the power unit and a brine delivery system distributes brine from nozzles located rearwardly of the rear wheels. A unique control panel permits operation of all systems on the power unit and implement.

The power unit disclosed herein may be an articulating tractor that is capable of quickly swapping between multiple different attachments. Everything from a mower deck to a snow blower may be changed in less than sixty seconds when the power unit is under the control of a skilled operator. The changing of the attachments does not require the use of any tools.

The power unit disclosed herein has a tight turning radius and, in some examples, may have a turning radius that may approximate a zero turn radius. The power unit is capable of sustained sidewalk use without the need to have a driveway or larger area to turn around in. A tight turning radius, particularly a zero turn radius may permit the power unit to plow snow without having to resort to time costly "Y" turning patterns.

The power unit in accordance with the present disclosure is a stand-on unit and because of this, there is a chance that the operator might be thrown off balance by the machine. If this happens, it would be easy for the operator to reflexively grab onto one of the control levers to try and stabilize themselves. This would cause the machine to move in an unexpected way, endangering both the operator and those around the machine. To address this, the power unit disclosed herein is provided with grab handles on the control panel. Additionally, the power unit is provided with a safety kill-switch on the operator platform. If the operator leaves the operator platform when the power unit's engine is running, the safety kill-switch will stop the engine and the operation of any attachments engaged with the power unit.

The power unit in accordance with the present disclosure offers operators an opportunity to run the machine one handed while manipulating the attachment that is engaged with the machine. This one-handed operation is made possible through the provision of an ergonomically designed control panel.

The power unit in accordance with the present disclosure also provide an underbelly salt spreader. The power unit in accordance with the present disclosure uses a different style of salt spreader, namely, a drop spreader. This drop spreader can be mounted between the front and rear wheels of the power unit and in a location that is close to the ground. The drop spreader on the power unit only places salt where the operator wishes to place salt. This enables the power unit to function in such a way that it is unlikely to kill grass on nearby lawns or lay down unnecessarily high quantities of salt.

The power unit in accordance with the present invention may include a brine system that is mounted proximate a front end of the machine but the nozzles for distributing that brine may be located proximate a rear end of the power unit. As a consequence, brine does not splash up onto the power unit, reducing the power unit's life. Furthermore, the brine gets laid down by the power unit on the surface that requires treatment and the power unit moving forwardly of the surface does not affect the treatment of the surface with brine since the brine is sprayed rearwardly of the rear wheels of the device.

In one aspect, the present disclosure may provide a power unit comprising a powered vehicle that has differential steering; an attachment engageable with the powered vehicle; said attachment being adapted to perform a task as the powered vehicle travels over a surface; and a belt-drive power take-off system provided to transfer power from the powered vehicle to the attachment. The belt-drive power take-off system comprises a first belt-drive system provided on the powered vehicle; said first belt-drive system including a first drive belt; and a second belt-drive system provided on the attachment; said second belt-drive system including a second drive belt; and an overlap formed between the first belt-drive system and the second belt-drive system and wherein power from the first belt-drive system is transferred to the second belt-drive system at the overlap.

A connector mechanism may be provided in the one region where the first belt-drive system overlaps the second belt-drive system; and wherein each of the first drive belt and the second drive belt engage the connector mechanism. The connector mechanism may be a double pulley mounted to a frame of the powered vehicle and includes a first groove and a second groove; and wherein the first drive belt is received in the first groove and the second drive belt is received in the second groove.

In another aspect, the present disclosure may provide a method of transferring power from a power unit to an attachment engaged therewith; said method comprising engaging an attachment for performing a task with a power unit that is adapted to travel across a surface, wherein the power unit comprises a powered vehicle that has differential steering; moving a first drive belt along a first belt path on the power unit; overlapping the first belt path with a second belt path, where the second belt path is located partially on the power unit and partially on the attachment; transferring power from the first drive belt as it moves along the first belt path to a second drive belt on the second belt path; moving the second drive belt along the second belt path; and powering the attachment with the power transferred to the second drive belt. The method further comprises installing the second drive belt on the second belt path after engagement of the attachment with the power unit; and removing the second drive belt from the second belt path prior to removal of the attachment from the power unit. The method further comprises applying tension to at least one of the first drive belt and the second drive belt prior to operating the attachment. The method further comprises operating the attachment to clear a surface over which the power unit travels of snow and/or ice.

In another aspect, the present disclosure may provide a method of transferring power from a power unit to an attachment engaged with the power unit; said method comprising receiving a first drive belt of a first belt-drive system provided on a power unit in a first groove of a double pulley; engaging an attachment to the power unit, wherein the power unit is a powered vehicle having differential steering; receiving a second drive belt of a second belt-drive system provided at least partially on the attachment in a second groove of the double pulley; moving the first drive belt around the double pulley; causing rotation of the double pulley through movement of the first drive belt; causing movement of the second drive belt through the rotation of the double pulley; rotating an attachment pulley provided on the attachment with the second drive belt; and powering the attachment through the rotation of the attachment pulley. The powering includes one or both of powering a pump provided on the attachment and powering a motor provided on the attachment.

In another aspect, the present disclosure may provide a power unit comprising a powered vehicle having differential steering; wherein the powered vehicle has a frame having a front end, a rear end, a left side and a right side; a pair of front wheels mounted proximate the front end of the frame; a pair of rear wheels mounted proximate the rear end of the frame; a spreader for particulate materials provided on the frame at a location between the pair of front wheels and the pair of rear wheels; and wherein the spreader includes an opening that is located proximate a bottom surface of the frame. The spreader may be a drop spreader. The frame of the power unit has a longitudinal axis that extends between the front end and the rear end thereof; and the spreader is oriented at an angle to the longitudinal axis. The spreader may be oriented at right angles to the longitudinal axis.

In another aspect, the present disclosure may provide a method of treating a surface to clear snow and ice therefrom; said method comprising engaging one or both of a spreader and a brine tank on a power unit that has a frame upon which a pair of front wheels and a pair of rear wheels are mounted; and selecting to operate one of the spreader and the brine tank to treat a surface over which the power unit travels. The method may further comprise providing differential steering on the power unit. The step of engaging includes engaging the spreader on the power unit; and positioning the spreader on a frame of the power unit and in a location between the pair of front wheels and the pair of rear wheels. The method may further comprise positioning an opening defined in a bottom end of the spreader adjacent an aperture defined in a bottom surface of the frame; actuating the spreader; dropping particulate materials from the opening in the spreader, through the aperture in the frame and directly onto a surface over which the power unit is traveling. The method further comprises loading a quantity of particulate materials into an interior cavity of the spreader through an opening defined in a portion of a top of the spreader; where the portion of the top extends outwardly for a distance beyond a left side or a right side of the frame of the power unit. In another aspect, the method may further comprise dropping the particulate materials onto a region of the surface that lays in front of the pair of rear wheels before the power unit travels over the region of the surface. The method further comprises detachably engaging the spreader with the power unit. The method according to another aspect comprises selecting to engage the spreader with the power unit; removing a section of a side wall of the frame of the power unit from the frame; inserting the spreader into a hole in the side wall defined by removal of the section of the side wall; positioning the spreader transversely relative to a longitudinal axis of the frame, where the longitudinal axis extends between a front end and a rear end of the frame; and securing the spreader to the side wall of the frame that surrounds the opening.

The method further comprises operatively engaging the spreader with controls on a control panel of the power unit; and operating the spreader's functions with the controls on the control panel. The method further includes loading particulate materials into an interior chamber of the spreader; and lowering a center of gravity of the power unit when the particulate materials are loaded into the interior chamber of the spreader. In other aspects, the method comprises mounting the brine tank on the frame of the power unit; delivering a quantity of brine from the brine tank to one or more nozzles located on the frame rearwardly of the pair of rear wheels; and spraying brine through the one or more nozzles and onto a region of a surface over which the power unit has already traveled. Still further, the method includes selecting a width of spray to be delivered from the one or more nozzles based upon a width of the surface over which the power unit is to travel. The method may further comprise operatively engaging a hand-sprayer to the brine tank; and spraying a quantity of brine from the brine tank onto a surface with the hand-sprayer.

In another aspect, the present disclosure may provide an assembly for engaging a powered vehicle and an implement together, said assembly comprising a hitch adapted to be provided at a front end of a powered vehicle; an attachment assembly adapted to be provided on a rear end of an implement for performing a task; said attachment assembly being selectively engageable with the hitch to secure the implement to the power unit; wherein the attachment assembly defines a vertical axis that is located centrally and forwardly of the hitch; and wherein the attachment assembly is adapted to permit the implement to rotate about the vertical axis during operation of the implement.

In another aspect, the present disclosure may provide a method of connecting an implement to a powered vehicle and operating the implement comprising steps of aligning a hitch mounted on a forward end of the powered vehicle with an attachment assembly provided on a rear end of the implement; driving the powered vehicle forward and causing the hitch to engage with the attachment assembly; and pivoting the implement about a centrally located, vertically oriented axis that is provided on the attachment assembly a distance longitudinally forward of the hitch. The method may include providing the hitch on a powered vehicle that has differential steering. The aligning of the hitch comprises aligning a first latch on the hitch with a first slot defined in an upper hitch plate provided on the attachment assembly and aligning a second latch with a second slot defined in a second upper hitch plate provided on the attachment assembly; driving the powered vehicle forward towards the implement; and causing the first latch to engage in the first slot and causing the second latch to engage in the second slot. The aligning of the hitch with the attachment assembly occurs while the implement rests on a ground surface.

The method further includes raising the hitch away from the ground surface; lifting the implement upwardly from the ground surface; causing a first lower hitch plate on the attachment assembly to align with a first latch on the hitch; and causing a second lower hitch plate on the attachment assembly to align with a second latch plate on the hitch. The method further includes rotating of an attachment latch handle on the hitch from an open position to a closed position thereby locking the first latch in the first lower hitch plate and the second latch in the second lower hitch plate. The method further includes locking the attachment latch handle in the closed position with a handle lock.

In other aspects, the present disclosure may provide a method that further includes engaging a mounting attachment plate to a housing of the implement; engaging a first end of a support member with a central region of the mounting attachment plate using a first connector; engaging a second end of the support member with the attachment assembly using a second connector; engaging a first end of a hydraulic cylinder and piston to a second end of the mounting attachment plate with a third connector; engaging a second end of the hydraulic cylinder and piston to the attachment assembly using a forth connector. The method further comprises pivotally engaging an arcuate frame member with the attachment assembly; operatively engaging the arcuate frame member with the housing; actuating the hydraulic cylinder and piston to rotate the mounting attachment plate and thereby the housing relative to the attachment assembly; and pivoting the arcuate frame member about the centrally located, vertically oriented axis defined along the first connector.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3B is a front, isometric, perspective view of the control panel of FIG. 3 shown on its own;

Similar numbers refer to similar parts throughout the drawings.

DETAILED DESCRIPTION

Figure 1:
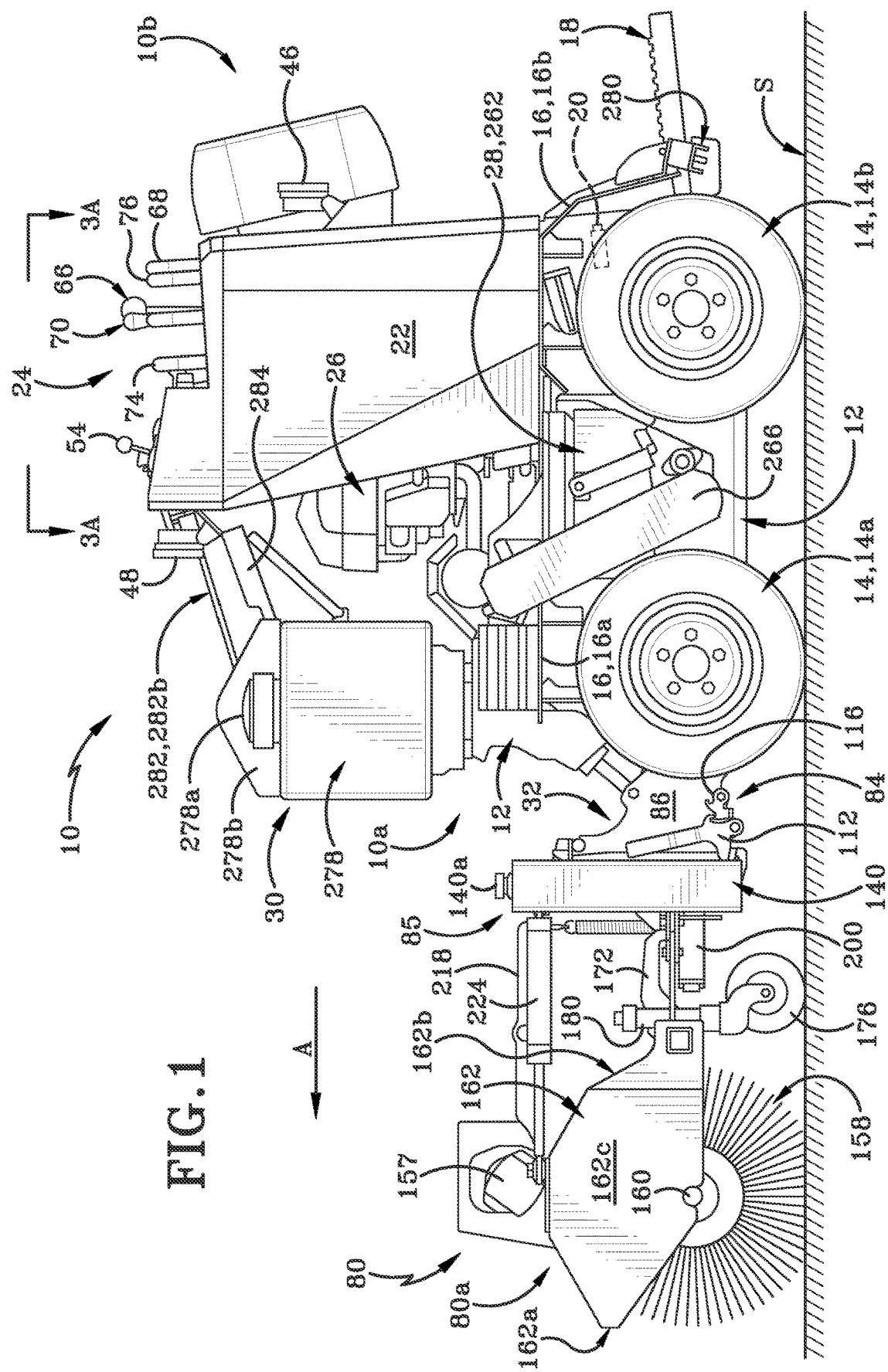
FIG. 1 is a left side elevation view of a power unit in accordance with an aspect of the present disclosure.

A power unit in accordance with the present disclosure is illustrated in FIGS. 1-21 and is generally indicated herein by the reference number 10. Power unit 10 is shown and described herein as a powered vehicle that has differential steering. One example of such a powered vehicle is a skid steer-style vehicle that may carry and operate various attachments and implements. Examples of suitable skid steer style vehicles that may be used as power unit 10 are those sold under the name BOBCAT® by The Bobcat Company of North Dakota, USA or those sold under the name JOHN DEERE® by Deere & Company of Illinois, USA.

Power unit 10 has a front 10a and a rear 10b defining a longitudinal direction therebetween. Power unit 10 further includes a left side 10c (FIG. 2) and a right side 10d defining a transverse direction therebetween. Power unit 10 includes a longitudinal axis "Y" (FIG. 2) extending between front 10a and rear 10b and a traverse axis "X" extending between left side 10c and right side 10c. Transverse axis "X" is oriented at 74° relative to longitudinal axis "Y".

During operation, power unit 10 will typically travel in a forward direction indicated by the arrow "A" (FIGS. 1 & 2) that is generally parallel to longitudinal axis "Y". When power unit 10 moves in the forward direction "A", the front 10a comprises the leading end of power unit 10. (In some instances, power unit 10 may need to reverse, in which case the direction of travel will be opposite to the direction indicated by arrow "A", and then rear 10b will comprise the leading end of the power unit 10.)

Figure 2:
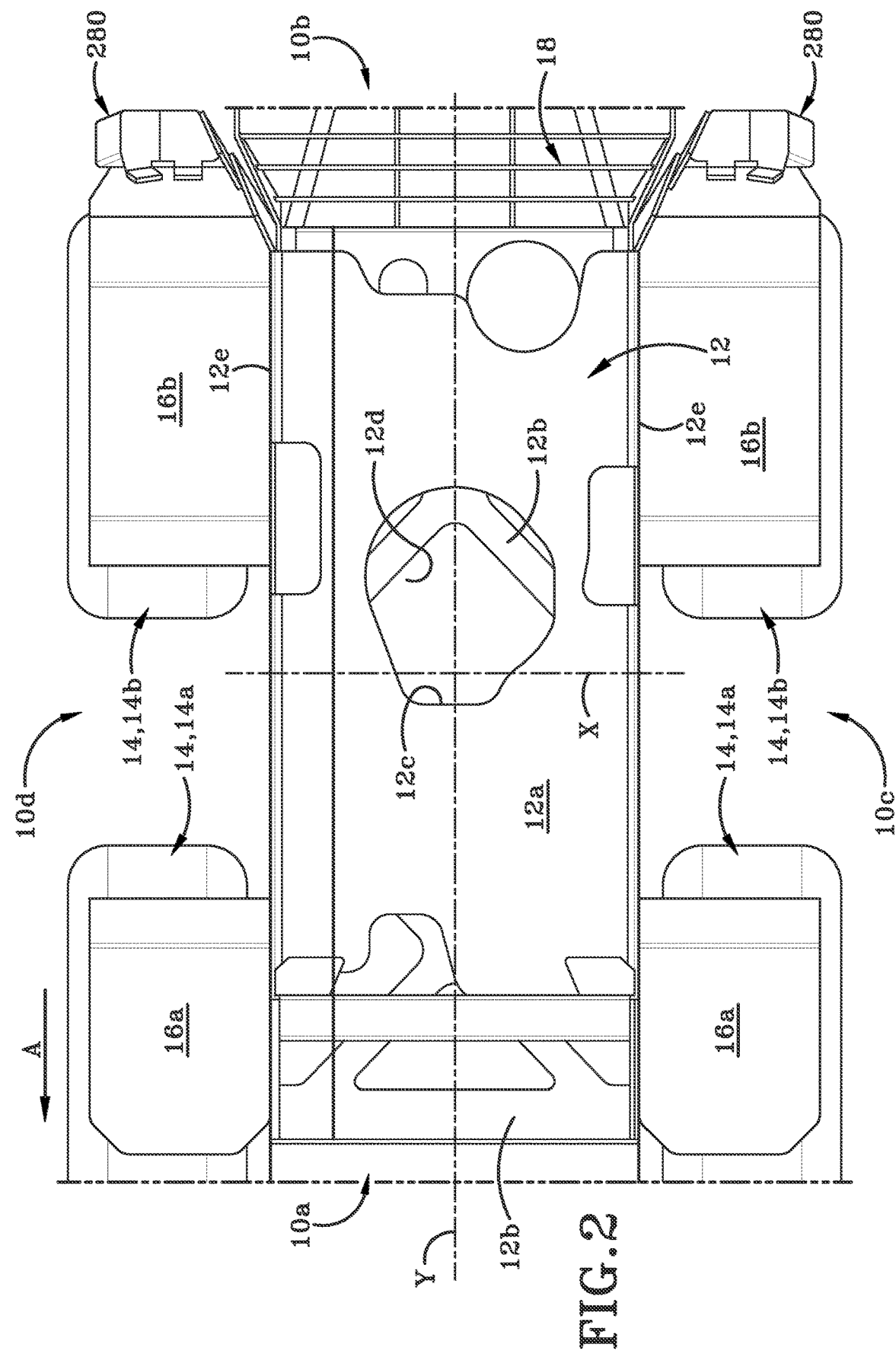
FIG. 2 is a top plan view of a frame of the power unit taken along line 2-2 of FIG. 1.

Power unit 10 includes a tractor frame 12 upon which four wheels 14a, 14b are mounted so that power unit 10 may be driven across a surface "S" (FIG. 1). Tractor frame 12 may include a generally rectangular-shaped box that has an upper mounting platform 12a that is spaced vertically above a lower plate. A portion of lower plate 12b is shown in FIG. 2 through an aperture 12c defined in upper mounting platform 12a. Lower plate 12b defines an opening 12d. The purpose of opening 12d will be later described herein. Tractor frame 12 further includes sides 12e (FIG. 21) that extend between upper mounting platform 12a and lower plate 12b. One or both sides 12e may define a hole 12f therein. Hole 12f may originally be closed over with a metal plate. The metal plate may be selectively removed to permit access through hole 12f, as will be described later herein. It will be understood that tractor frame 12 includes many other component plates and flanges that are not illustrated in the figures. Yet other components and plates of tractor frame 12 may be illustrated but these will then simply be identified in the various figures by the reference number "12" to indicate that they form part of the tractor frame 12.

Power unit 10 includes a pair of laterally spaced apart front wheels 14a and a pair of laterally spaced apart rear wheels 14b. Front wheels 14a and rear wheels 14b are mounted on frame 12 in such a way that they have a fixed orientation relative to frame 12. In other words, while wheels 14a, 14b are individually rotatable about a horizontally oriented axis, wheels 14a, 14b are not able to pivot to the left or to the right relative to the frame. Power unit 10 is steered by applying more or less drive torque to wheels 14a, 14b on the left side of power unit 10 relative to the drive torque applied to the wheels 14a, 14b on the right side of power unit 10. In other words, power unit 10 is a powered vehicle that has differential steering.

Although shown and discussed as having wheels 14a, 14b and being of a skid steer style, it will be understood that power unit 10 may, instead, be any of a number of different driven vehicles, including but not limited to, a tracked vehicle, a skid steer, a tractor, an all-terrain vehicle, a zero-turn vehicle, or any other similar type of gasoline-powered, electrically-powered or otherwise powered and driven device. For simplicity, the present description will be directed to the skid steer styled vehicle shown in the attached figures but it will be understood that the aspects of the present disclosure could be used on any other similar vehicle.

A pair of front fenders 16a and a pair of rear fenders 16b are mounted to tractor frame 12 in such a way as to cover a portion of the associated wheel 14a, 14b. Fenders 16a, 16b are provided to shield various components of power unit 10 as well as the operator of the power unit. Fenders 16a, 16b aid in preventing debris from being thrown up from wheels 14a, 14b during operation of power unit. Front and rear fenders 16a, 16b may also serve as mounting points for accessories and equipment as discussed further herein.

Power unit 10, as illustrated, is a stand-on machine. Typically, an operator will be positioned proximate rear 10b of power unit 10 and the attachments and implements will be located forward of the operator. An operator platform 18 (FIGS. 1 & 2) may be mounted on tractor frame 12 and extend rearwardly therefrom proximate rear 10b of power unit 10. Operator platform 18 is configured so that the operator will stand on platform 18. It will be understood that in vehicles other than the skid steer style power unit 10, the operator may be seated on a seat instead of standing on a platform. In those instances, the seat for the operator may be located somewhere between front 10a and rear 10b of power unit 10.

A safety kill-switch or deadman's switch 20 (FIG. 2) may be provided on operator platform 18. Switch 20 will detect when an operator is standing on the operator platform 18 and prevents power unit 10 from being put into drive without an operator standing on the operator platform 18. Switch 20 also acts as a safety if the power unit's controls become stuck in a forward position (i.e., driving the power unit 10 over the surface "S" or operating an attachment engaged with power unit 10). Switch 20 also shuts off a Power Take-Off (PTO) provided on power unit 10 if the operator leaves the operator platform 18 for any reason. This PTO will be later described herein. Switch 20 also eliminates access to the PTO while the PTO is turned on, thereby providing another level of safety for the operator. Switch 20 will cut power to power unit 10 if the operator leaves operator platform 18 while the engine 26 is running. If the operator, for example, forgot to turn off the machine off and steps off the platform 18 or if the operator falls off the platform 18, the kill switch 20 will switch off engine 26 and the power unit 10 will stop moving over the surface "S". Furthermore, attachments engaged with power unit 10 will stop functioning. For example, a rotating brush mounted on power unit 10, will cease rotating.

A plurality of component parts of power unit 10 may be operatively engaged or mounted on frame 12. It will be understood that the attached figures and the following description is not exhaustive and, while describing some components and systems in detail, this document also only identifies other components and systems in passing. With respect to the components that are merely identified in passing, these components may be well-known in the art, both with respect to structure and function, and therefore will not be described in detail. Alternatively, the components mentioned in passing may not be directly relevant to the specific apparatus, system, or method being discussed herein. Yet other components that are present on power unit 10 may not be identified at all in this document.

Figure 16:
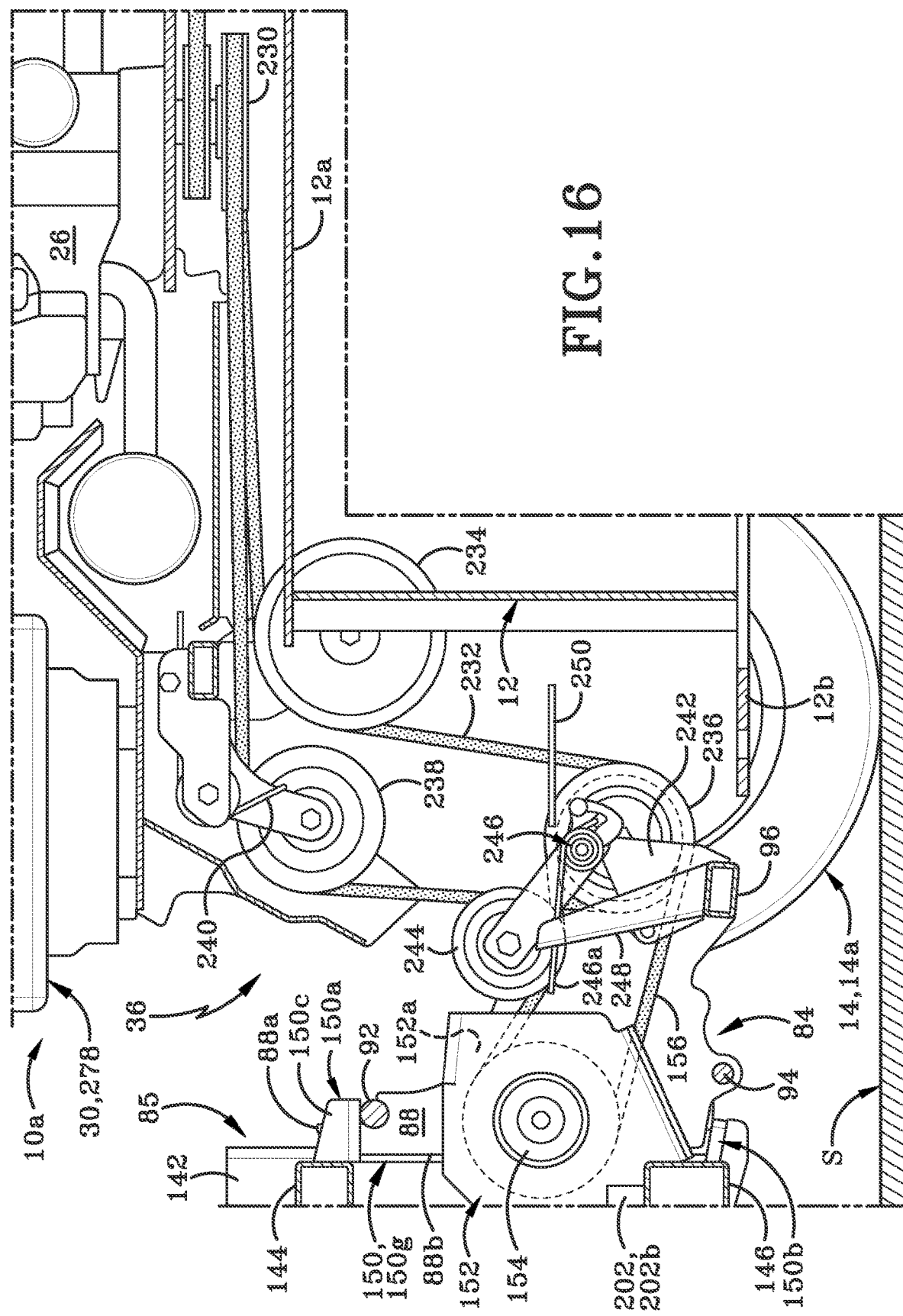
FIG. 16 is an enlarged longitudinal cross-sectional view of a portion of the attachment assembly and the power unit showing the power take off system.

Referring to FIGS. 1 and 2, power unit 10 may further include a body 22 that is located on upper mounting platform 12a of frame 12 and a control panel 24 may be provided on an upper end of body 22. An engine 26 is mounted on upper mounting platform 12a in a position forward of body 22. Engine 26 may be a gasoline-powered engine, an electrically-powered engine, a hybrid thereof, or any other mechanism for providing power to the systems of power unit 10. Power unit 10 may further include a particulate material spreader system 28, a liquid-dispensing system 30, an attachment assembly 32, a weight transfer system 34 (FIG. 9), and a power transfer system 36 (FIG. 16). Each of the particulate material spreader system 28, liquid-dispensing system 30, attachment assembly 32, weight transfer system 34 (FIG. 9), and power transfer system 36 are in some way operatively engaged with and/or supported by frame 12. Upper mounting platform 12a may further serve as a base for any additional components including, but not limited to, electrical components such as a battery, wiring, hydraulic components such as pumps and hoses, a fuel tank, and the like.

With reference now to FIGS. 3A, 3B, 3C and 3D the structure and function of control panel 24 will be further described. Control panel 24 has a front end 24a located towards front 10a of power unit 10 and a rear end 24b located towards rear 10b of power unit 10. Front end 24a is longitudinally spaced apart from rear end 24b. Control panel 24 further includes a left side 24c laterally spaced apart from a right side 24d, and a top 24e upon which are provided a plurality of controls. Top 24e may define a generally square shaped aperture 24f and a pair of parallel and spaced apart slots 24g, 24h. As best seen in FIG. 1, control panel 24 is located atop body 22 of power unit 10 and towards the rear 10b of power unit 10. This location and configuration may allow an operator standing on operator platform 18 to be in constant contact with control panel 24 during operation of power unit 10.

Figure 3A:
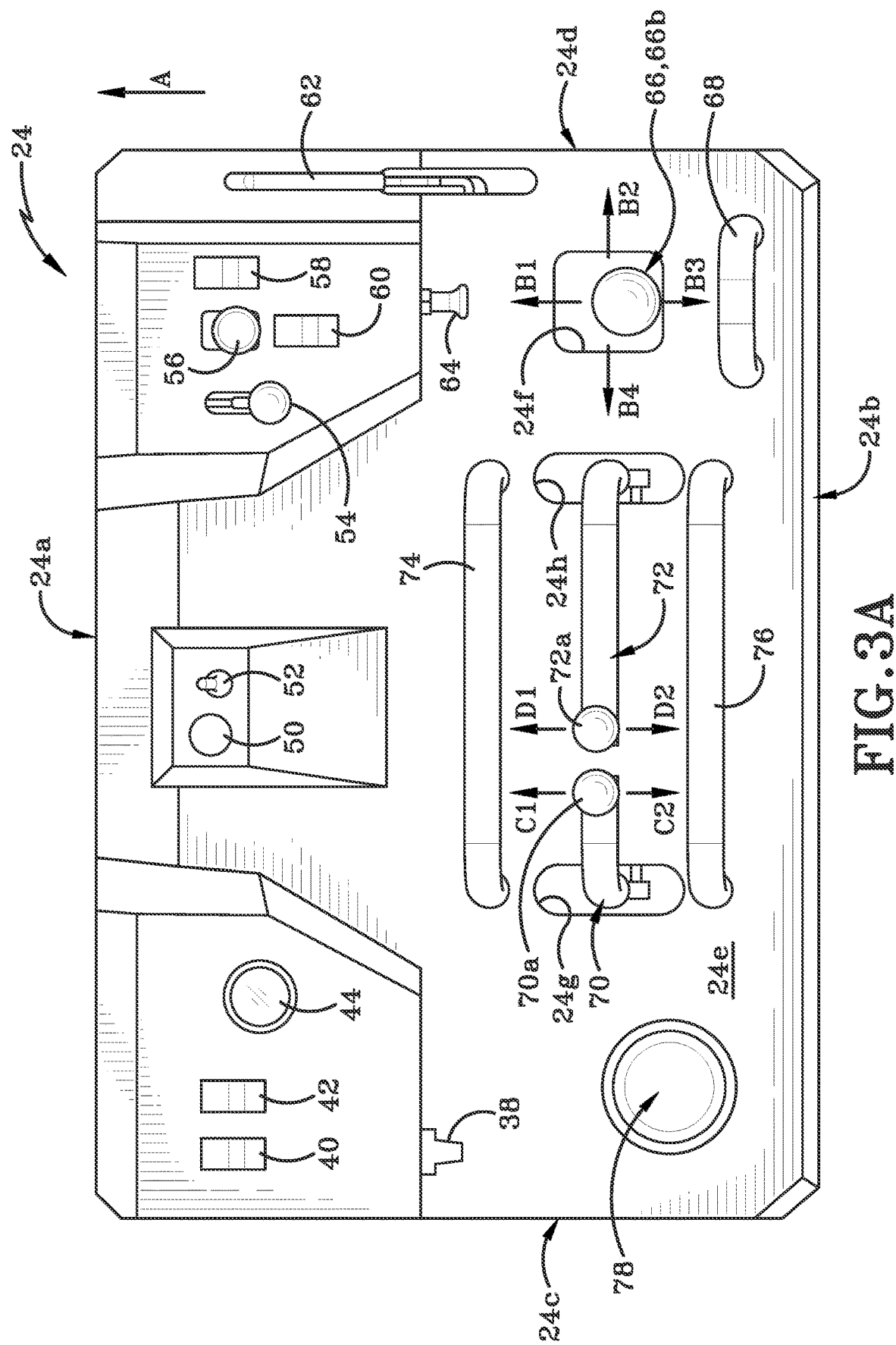
FIG. 3A is a top plan view of a control panel of the power unit taken along line 3A-3A of FIG. 1, showing the control panel on its own and illustrated from the perspective of an operator standing on the platform of the power unit.

For purposes of simplicity, control panel 24 will be described in the way in which an operator standing on operator platform 18 will see and experience control panel 24. The description will begin at a forward left quadrant of control panel 24 (proximate where left side 24c intersects with front end 24a) as seen in FIG. 3A and will work clockwise around control panel 24. With reference therefore to the forward left quadrant, control panel 24 may have an ignition switch 38 for switching power unit 10 on or off. According to one aspect, ignition switch 38 may be a keyed ignition switch while in another aspect, ignition switch 38 may be a keyless ignition switch.

Control panel 24 next includes a first auxiliary power switch 40, a second auxiliary power switch 42, and an instrument cluster gauge 44. First auxiliary power switch 40 may control an electrical implement, for example, one or more rear work lights 46 (FIG. 1) or one or more forward work lights, if provided, on power unit 10. Likewise, second auxiliary power switch 42 may control a second electrical implement such as one or more headlights 48 or fog lights if provided on power unit 10. According to one aspect, a power unit 10 equipped with both rear work lights 46 and headlights 48 may be controlled by first and second auxiliary power switches 40 and 42, respectively.

Cluster gauge 44 may display relevant information about the operation and status of power unit 10. By way of a non-limiting example, cluster gauge 44 may include features such as an hour meter, oil pressure light, power take-off indicator light, parking brake light, voltage meter, gas gauge, or any other informational display as chosen of a person skilled in the art relevant to the desired operation of power unit 10.

Moving now to a center region of control panel 24, proximate front end 24a, and control panel 24 may further include a pressure gauge 50 and nozzle toggle switch 52. According to one aspect, pressure gauge 50 and nozzle toggle switch 52 may be installed as part of control panel 24 in instances where power unit 10 includes the liquid-dispensing system 30 as discussed later herein. In other examples, power unit 10 may not include liquid-dispensing system 30 and in those instances, pressure gauge 50 and nozzle toggle switch 52 may be omitted from control panel 24. Pressure gauge 50 may indicate a pressure within liquid-dispensing system 30 while nozzle toggle switch 52 may be utilized to control power to toggle one or more liquid-dispensing nozzles that may be provided as part of liquid-dispensing system 30. This will be discussed later herein. Nozzle toggle switch 52 may also be utilized to move liquid-dispensing system 30 between an ON position and an OFF position.

Moving now to the forward right quadrant, control panel 24 may include a throttle control 54, a power take-off switch 56 (PTO switch 56), a third auxiliary power switch 58, a fourth auxiliary power switch 60, a parking brake lever 62, and choke control 64. According to one aspect, throttle control 54 may be activated to control the flow of power or fuel to the power unit's engine 26. According to another aspect, PTO switch 56 may be utilized to engage or disengage the power transfer system 36 as later described herein. According to another aspect, third auxiliary switch 58 may be utilized to power brine pumps to deliver liquid through the liquid-dispensing system 30 if provided on power unit 10. According to another aspect, fourth auxiliary power switch 60 may be utilized to control an optional 12 Volt electrical power source that may be connected to a front attachment/implement if such a device is installed on power unit 10. Many of these optional features will be discussed herein with reference to the appropriate systems to which they belong.

Moving now to the lower right quadrant, control panel 24 may further include a hydraulic control lever 66. According to one aspect, hydraulic control lever 66 may be utilized to control a front attachment or implement, if provided on power unit 10 and as described further herein. Hydraulic control lever 66 may include a shaft 66a with a knob 66b at its uppermost end. Hydraulic control lever 66 may have a central float position. In other words, hydraulic control lever 66 may float towards a center of its motion range when not in use. As is evident from FIGS. 3A and 3B, the motion of the shaft 66a of hydraulic control lever 66 is limited by a stop wall that bounds and defines aperture 24f in top 24e of control panel 24. Hydraulic control lever 66 is capable of moving in more than one direction, as illustrated by the arrows "B1", "B2", "B3" and "B4" in FIG. 3A. The shaft 66a and therefore hydraulic control lever 66 will tend to move to a central region of the aperture surrounded by stop wall 24f when hydraulic control lever 66 is not in use.

Immediately rearward of hydraulic control lever 66 is a wrist support bar 68 that extends upwardly from top 24e of control panel 24. Wrist support bar 68 may be a tube that is generally circular in cross-section and which is formed into a U-shaped member when viewed from the rear 10b of power unit 10. Wrist support bar 68 may provide a comfortable location for the operator to rest his or her wrist and part of their forearm while holding and manipulating hydraulic control lever 66. Wrist support bar 68 may provide a rest point for the wrist and forearm of the operator, thereby freeing up the operator's hand to work hydraulic control lever 66. In some examples, wrist support bar 68 may be adjustable in height relative to top 24e so that an operator can select the most comfortable height of wrist support bar 68 for their own body. If wrist support bar 68 is adjustable in height, then the bar 68 may also be provided with a locking member to lock bar 68 at the selected adjusted height. It is preferable, however, that wrist support bar 68 be a fixed height relative to top 24e so that it provides a stable support for the operator's wrist.

Moving to a rear center portion of control panel 24, drive controls are shown. The drive controls may include a left drive control lever 70 with a left-hand knob 70a attached thereto and a right drive control lever 72 with a right-hand control knob 72a attached thereto. Left drive control lever 70 has a shaft that extends outwardly from top 24e of control panel 24 through slot 24g. Left drive control lever 70 may be utilized to control the left side wheels 14a, 14b of power unit 10. Right drive control lever 72 has a shaft that extends outwardly from top 24e of control panel through slot 24h. Right drive control lever 72 may be utilized to control the right side wheels 14a, 14b during operation of power unit 10. As discussed more thoroughly later herein, the specific configuration of left drive control lever 70, left-hand knob 70a, right drive control lever 72, and right hand knob 72a may allow for single-handed operation of power unit 10.

It should be noted that hydraulic control lever 66, left drive control lever 70, and right drive control lever 72 all include small rounded knobs 66b, 70a, and 72a, respectively at their upper ends. The knobs 66b, 70a, and 72a help to enable one-handed operation of power unit 10. The levers 66, 70, and 72 protrude generally upright from top 24e of control panel 24 and allow the operator's hand to move easily around them, thereby allowing for fine control of power unit 10, even if the operator is only using one hand.

Immediately forward of the left and right drive control levers 70, 72 is a forward support bar 74 and immediately rearward of left and right drive control levers 70, 72 is a rear support bar 76. Forward and rear support bars 74 and 76, (which are collectively referred to herein as "support bars"), may provide anchor points for the operator's wrist, forearm, and/or fingers to further allow for possible one-handed operation of power unit 10. Each support bar 74, 76 may be a generally U-shaped member (when viewed from rear end 10b) that extends for a distance outwardly from top 24e of control panel 24. In some examples, one or more of the support bars 74, 76 may be selectively adjustable in height and may be lockable with a locking member in that selected adjusted height. It is preferably, however, that the forward and rear support bars 74 and 76 be of a fixed height relative to top wall 24e of control panel 24. The U-shaped members may be generally circular in cross-section.

Moving now to the lower left quadrant of control panel 24, a cup holder 78 may be provided. According to one aspect, cup holder 78 may be omitted from control panel 24 if desired, or cup holder 78 may be replaced with additional controls depending on the desired application and use of power unit 10.

While various controls provided on control panel 24 have been identified, the operation thereof and the correlation to remaining systems herein described will become apparent throughout the remainder of this specification.

The basic operation of power unit 10 will now be described with reference to the manipulation of the various controls on control panel 24. With reference to FIG. 1, power unit 10 may generally operate as a normal ski steer-style vehicle wherein the first pair of wheels 14a, 14b on the left side 10c of power unit 10 and the second pair of wheels 14a, 14b on the right side 10d of power unit 10 are driven independently of each other. Power unit 10 may move in a forward direction, generally indicated by the arrow "A" discussed earlier herein or in a rearward direction (i.e., reverse) opposite to arrow "A". Power unit 10 may also turn left, turn right, and turn in a zero degree circle to the left or to the right through operation of left and right control levers 70 and 72, as described below.

The starting process and general operation of power unit 10 may proceed according to known steps and functions. To that end, ignition switch 38 may be utilized to start engine 26. Choke control 64 may be actuated to assist in the starting of engine 26 when the air temperature, power unit 10 or general environment is cold. Once engine 26 is at running and is at an appropriate operating temperature and speed, power unit 10 may be further utilized to perform a task such as clearing snow and/or ice from surface "S", treating surface "S" for snow and/or ice buildup, treating surface "S" to prevent future snow and/or ice buildup, or a combination thereof.

Figure 3C:
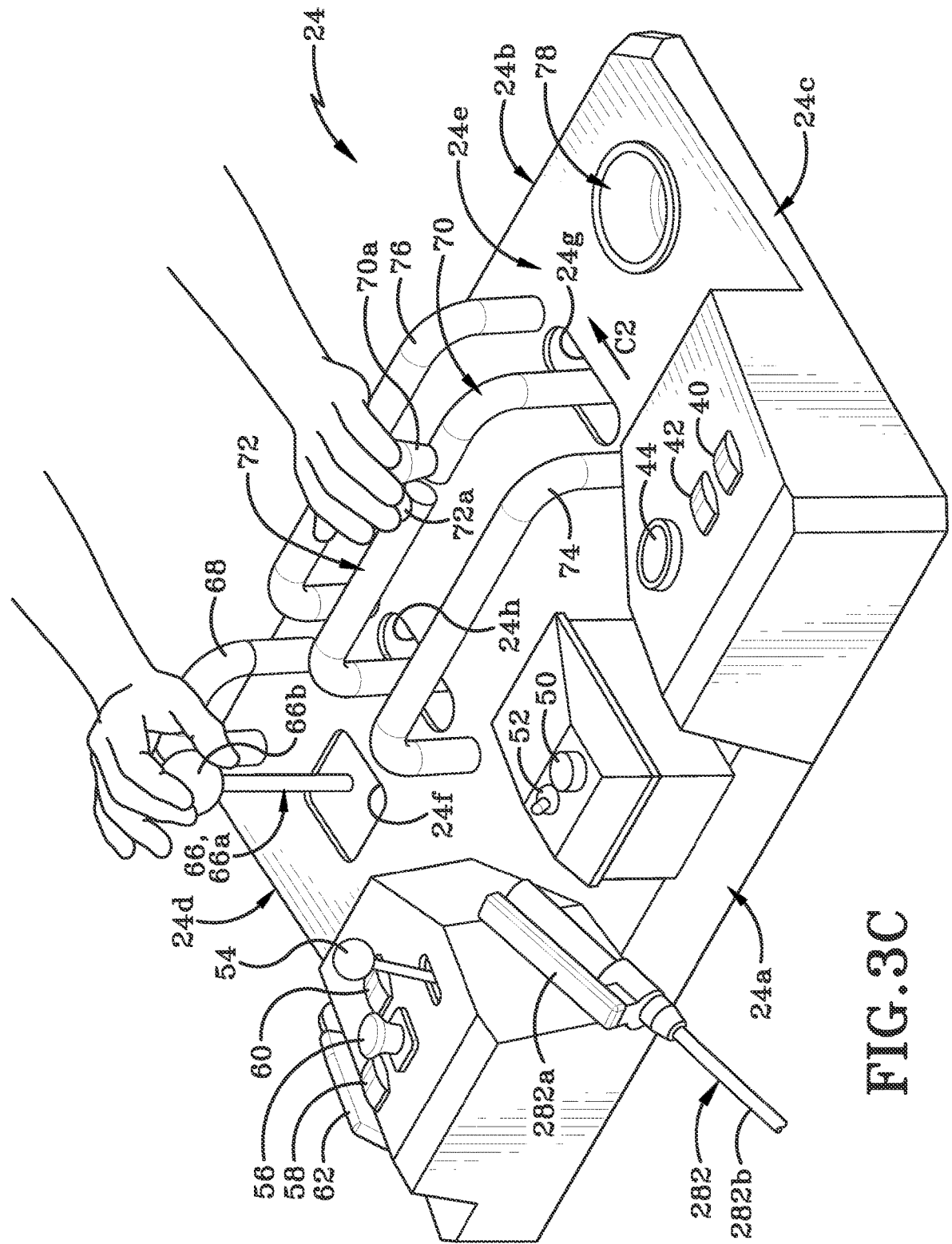
FIG. 3C is a top, left, isometric perspective view of the control panel shown on its own and in in first operational position.
Figure 3D:
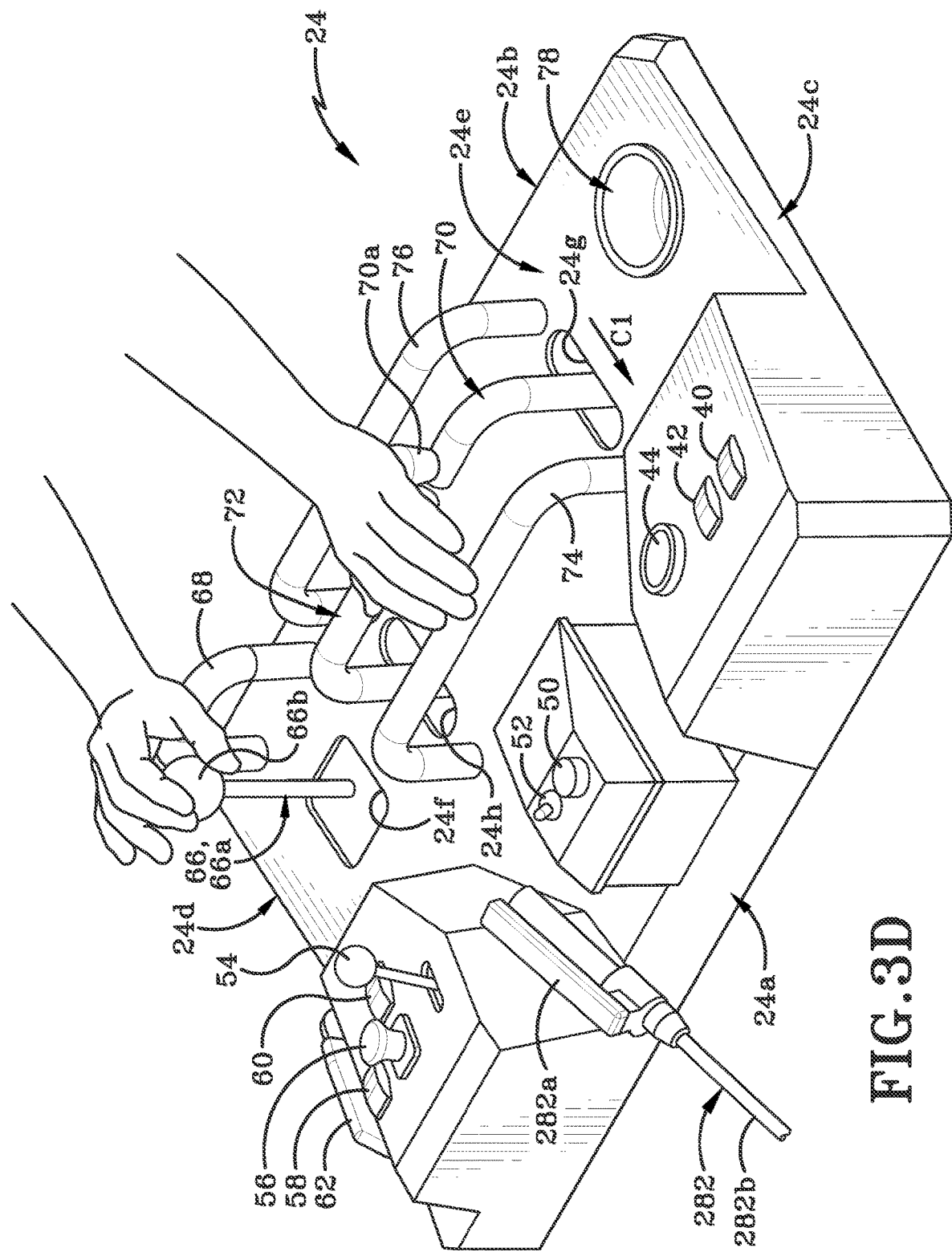
FIG. 3D is top, left, isometric, perspective view of the control panel shown on its own and in a second operational position.

With reference to FIGS. 3C and 3D, control panel 24 may allow an operator to drive power unit 10 through manipulation of left and right drive control levers 70, 72. Specifically, the left side wheels 14a, 14b are controlled by left drive control lever 70 and the right side wheels 14a, 14b may be controlled by right drive control lever 72. The left drive control lever 70 is configured to only be able to move linearly back and forth within a first slot 24g defined in top 24e of control panel 24. The possible linear back and forth motion of left drive control lever 70 is identified in FIG. 3A by the arrows "C1" (forward) and "C2" (rearward). The right drive control lever 72 is configured to only be able to move linearly back and forth within a second slot 24h defined in top 24e of control panel 24. The possible linear back and forth motion of right drive control lever 72 is identified in FIG. 3A by the arrows "D1" (forward) and "D2" (rearward). The linear movements of left and right control levers 70, 72 are oriented substantially parallel to longitudinal axis "Y" of power unit 10. The left control lever 70 is configured to move along a first plane that is parallel to axis "Y" and the right control lever 72 is configured to move along a second plane that is parallel to the axis "Y" and to the first plane.

Moving both of the left and/or right drive control levers 70, 72 forward in the respective directions "C1" and/or "D1", may cause the associated pair of left or right side wheels 14a, 14b to move power unit forward, i.e., in the direction of arrow "A". Power unit 10 will then move forwardly across the surface "S" (FIG. 1). Moving both of the left and/or right drive control levers 70, 72 rearward, i.e., respective directions "C2" and/or "D2", may cause the associated pair of left or right side wheels 14a, 14b to move power unit 10 in a rearward direction across the surface "S", i.e., opposite to the direction indicated by arrow "A".

Moving only one of the left and right drive control levers 70, 72 forward (in the direction of "C1" or "D1") while moving the other of the left and right drive control levers 70, 72 rearward (in the direction of "C2" or "D2") may allow power unit 10 to turn in a circle, i.e., through 360°.

Applicable to all the above-described movements, it will be understood that the further forward or rearward the drive control levers 70, 72 are moved within the associated slot 24g, 24h, the faster the associated wheels 14a, 14b will rotate.

Wheels 14a, 14b are mounted in a fixed orientation relative to frame 12. In other words, the wheels 14a, 14b are mounted so that they do not and cannot pivot relative to the axis about which they rotate. Wheels 14a, 14b may only rotate about the axis in a forward motion or in a rearward motion. The wheels 14a, 14b cannot be turned to the left or to the right, i.e., angled relative to the "Y" axis. Instead, they always remain straight and parallel to longitudinal axis "Y". Accordingly, in order for power unit 10 to turn to the left or to the right as it moves across surface "S", the speed of the wheels 14a, 14b on one side may be adjusted relative to the speed of the wheels 14a, 14b on the opposite side. The difference in the speed of rotation of the wheels 14a, 14b on the left side 10c of power unit 10d relative to the speed of rotation of wheels 14a, 14b on the right side will cause power unit to turn as it travels across surface "S". The direction of the turn is dependent upon the relative speeds of rotation of wheels 14a, 14b on the left side 10c and right side 10d. Specifically, if wheels 14a, 14b on left side 10c of power unit 10 rotate more slowly than wheels 14a, 14b on the right side 10d, power unit 10 will turn left. If the wheels 14a, 14b on the right side 10d rotate more slowly than wheels 14a, 14b on the left side 10c, power unit 10 will turn right.

The configuration of control panel 24 allows an operator to drive power unit 10 with only one hand. With continued reference to FIGS. 3C and 3D, operator may place one hand on the left and right hand knobs 70a, 72a of left and right drive control levers 70, 72. If the operator wishes to drive forward in the direction of arrow "A" in FIG. 1, both of the left and right drive control levers 70, 72 may be operated using the palm of the one hand, and both levers 70, 72 may simultaneously be pushed forwardly in the directions "C1" and "D1" with a substantially equal force being applied thereto. The simultaneous movement may move the left drive control lever and right drive control lever 70, 72 forwardly within the respective slot 24g, 24h a generally similar or identical distance. Forward support bar 74 may provide a gripping point for operator's fingers (as shown in FIG. 3D) to give the operator leverage to move left and right control levers 70, 72 forwardly towards forward support bar 74 with relative ease. Moving both left and right control levers 70, 72 in this manner may allow the movement thereof to be even and consistent, As a result, power unit 10 will move forward in a generally straight line, i.e., generally parallel to longitudinal axis "Y".

If the operator wishes to drive in reverse in a straight line, i.e., in the direction opposite to arrow "A" in FIG. 1 and parallel to the axis "Y", then left and right control levers 70, 72 may be operated using the fingers of the hand, while the palm of the operator's hand may rest against the rearward support bar 76 to provide leverage. The operator will grasps knobs 70a, 72b with their fingers and resting their palm on rearward support bar 76, the operator will simply pull their fingers inwardly toward their palm. Again, this will result in left and right control levers to move smoothly within their associated slots 24g, 24h. The controlled movement of left and right control levers 70, 72 will help assure that power unit 10 will reverse in a generally straight line that is parallel to axis "Y".

Single handed operation of power unit 10 during a turn may be accomplished through manipulation of the left and right control levers 70, 72 using the left and right hand knobs 70a, 72a by holding them in a particular manner in the operator's fingers. Specifically, the operator may control one of the left and right drive control levers 70, 72 by gripping the associated knob 70a or 72a with the thumb and forefinger of one hand and operating the other of the left or right drive control levers 70, 72 with the remaining three fingers. During a turn, one of knobs 70a, for example, may be moved rearwardly (in the direction "C2") while the other knob 72a is moved forwardly in the direction of "D1". This engagement will cause power unit 10 to turn to the left. Moving knob 70a forwardly in the direction of "C1" and moving knob 72a rearwardly in the direction of "D2" will cause power unit 10 to turn to the right. If the operator feels the need, for example, in a tight turn or similar situation he or she may easily switch from a one-handed operation mode to a two-handed operation mode for the duration of the turn and then switch back to one-handed operation once the maneuver is complete.

The ability to drive power unit 10 with only one hand (i.e., their left hand) tends to free up the operator's other hand (i.e., their right hand) to control other components on power unit 10 without sacrificing the ability to safely and accurately maneuver power unit 10.

With their free right hand, the operator may activate or deactivate any of the other controls on control panel 24. For example, as illustrated in FIG. 3C, the operator may manipulate hydraulic control lever 66 with their right, non-drive hand. Specifically, operator may place the palm or wrist of their right hand on wrist support bar 68 and they may then grasp knob 66b and manipulate hydraulic control lever 68 with the fingers and thumb of their right hand. In particular, the operator may push hydraulic control lever 66 in any of the directions "B1" or "B4" (FIG. 3A) or may pull hydraulic control lever 66 in any of the directions "B2" or "B3". When the operator releases knob 66b, the control lever 66 will tend to "float" back into a generally central location within aperture 24f.

Power unit 10 is designed to be utilized with a variety of different attachments or implements that may be engaged with power unit 10 to perform a variety of different tasks. Some attachments or implements may be engaged with power unit 10 proximate front 10a thereof, while other attachments or implements may be engaged on power unit somewhere between front 10a and rear 10b. (In yet other examples, attachments or implements may be engaged proximate rear 10b.) In power unit 10 as illustrated and described herein one or more attachments or implements may be engaged proximate front 10a and one or more attachments or implements may be engaged with tractor frame 12 in a position that is generally midway between front wheels 14a and rear wheels 14b.

Figure 18A:
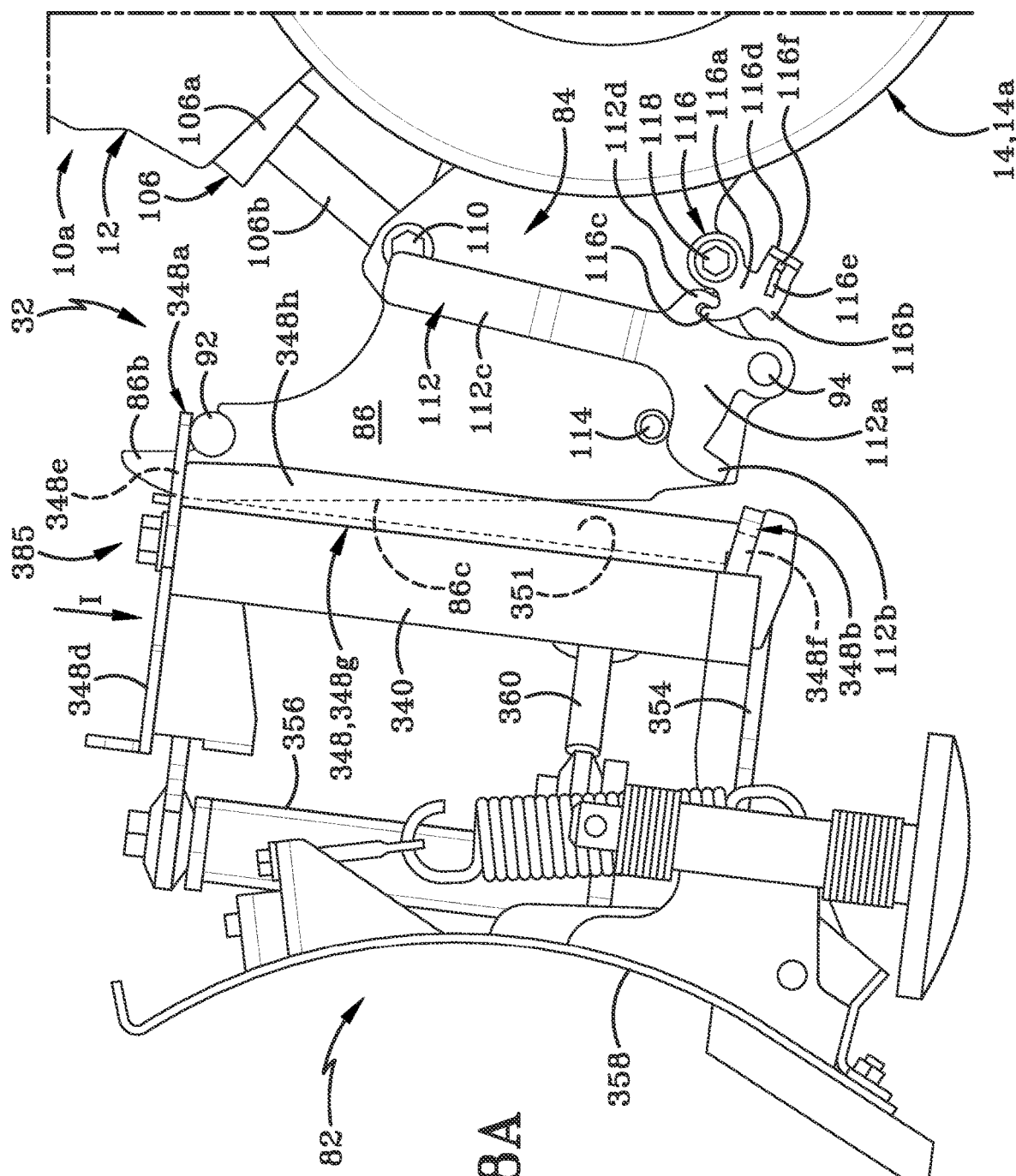
FIG. 18A is a left side elevation view of the attachment assembly showing a different implement being positioned for engagement with the attachment assembly.
Figure 18B:
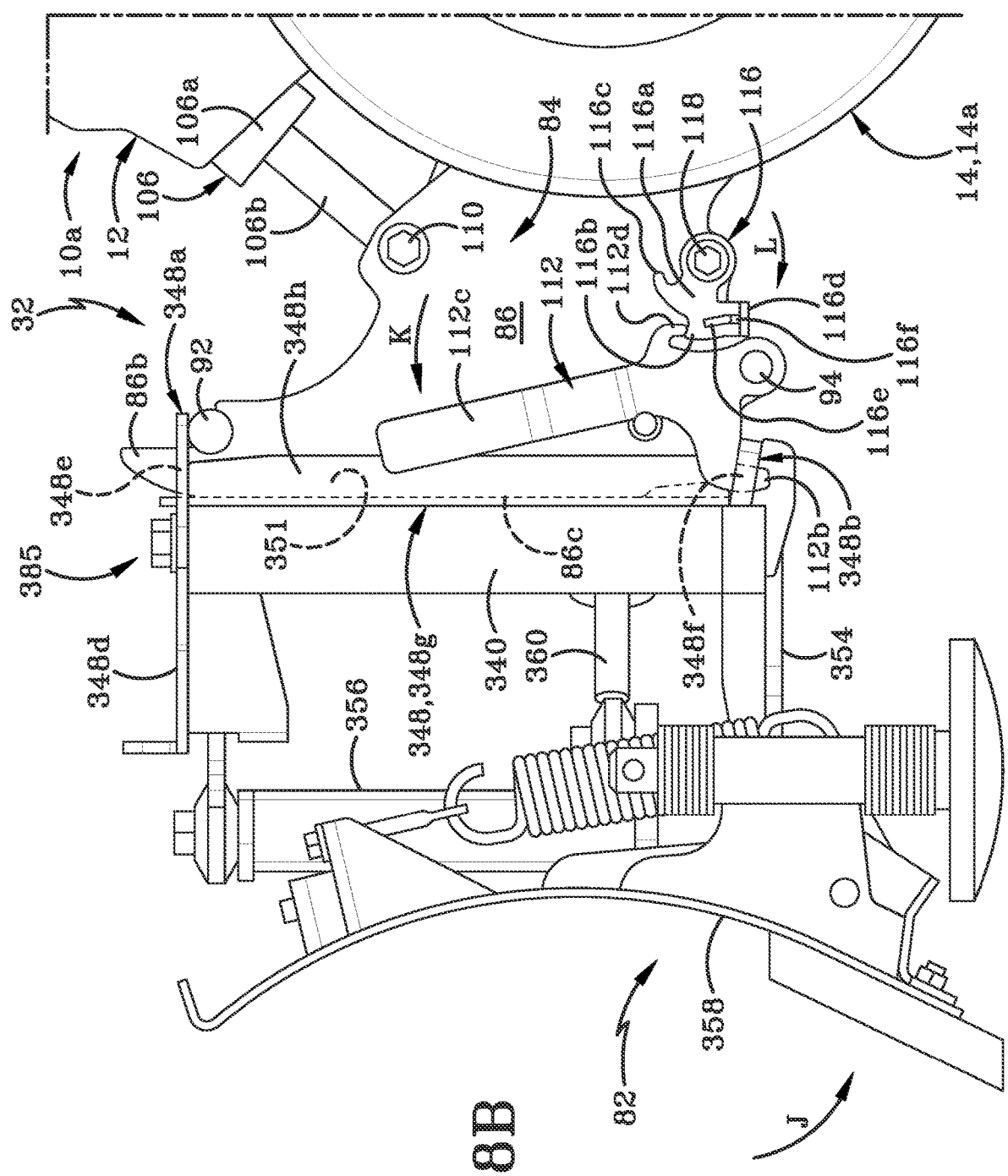
FIG. 18B is a left side elevation view showing the attachment engaging the different implement.

Referring now to FIGS. 4-15, the attachment assembly 32 in accordance with the present disclosure is shown in greater detail. Attachment assembly 32 comprises a plurality of components that are utilized to secure any one of a variety of different attachments or implements to front 10a of power unit 10. By way of non-limiting example and with reference to FIGS. 1 and 4, a powered broom 80 engaged with front 10a of power unit 10 by attachment assembly 32. FIGS. 18A and 18B show a snowplow blade 82 engaged with front 10a of power unit 10 by attachment assembly 32. It will be understood that implement 80 may be a number of variable, interchangeable devices such as a snow blower or lifting forks that may include an attachment assembly 32 that allows implement 80 to connect with vehicle frame 84 according to an attachment method discussed later herein. It will be understood that attachment assembly 32 may be modified from the forms shown and described herein to fit the specific implement 80 being used. For the sake of simplicity any and all attachments and implements that may be engaged with front 10a of power unit by attachment assembly 32 will be referred to herein as implement 80.

Referring still to FIGS. 4-15, attachment assembly 32 comprise two main components, namely a hitch and an attachment frame. The hitch is generally indicated at 84 and the attachment frame is generally indicated at 85. Hitch 84 is operatively engaged with front 10a of power unit 10 and is also selectively operatively engaged with attachment frame 85. Attachment frame 85 is operatively engaged with implement 80 that will be utilized to perform a task.

Figure 7:
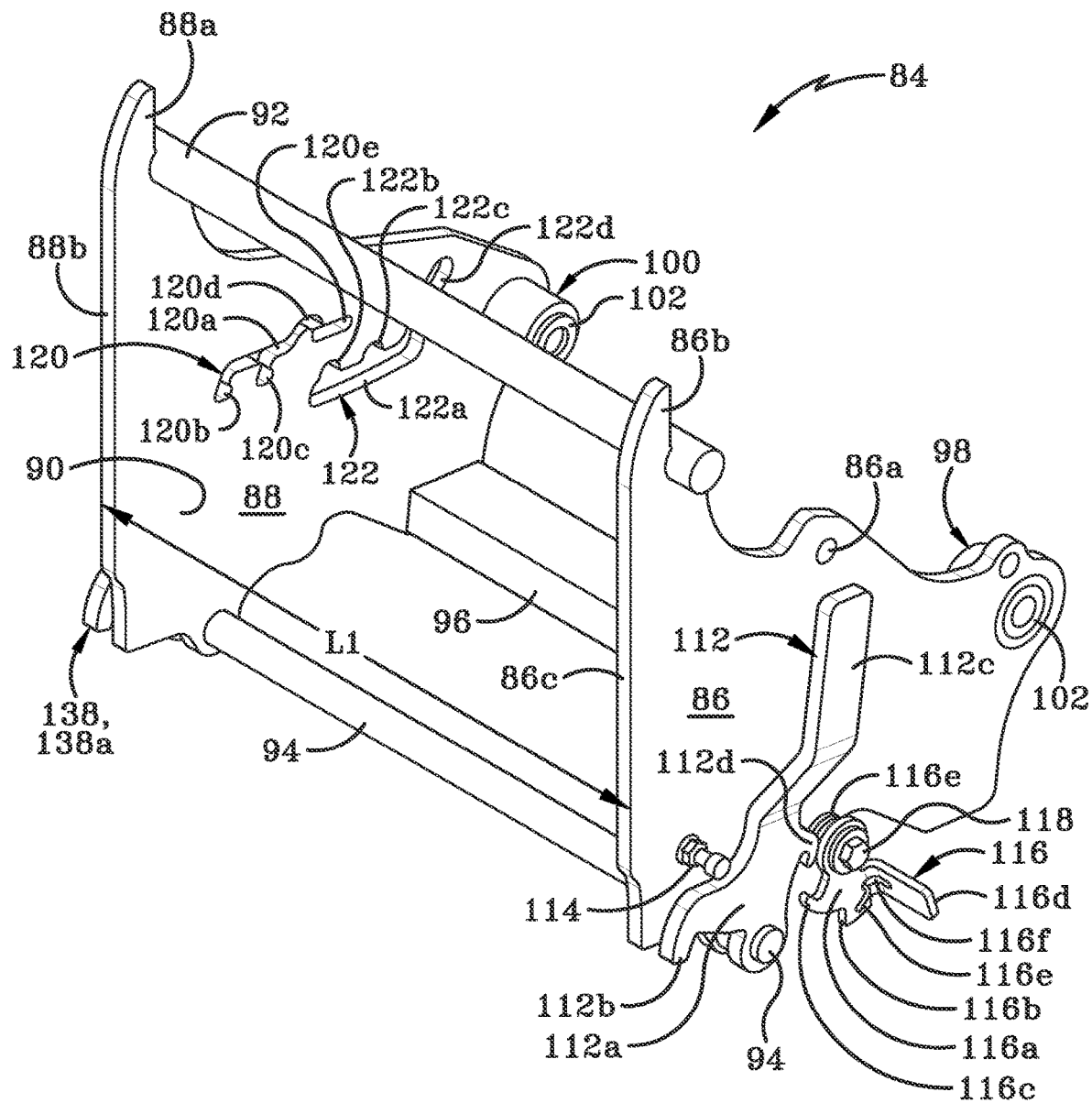
FIG. 7 is a front left perspective view of a hitch of the attachment assembly of FIG. 4 shown on its own.

Hitch 84 of attachment assembly 32 will now be described in greater detail. FIG. 7 that hitch 84 comprises a second side plate 88 and a first side plate 86. First and second side plates 86, 88 are spaced a distance laterally apart from each other such that a space 90 is defined between an interior surface of first side plate 86 and an interior surface of second side plate 88. First and second side plates 86, 88 are held in a spaced-apart relationship by an upper crossbar 108, lower crossbar 94, and rear support member 96. First side plate 86, second side plate 88, upper and lower crossbars 92, 94 and rear support member 96 may be welded together or otherwise secured to each other to form a strong and substantially rigid structure. The upper portion of first side plate 86 terminates in a first hitch tab 86b and the upper portion of second side plate 88 terminates in a second hitch tab 88a. First and second hitch tabs 86b, 88a extend for a distance upwardly beyond upper crossbar 92. The purpose of first and second hitch tabs 86b, 88a will be disclosed later herein. First side plate 86 also includes a front edge 86c and second side plate 88 includes a front edge 88d. Front edges 86c, 88d form the leading ends of hitch 84.

A first hub 98 extends into space 90 from the interior surface of first side plate 86. A second hub 100 extends into space 90 from the interior surface of second side plate 88. First and second hubs 98, 100 are laterally aligned with each other and each may include a spacer or bushing, indicated at 102. A mounting bolt 104 (FIG. 9) may be receive through each bushing 102. Mounting bolts 104 may be utilized to secure hitch 98 to frame 12. Bushings 102 may allow rotation of hitch 84 relative to frame 12 and about an axis extending between the mounting bolts 104 that are received through aligned first hub 98 and second hub 100.

Figure 5:
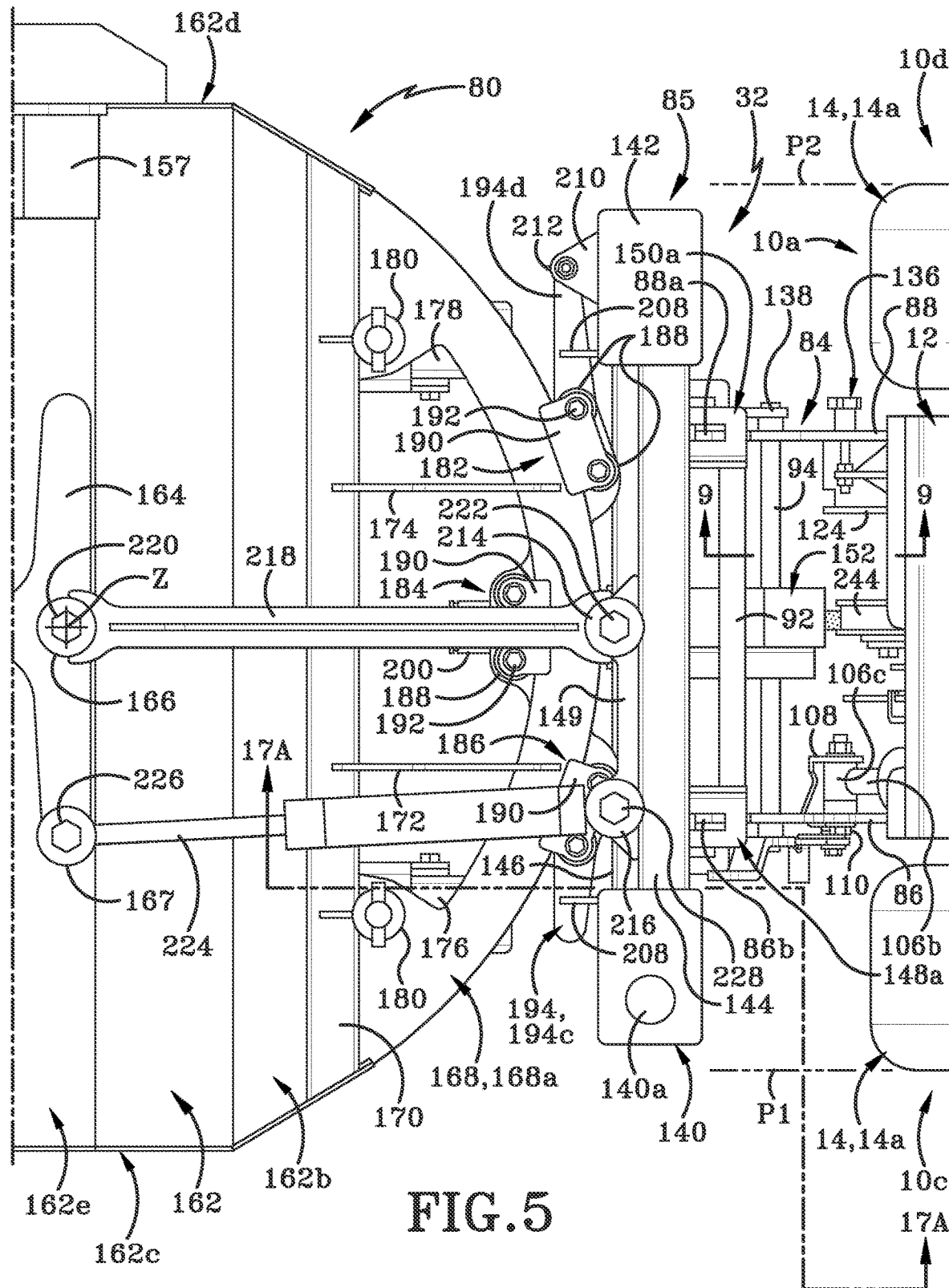
FIG. 5 is a top plan view of the attachment assembly in a neutral position.

Pivotal motion of hitch 84 about the axis extending along mounting bolts 104 may be effected by a hydraulic cylinder 106. A first end of the cylinder 106a may be engaged with a portion of frame 12 and a piston 106b extends outwardly from cylinder 106a and towards hitch 84. A free end of piston 106b is provided with a sleeve 106c (FIG. 5). An opening 86a is defined in first side plate 86 and opening 86a extends between the interior and exterior surfaces of first side plate 86. A mounting bracket 108 (FIG. 5) extends into space 90 from the interior surface of first side plate 86 adjacent opening 86a. An aperture is defined in a portion of mounting bracket 108 that is parallel to the interior surface of first side plate 86. The aperture in mounting bracket 108 is aligned with opening 86a. Sleeve 106c is between the portion of mounting bracket 108 that defines the aperture and the interior surface of first side plate 86. A bore defined within sleeve 106c is aligned with opening 86a and with the aperture in mounting bracket 108. A bolt 110 is passed through the aligned opening 86a, bore, and aperture and a nut (not numbered) secures the bolt 110 in place and thereby secures piston to hitch 84. Bolt 110 may define a pivot axis about hitch 84 may rotate. This arrangement may allow adjustments of hitch 84 in a vertical direction, specifically, lifting of hitch by hydraulic cylinder 106. When piston 106b is extended further outwardly from cylinder 106a, first side plate 86, and therefore hitch 84 is pivoted in a first direction. When piston 106b is retracted inwardly into cylinder 106a, first side plate 86 and therefore hitch 84 is pivoted in a second direction.

Figure 17A:
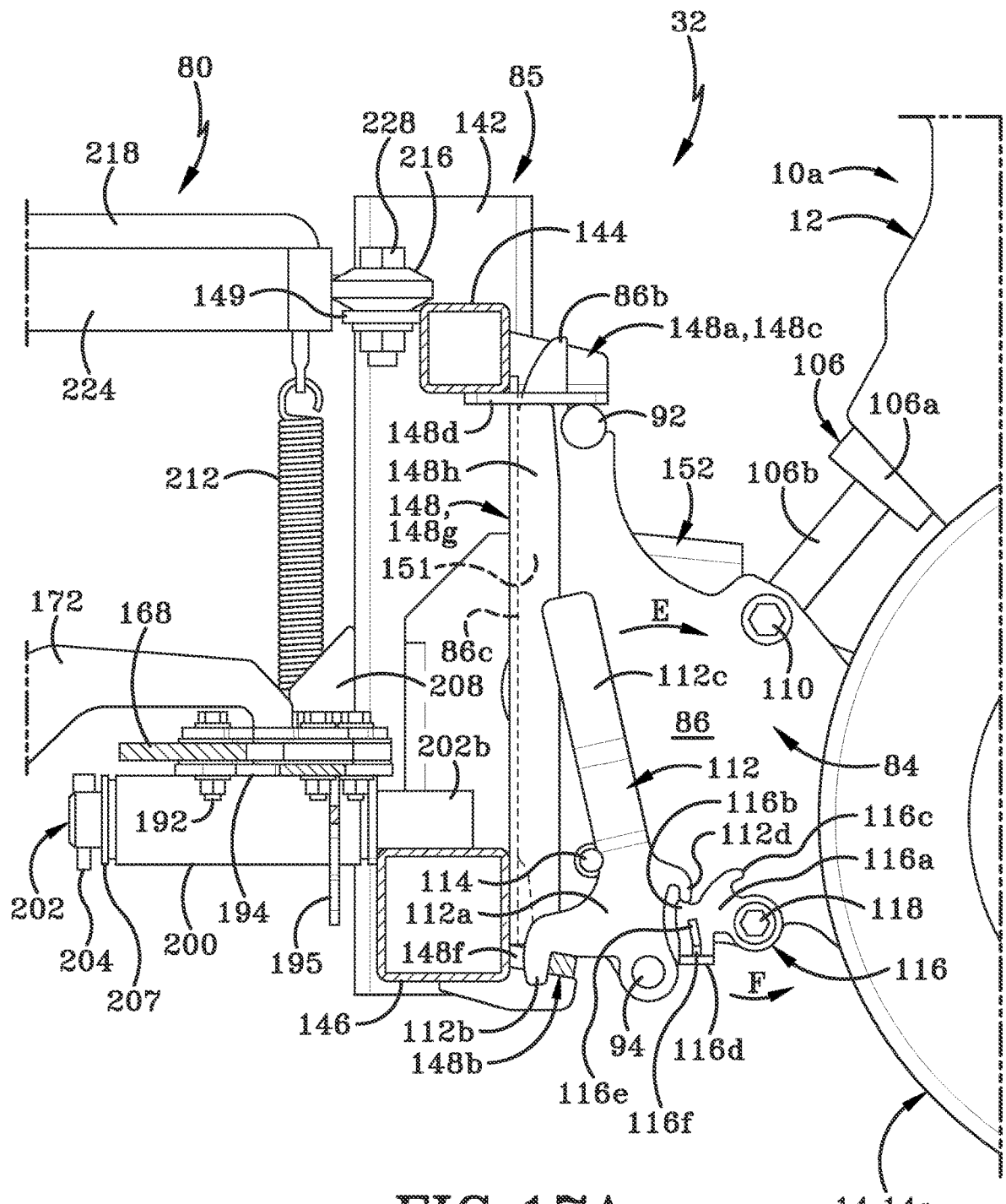
FIG. 17A is a cross-section of the attachment assembly taken along line 17-17A of FIG. 5.
Figure 17B:
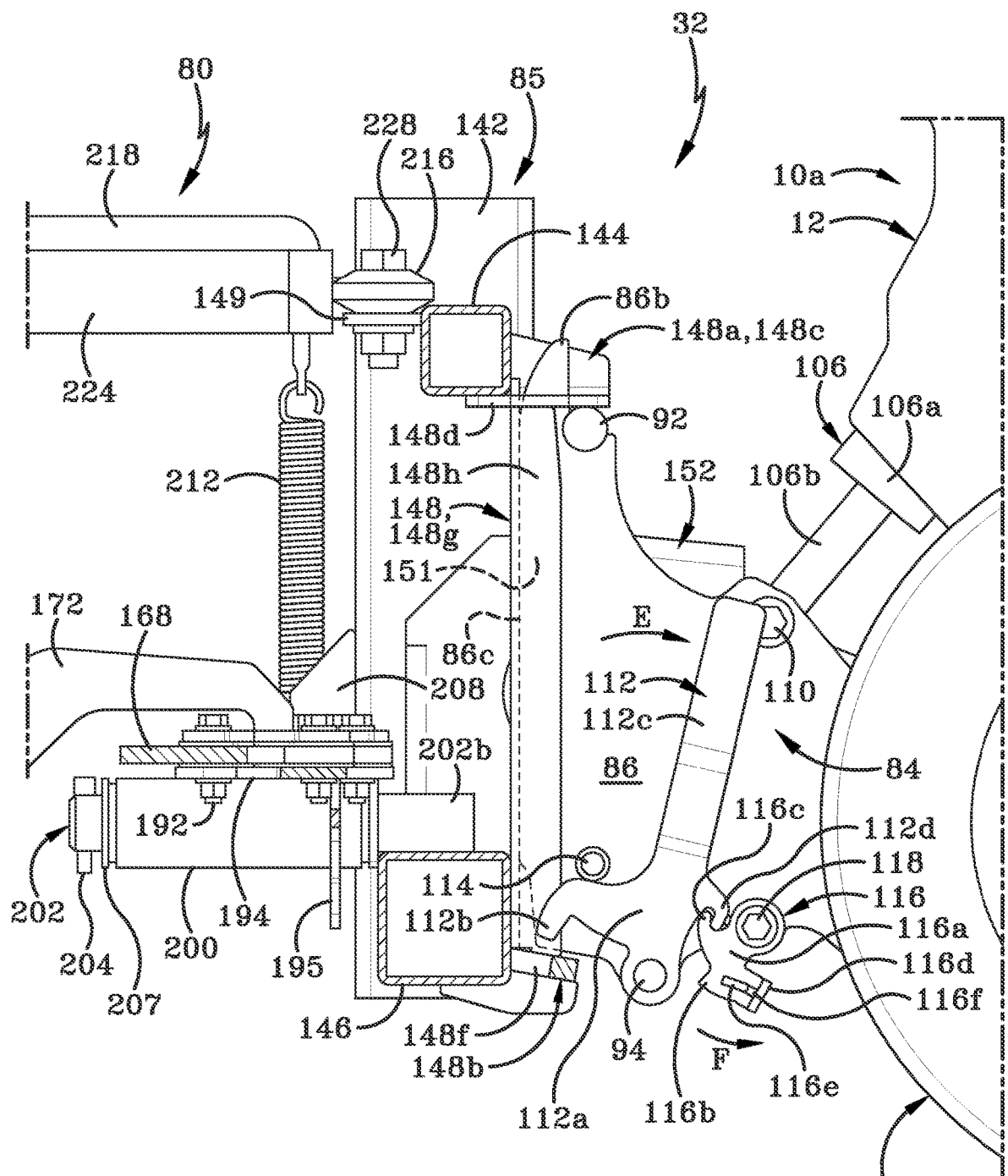
FIG. 17B is a similar view of the attachment assembly as that shown in FIG. 17A showing the attachment latch handle being pulled back into a position where an operator is just beginning to remove the implement engaged with the power unit.
Figure 17C:
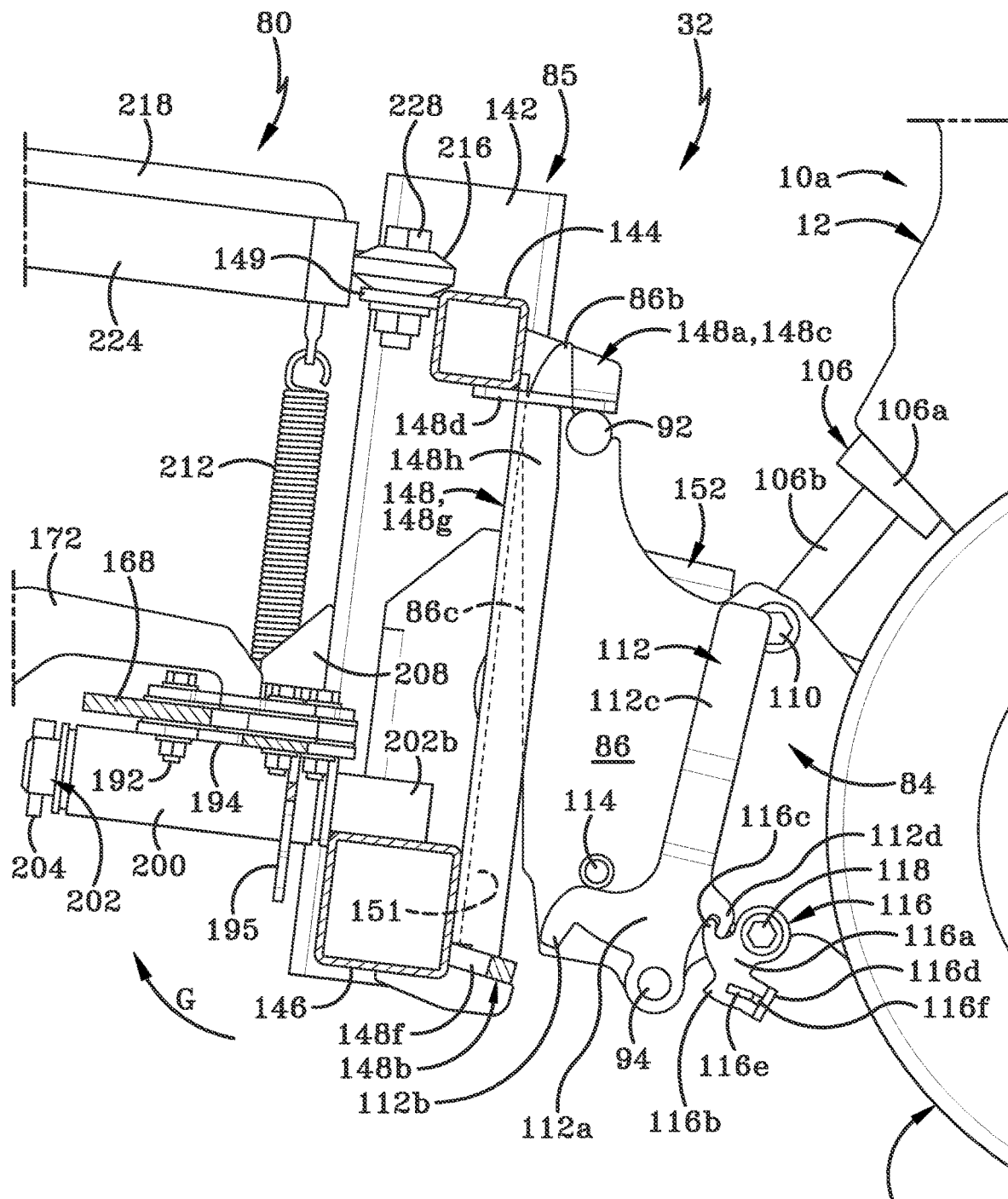
FIG. 17C is a similar view of the attachment assembly as that shown in FIG. 17B showing a lower region of the implement rotating out of the hitch.
Figure 17D:
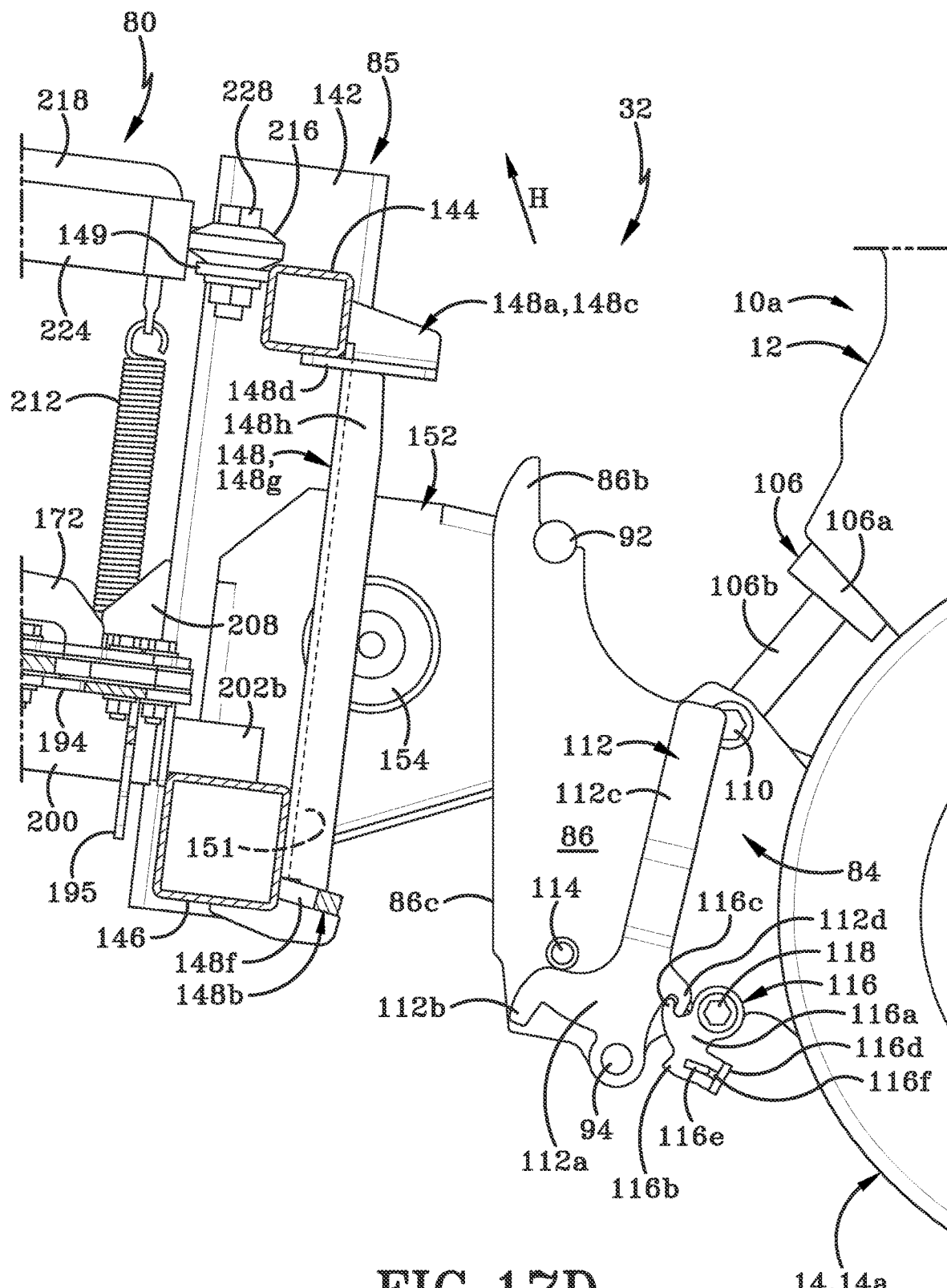
FIG. 17D is a similar view of the attachment assembly as that shown in FIG. 17C showing the implement being lifted off the hitch.

Referring still to FIGS. 4-15, hitch 84 further includes an attachment latch handle 112 that is best seen in FIGS. 7 and 17A. Attachment latch handle 112 is located adjacent an exterior surface of first side plate 86 and is pivotally secured thereto by way of lower crossbar 94. Lower crossbar 94 defines a pivot axis about which attachment latch handle 112 may rotate. In particular, attachment latch handle 112 is rotatable between a latched position (FIG. 17A) and an unlatched position (FIG. 17B). A stop 114 extends outwardly from the exterior surface of first side plate 86 to limit the pivotal motion of attachment latch handle 112.

Referring to FIG. 17A, attachment latch handle 112 includes a body 112a that has a leading lower end shaped into a first hook 112b. The first hook 112b forms a first latch for engagement of hitch 84 with attachment frame 85. A handle 112c extends upwardly and outwardly from body 112a. Handle 112c may have a portion thereof that angles slightly outwardly from first side plate 86 so that an operator may readily grasp handle 112 to manipulate the same. A trailing lower end of body 112a is shaped into a second hook 112d that forms a lock tab. The first latch that is comprised of the first hook will be referred to hereafter by the reference number 112b. The lock tab that is comprised of the second hook will be further referred to hereafter by the reference number 112d.

Figure 4:
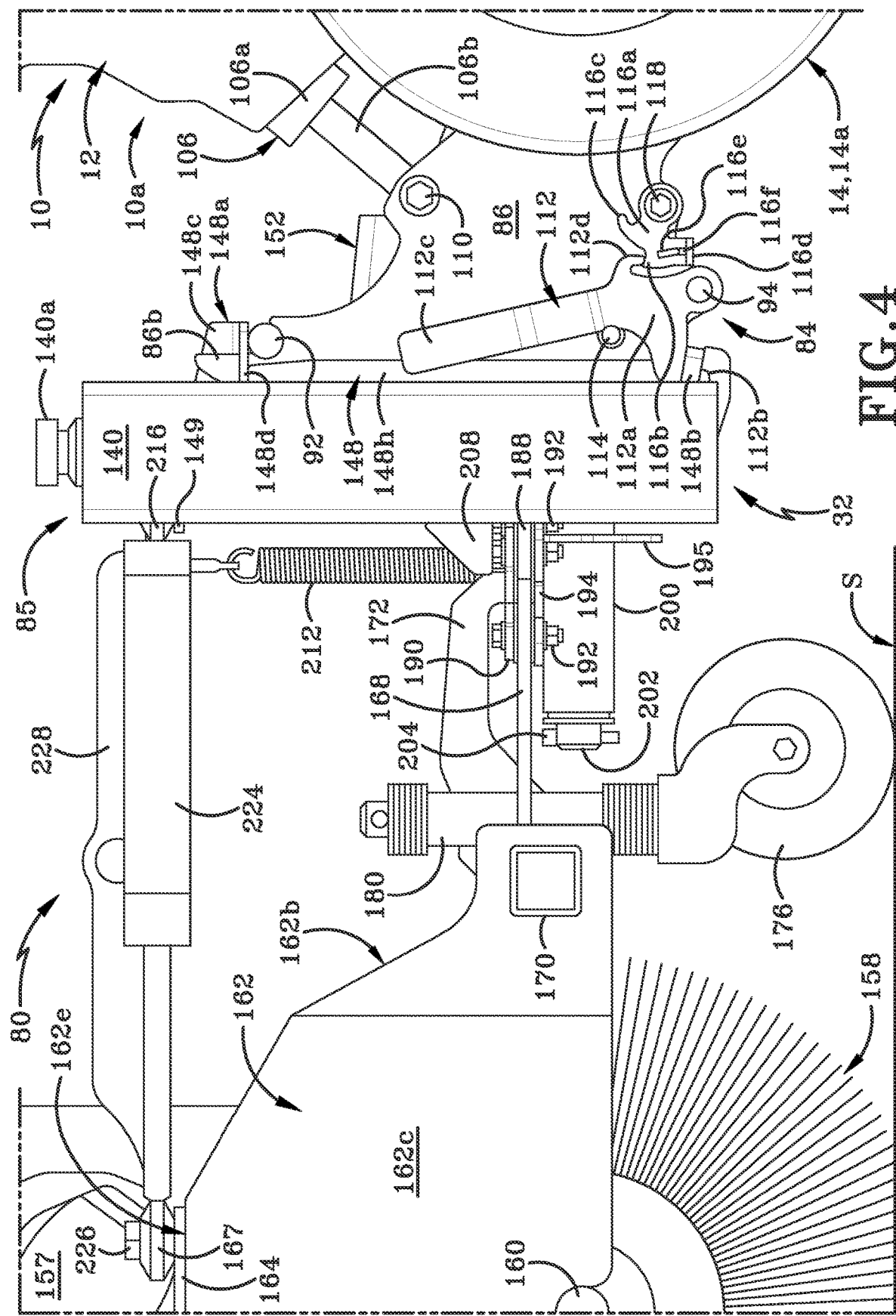
FIG. 4 is a partial, enlarged left side elevation view of a front end of the power unit of FIG. 1, showing an attachment assembly in accordance with an aspect of the present disclosure.

Hitch 84 may include a locking member that holds attachment latch handle 112 in the unlatched position and in the latched position. The locking member comprises lock tab 112d on the attachment latch handle 112 and a handle lock 116 that is located rearwardly of attachment latch handle 112 on first side plate 86. Handle lock 116 has a body 116a that is pivotally engaged with first side plate 86 by way of a bolt 118. Body 116a includes a first lock member 116b, a second lock member 116c, and a release arm 116d. Each of the first lock member 116b and second lock member 116c is configured to selectively engage lock tab 112d on attachment latch handle 112 but first lock member 116b is configured to contact a different portion of lock tab 112d than is second lock member 116c. Handle lock 116 also includes a spring 116e (FIG. 7). A section of spring 116e extends through an aperture 116f defined in body 116a. Spring 116e biases handle lock 116 in a clockwise direction so that handle lock 116 is urged to maintain attachment latch handle 112 into a latched position that is shown in FIG. 4.

First lock member 116b comprises a slightly curved shoulder region of handle lock 116 that may be brought into contact with a terminal end of the hook shape of lock tab 112d. This is shown in FIG. 17A. When the curved shoulder region of first lock member 116b contacts the terminal end of lock tab 112d, attachment latch handle 112 is prevented from rotating in the direction indicated by arrow "E" in FIG. 17A by the handle lock 116. Attachment latch handle 112 is thereby locked in the latched position by handle lock 116. Attachment latch handle 112 would theoretically still be able to rotate in the opposite direction to arrow "E" except that an inside edge of handle 112c contacts stop 114 extending outwardly from first side plate 86. Stop 114 prevents rotation of attachment latch handle 112 in the opposite direction to arrow "E".

In order to release attachment latch handle 112 from the locked position, handle lock 116 must be rotated in the direction indicated by arrow "F" in FIG. 17A. Rotation in the direction "F" moves first lock member 116b downwardly and away from the terminal end of lock tab 112d. Attachment latch handle 112 is then able to rotate in the direction of arrow "E". Rotation in the direction "F" is made possible by an operator physically pushing on release arm 116d and causing handle lock 116 to move in the direction "F".

Second lock member 116c of handle lock 116 is shaped like a hook and is configured to interlock with the hook-shape of lock tab 112d. FIG. 17B shows the attachment latch handle 112 rotating in the direction of arrow "E". This is made possible because handle lock 116 has been physically rotated in the direction of arrow "F as described above and this has caused first locking member 116b to pivot downwardly and away from lock tab 112d. Rotation of handle lock 116 in the direction of arrow "F" is continued until the hook shape of second lock member 116c slides past the terminal end of lock tab 112d and then into the space between the hook shape and the rest of body 112a. When second lock member 116c is interlocked with lock tab 112, then attachment latch handle 112 is able to rotate in the direction of arrow "E" until first latch 112b contacts stop 114. Rotation in the opposite direction to arrow "E" is prevented by second lock member 116c being interlocked with lock tab 112d. Handle lock 116 therefore holds attachment latch handle 112 in the unlatched position.

Hitch 84 may further form a part of a weight transfer system 34 provided on power unit 10. Weight transfer system 34 may allow for varying amounts of the weight of the implement 80 to be transferred from implement 80 and onto power unit 10 rather than that weight being carried by implement 80. The degree to which weight is to be transferred to the power unit 10 may be selected by the operator manipulating controls on control panel 24, as will be discussed later herein. The transfer of weight from the attachment to power unit 10 may help to improve traction of power unit 10 as it moves through snow by placing more weight on front wheels 14a. In addition, because more weight is carried by power unit 10, less force is placed on the skid shoes of implement 80. This tends to reduce wear on the skid shoes and helps power unit 10 move over bumps and cracks in the surface "S" over which power unit 10 travels.

Referring to FIGS. 7-10, weight transfer system 34 includes a first slot 120 defined in second side plate 88. First slot 120 extends between an interior surface and an exterior surface of second side plate 88 and includes a first leg 120a that is generally horizontally oriented. Starting at a forward-most end and moving rearwardly, at a front end, first slot 120 includes a first arm 120b that is generally vertically oriented, a second arm 120c that is generally vertically oriented and located a distance rearwardly of first arm 120b, a rise 120d that is located a distance rearwardly of second arm 120c, and at a rearmost end, a generally horizontally-oriented third arm 120e.

Weight transfer system 34 also includes a second slot 122 that is defined in second side plate 88 a distance vertically downwardly from and rearwardly relative to first slot 120. Second slot 122 extends between the interior and exterior surfaces of second side plate 88. Second slot 122 includes a generally horizontally-oriented leg 122a and, moving from a forwardmost end to a rearmost end, second slot 122 also includes a first recess 122b, a second recess 122c, and an arm 122d. First and second recesses 122b, 122c are located along an uppermost edge of leg 122a. Arm 122d angles upwardly away from leg 122a and curves slightly as it does so.

Figure 9:
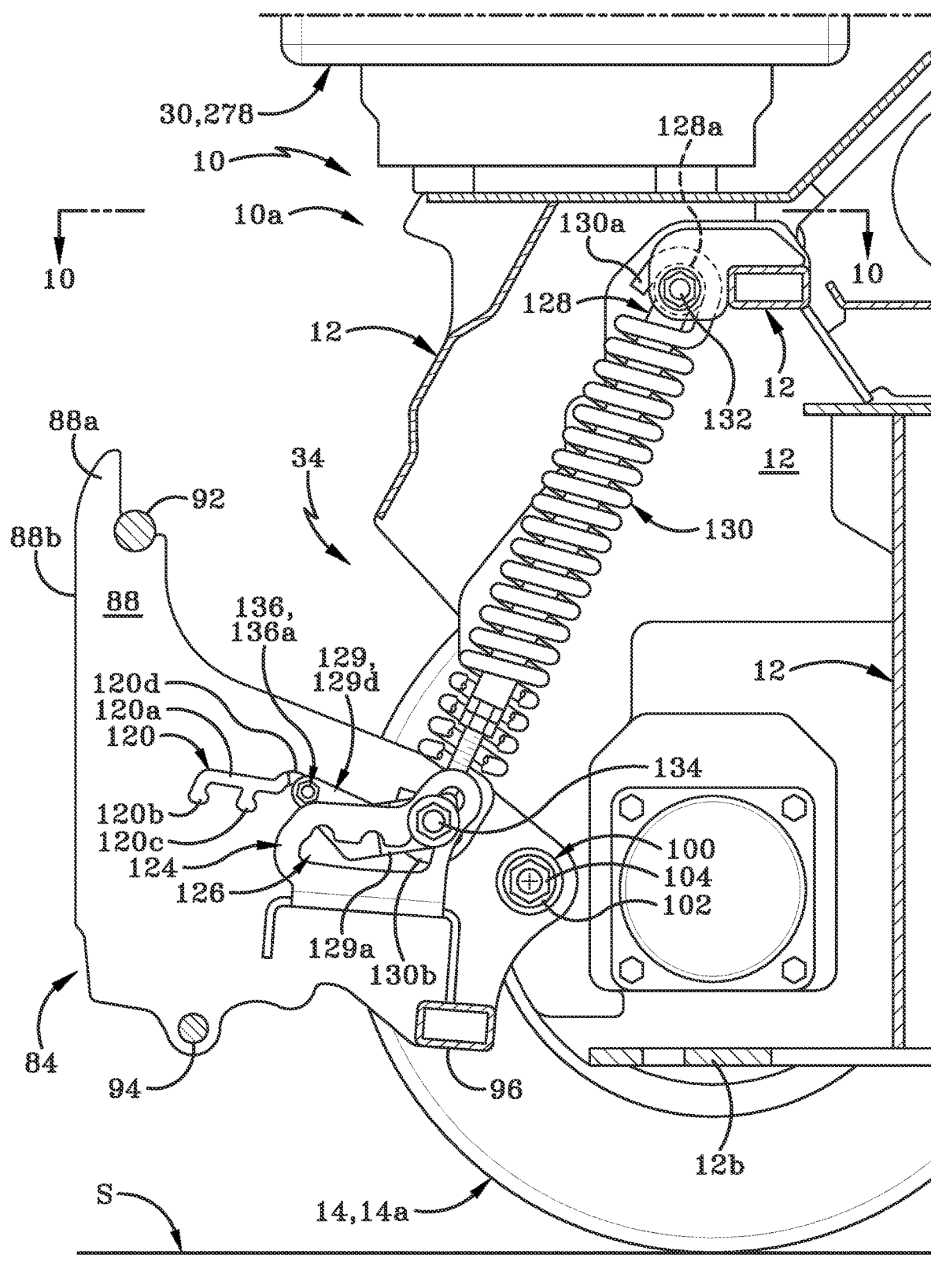
FIG. 9 is an enlarged left side elevation view of a weight transfer mechanism taken along line 9-9 of FIG. 5.
Figure 10:
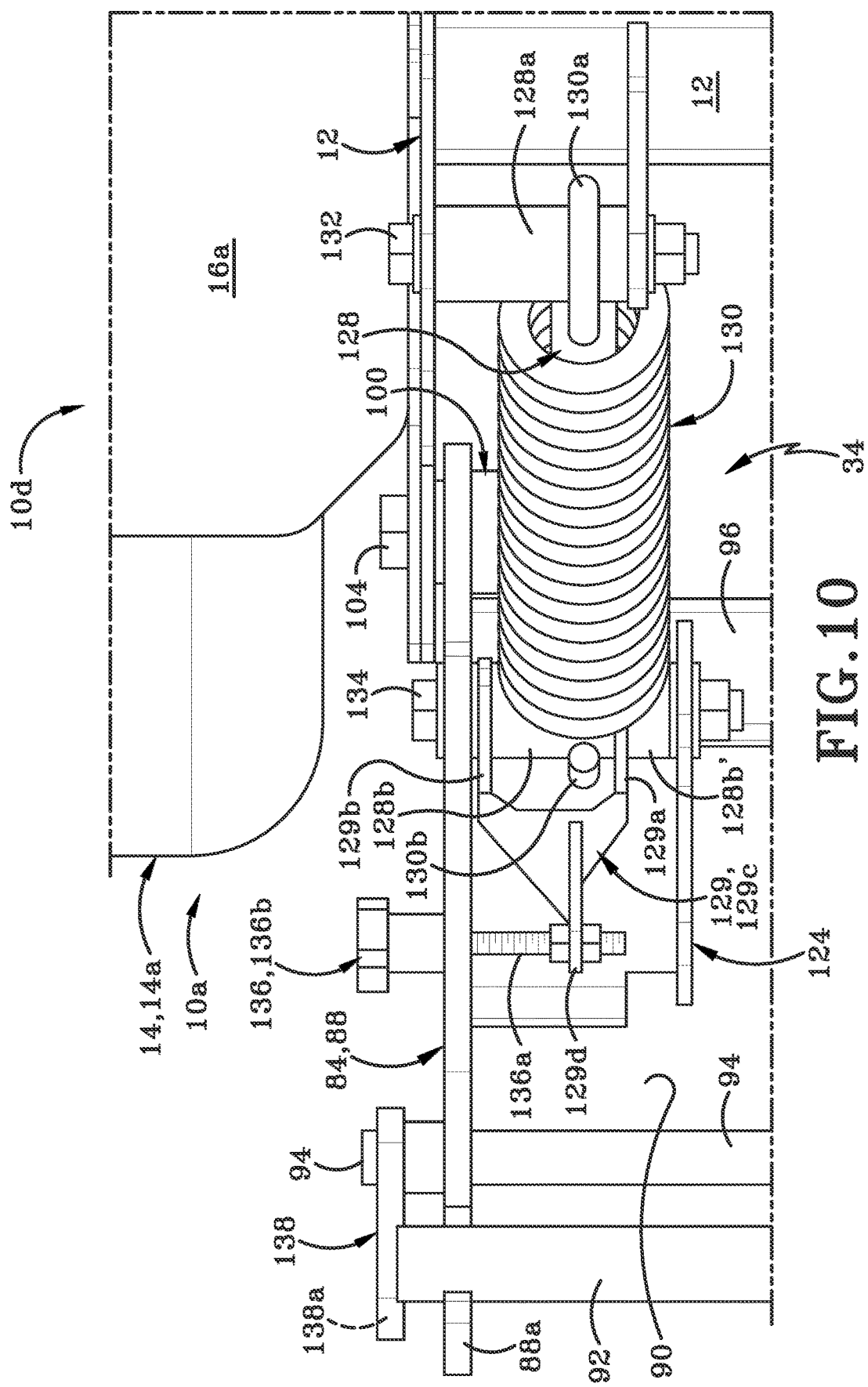
FIG. 10 is a top plan view of the weight transfer mechanism taken along line 10-10 of FIG. 9.

As best seen in FIGS. 9 and 10, a bracket 124 extends outwardly from the interior surface of second side plate 88. Bracket 124 defines a slot 126 therein that is substantially identical to and aligned with second slot 122. As such, slot 126 includes a generally horizontally-oriented leg 126a and, moving from a forwardmost end to a rearmost end, slot 126 also includes a first recess 126b, a second recess 126c, and an arm 126d. First and second recesses 126b, 126c are located along an uppermost edge of leg 126a. Arm 126d angles upwardly away from leg 126a and curves slightly as it does so.

Weight transfer system 34 further includes at least one shaft 128 (FIGS. 9 and 10) that is pivotally mounted to frame 12 and has a first end 128a and a second end 182b. The at least one shaft 128 is configured to engage a bracket 129. Bracket 129 includes a first plate 129a that is laterally spaced from a second plate 129b. Plates 129a, 129b are generally parallel to each other and extend outwardly from a base plate 129c in a first direction. Base plate 129c may be generally triangular when viewed from above. A flange 129d extends outwardly from base plate 129c in an opposite direction to plates 129a, 129b. Flange 129d is located intermediate plates 129a, 129b. When viewed from a side (such as in FIG. 9), bracket 129 has a generally "open-L" shape. Each of the plates 129a, 129b define a hole there and these holes are aligned with each other. Flange 129d also defines a holes therein.

The at least one shaft 128 is inserted through a compression spring 130 that has a first end 130a and a second end 130b. A first end of the at least one shaft 128 includes a first sleeve 128a having a bore defined therein. A fastener 132 passes through a bore of the first sleeve 128a and secures the first end 128a of the at least one shaft 128 between two parts of frame 12. Hook 130a at the first end of spring 130 is passed around a portion of the circumference of first sleeve 128a. The second end 128b of the at least one shaft 128 includes a second sleeve 128b. Sleeve 128b defines a bore therein. A fastener 134 is inserted through a portion of slot 126 in second side plate 88, through plate 192b, through the bore of second sleeve 128b, through plate 192a, through a bore of a spacer 128b' and through a portion of second slot 122 in bracket 124 to secure sleeve 128b to bracket 124 and to second side plate 88. Hook 130b at the second end of spring 130 passes around a portion of the circumference of second sleeve 128b.

An adjustment bolt 136 is inserted through the hole defined in flange 129d and is utilized to secure flange 129d to second side plate 88. A shaft 136a of adjustment bolt 136 extends through a portion of first slot 120 and through the hole (not shown) defined in flange 129d. Appropriate washers and nuts secure adjustment bolt 136 in place. Adjustment bolt 136 includes a knob 136b. Knob 136b may be rotated in a first direction when it is desired to transfer weight from implement 80 and onto power unit 10. Rotating knob 136b in the first direction releases adjustment bolt 136 to travel along first slot 120. The actuation of weight transfer system 34 will be later described herein. When actuated however, fastener 134 is able to move along the aligned second slot 122 and slot 126 and therefore the orientation of the at least one shaft 128 is changed. In a first position, fastener 134 may be located in the aligned first recesses 122b, 126b. In a second position, fastener 134 may be located in the aligned second recesses 122c, 126c. In a third position, fastener 134 may be located somewhere along the aligned arms 122d, 126d. As fastener 134 travels along the aligned second slot 122 and slot 126, adjustment bolt 136 travels along first slot 120. For example, when fastener 134 is in the third position, adjustment bolt 136 is located in third arm 120e of first slot 120. When fastener 134 is in the second position, adjustment bolt 136 is located in second arm 120c. When fastener 134 is in the first position, adjustment bolt 136 is located in first arm 120b.

In each instance, when fastener 134 is placed in a desired one of the first second or third positions, the adjustment knob 136b is rotated in a second direction to lock adjustment bolt 136 in place and thereby prevents further movement of adjustment bolt 136 in first slot 120. When movement of adjustment bolt 136 in first slot 120 is stopped by rotating adjustment knob 136b in the second direction, then movement of fastener 132 along second slot 122 and slot 126 is halted. It should be noted that wherever fastener 134 is located along slots 122, 126, fastener 134 is the pivot axis for rotation of hitch 84. Spring 130 helps to support hitch 84 and keep the same balanced and leveled during operation of implement 80.

As indicated earlier herein, the weight transfer system 34 may allow the weight of an installed implement 80 to be shifted rearwardly towards the rear 10b of power unit 10, placing more weight over the front wheels 14a. This rearward transfer of weight helps to increase traction of front wheels 14a while in operation and also helps to shift the center of gravity of power unit 10 rearwardly, thereby making power unit 10 more balanced during operation.

Figure 8:
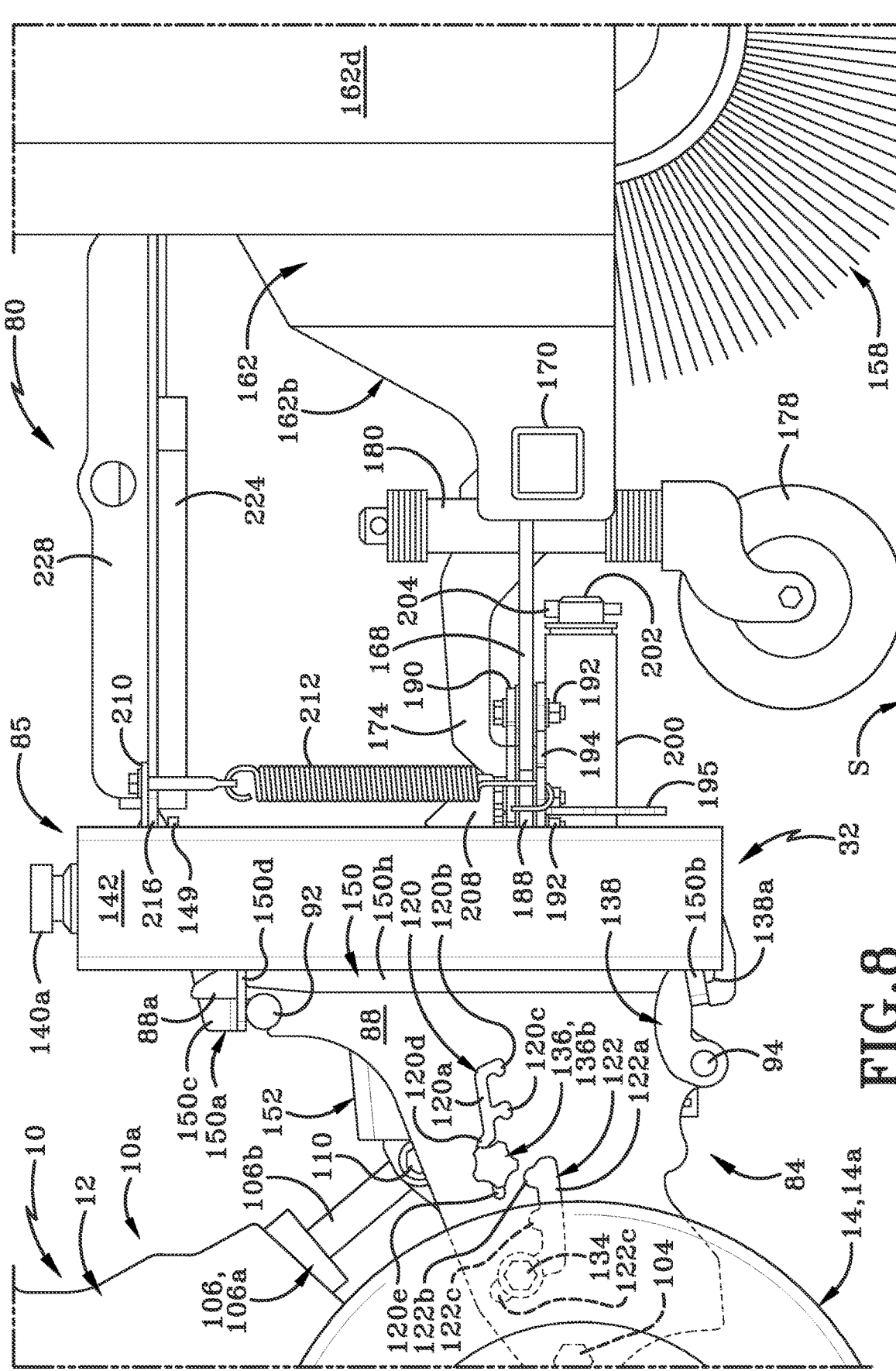
FIG. 8 is a right side elevation view of the attachment assembly shown in FIG. 4.

FIGS. 7 and 8 shows an arm 138 positioned adjacent an exterior surface of second side plate 88. Arm 138 is pivotally secured to second side plate 88 by lower crossbar 94. A leading end of arm 138 is shaped into a hook that is substantially similar or identical to the hook on adjustment latch handle 112 that forms first latch 112b. The leading end of arm 138 therefore comprises a second latch 138a on hitch 84. First and second latches 112b, 138a are utilized to operatively engage attachment frame 85 as will be later described herein.

With reference to FIGS. 4-15, attachment frame 85 may include a first upright member 140 and a second upright member 142 that are spaced apart and therebetween define a transverse direction. First and second upright members 140, 142 may be fixedly separated by an upper cross-member 144 and a lower cross-member 146 that are vertically spaced apart from each other.

According to one aspect, one or more of first upright member 140, second upright member 142, upper cross-member 144, and lower cross-member 146 may form a sealed storage system that may be utilized as fluid tanks. According to this aspect, one or more of first or second upright member 140, 142 or upper cross-member 144 may include a fill spout and cap 140a. Cap 140a may be removed to allow fluid to be adding to the sealed storage system. According to this aspect, in instances where one or more frame members are utilized as a fluid tank, one or more hoses may be operationally attached thereto for delivery of fluid to the appropriate systems as chosen by a person of skill according to the desired application of power unit 10. These hoses are omitted from the drawings, but may include hydraulic hoses, fuel hoses, or water hoses depending on the fluid carried in the fluid tank. The hoses may be high pressure hoses, or any other hose as chosen by a person of skill in the art.

Attachment frame 85 may further include a first support member 148 and second vertical support member 150. First vertical support member 148 may include a first upper hitch plate 148a and a first lower hitch plate 148b. First upper hitch plate 148a may be located proximate upper cross-member 144 and first lower hitch plate 148b may be located proximate lower cross-member 146. First upper hitch plate 148a may be a generally L-shaped bracket that includes a generally vertical leg 148c and a generally horizontal leg 148d. First upper hitch plate 148a may be oriented such that vertical leg 148c is located closest to second support member 150. Horizontal leg 148d defines a slot 148e therein that extends from an upper surface of leg 148d to a lower surface thereof. Slot 148e is shaped and sized to permit first hitch tab 86b to be received therethrough.

First lower hitch plate 148b may be generally rectangular in shape and may be angled slightly downwardly from horizontal. First lower hitch plate 148b may define a slot 148f therein that extends between an upper surface and a lower surface of first lower hitch plate 148b. Slot 148f may be shaped and sized so as to be able to receive first latch 112b therein when hitch 84 and attachment frame 85 are engaged with each other.

First vertical support member 148 further includes a rearwardly facing surface 148g and an interior side surface 148h. The relevance of surfaces 148g and 148h will be discussed later herein.

Second vertical support member 150 may include a second upper hitch plate 150a and a second lower hitch plate 150b. Second upper hitch plate 150a may be located proximate upper cross-member 144 and second lower hitch plate 150b may be located proximate lower cross-member 146. Second upper hitch plate 150a may be a generally L-shaped bracket that includes a vertical leg 150c and a horizontal leg 150d. Second upper hitch plate 150a may be oriented such that vertical leg 150c is located closest to first support member 148. Horizontal leg 150d defines a slot 150e therein that extends from an upper surface of leg 150d to a lower surface thereof. Slot 150e is shaped and sized to permit second hitch tab 88a to be received therethrough.

Second lower hitch plate 150b may be generally rectangular in shape and may be angled slightly downwardly from horizontal. Second lower hitch plate 150b may define a slot 150f therein that extends between an upper surface and a lower surface of second lower hitch plate 150b. Slot 150f may be shaped and sized so as to be able to receive second latch 138a therein when hitch 84 and attachment frame 85 are engaged with each other.

Figure 11:
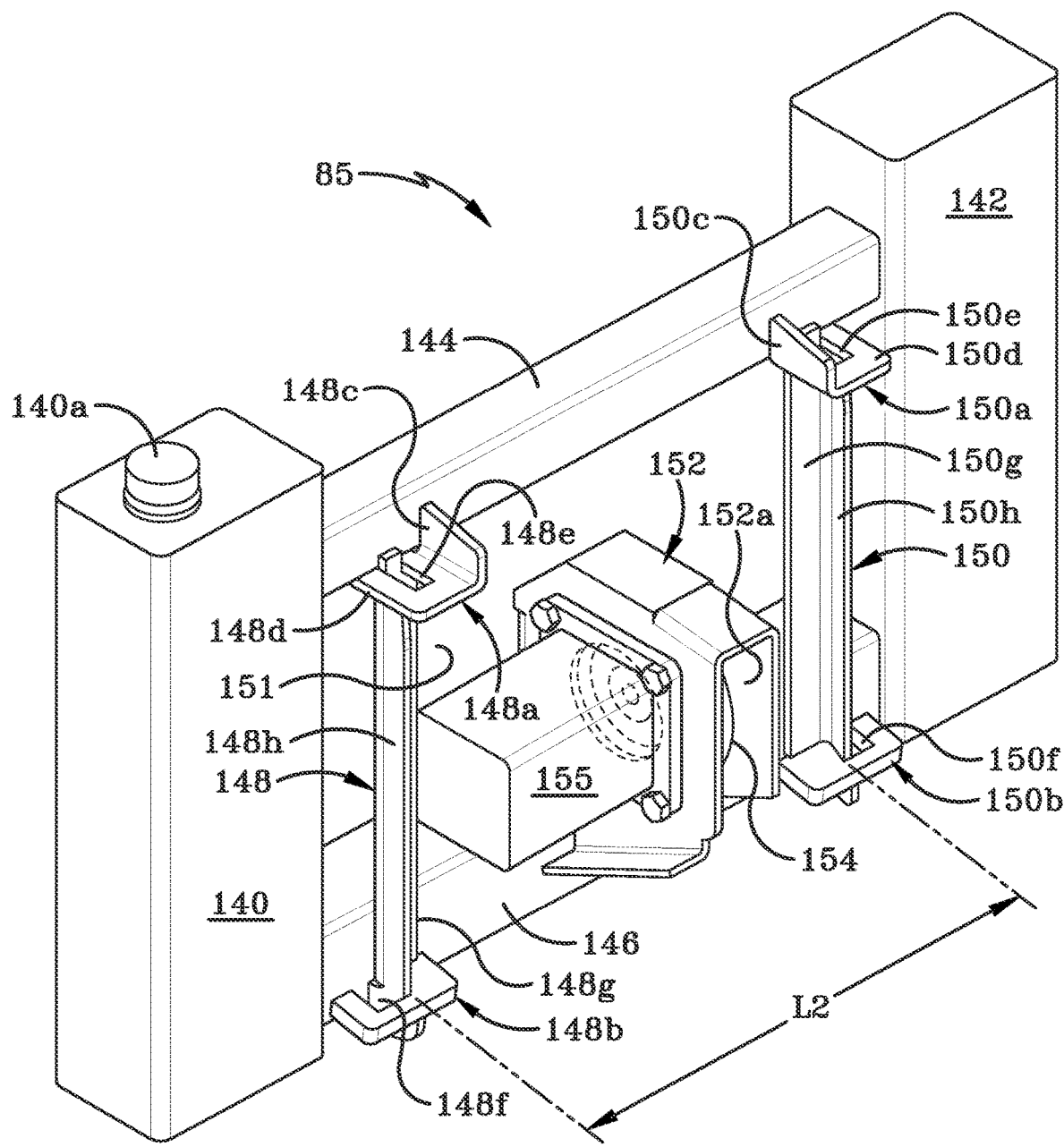
FIG. 11 is a rear left perspective view of an attachment frame of the attachment assembly shown on its own.

Second vertical support member 150 further includes a rearwardly facing surface 150g and an interior side surface 150g. Interior side surface 150g is laterally spaced apart from interior side surface 148g of first vertical support member 150. A space 151 (FIG. 11) is defined between interior side surface 148g and interior side surface 150g. As shown in FIG. 7, an exterior surface of first side plate 86 of hitch 84 is spaced a distance "L1" apart from an exterior surface of second side plate 88. As shown in FIG. 11, interior side surface 148g is spaced a distance "L2" apart from interior side surface 150g. Distance "L2" is slightly larger than distance "L1". When hitch 84 engages attachment frame 85, a front end of hitch 84 is nested into space 151 and is received between interior side surfaces 148g, 150g. This nesting between the hitch 84 and attachment frame 85 helps ensure lateral stability in the engagement and helps ensure that the two component remain aligned with each other at all times when they are engaged and reduces the tendency of the attachment frame 85 to twist out of engagement with hitch 84 during operation of implement 80. It will be understood that in other examples, hitch 84 and attachment frame 85 may be configured such that the first and second vertical mounts 148, 150 may nest between the interior surfaces of first and second side plates 86, 88 of hitch 84.

As best seen in FIG. 11, a pulley housing 152 may be provided on attachment frame 85. In particular, pulley housing 152 may be provided on lower cross-member 146 in a location between first and second upright members 140, 142. Pulley housing 152 may extend outwardly and rearwardly from lower cross-member 146. A pulley 154 may be mounted for rotation within pulley housing 152. A pump 155 is mounted on pulley housing 152 as shown in FIG. 11, or is mounted adjacent to pulley housing 152. Pump 155 is operatively engaged with a hydraulic motor 157 (FIG. 1) provided on implement 80. Pump 155 may further be operatively engaged with attachment frame 85 and specifically may be connected by hoses to the fluid tanks that are provided by one or more of first upright member 140, second upright member 142, upper cross member 144, and lower cross member 146.

In one aspect, the pulley 154 may be arranged so as to be rotatable about an axis that is oriented at right angles to longitudinal axis "Y" of power unit 10. Pulley housing 152 defines an opening 152a through which an attachment belt 156 enters and exits pulley housing 152. Attachment belt 156 is one of two drive belts provided on power unit 10 as disclosed herein. Attachment belt 156 (FIGS. 5 and 16) wraps around a portion of the circumference of pulley and when attachment belt 156 moves (as will be described later herein), pulley 154 is rotated about its rotational axis. Pulley housing 152, pulley 154, and attachment belt 156 may form a part of power transfer system 36. Specifically, pulley housing 152, pulley 154, and attachment belt 156 may form a part of an attachment belt-drive system that is part of the power transfer system 36. Pulley 154 is operationally connected to one or more of a pump 155 (either a hydraulic pump or an electric pump), a motor 157, or the like provided on implement 80 and the rotating pulley 154 powers the one or more of the pump 155 and motor 157. The operation of pulley 154 and attachment belt 156 is discussed further herein with reference to the power transfer system 36.

In order to describe the other components that form part of attachment assembly 85, implement 80 is described in greater detail. FIGS. 1-15 show that implement 80 is a powered broom. Powered broom 80 may comprise a brush wheel 158 that may extend transversely across power unit 10. Brush wheel 158 is mounted for rotation about an axle 160. Rotation of the brush wheel 158 may be controlled by an electric motor, a hydraulic motor, or any other means as chosen by a person of skill. The electric motor, hydraulic motor or other means of powering powered broom 80 may be dedicated to powering broom 80. Alternatively, the engine 26 may be operatively engaged with powered broom 80 to power the same.

Powered broom 80 may further include a housing 162 that may contain and partially surround brush wheel 158. Housing 162 has a front end 162a, a rear end 162b, a left side 162c, and a right side 162d. Brush wheel 158 is mounted within housing 162 such that a portion thereof extends downwardly below a bottom edge of housing 162. Housing 162 serves several purposes including protecting brush wheel 158, mounting axle 160, and directing debris, such as snow and ice, forward and away from power unit 10 when powered broom 80 is in operation.

Housing 162 may also serve as the forward-most portion 80a (FIG. 1) of attachment and provides a base upon which several other components are mounted or in which other components are housing. Housing 162 made include a mounting reinforcement plate 164 (FIG. 5) that includes a first mounting point 166 and a second mounting point 167. A top of housing 162 may include a mounting reinforcement plate 165 that includes a first forward mounting point 166 and a second forward mounting point 167. Mounting reinforcement plate 164 may be fixedly attached to the top 162e of housing 162 to provide additional structural strength and support. First forward mounting point 166 may be engaged centrally on housing 162 to serve as a central pivot point for turning implement 80 to the left or to the right. Second forward mounting point 167 may be offset from first forward mounting point 166. According to one aspect, second forward mounting point 167 may be offset to the left of first forward mounting point 166, when viewed mounting reinforcement plate 164 is viewed from above.

Implement 80 further includes an attachment frame 168 that includes an arcuate frame member 168, a crosspiece 170, and left and right support ribs 172, 174. Arcuate frame member 168 may be generally C-shaped when viewed from above and crosspiece 170 extends across an opening to the C-shape. Crosspiece 170 may extend in a transverse direction across the rear of housing 162 and may be fixedly attached to housing 162 thereby providing additional structural support thereto and serving as an attachment point for arcuate frame member 168. According to one aspect, housing 162, crosspiece 170 and arcuate frame member 168 may be welded together to form a single unit. As best seen in FIG. 8, the housing 162, arcuate frame member 168, and crosspiece 170 may be arranged in a generally semi-circular shape. An opening to the semi-circle may face forward in the direction of travel of power unit 10 when the power unit is moving in the direction indicated by arrow "A" in FIG. 1. Left and right support ribs 172, 174 may be laterally spaced apart from each other and extend in a longitudinal direction between arcuate frame member 168 and crosspiece 170 Support ribs 172 and 174 help strengthen the connection between arcuate frame member 168 and crosspiece 170 and may also serve as rotational limits for arcuate frame member 168 as will be discussed in the operational section below. Attachment frame 168 may further include a left gauge wheel 176 and right gauge wheel 178 that may be selectively adjusted to vary the operating height of implement 80. Left and right gauge wheels 176, 178 may be detachably engaged with arcuate frame member 168 via connectors 180 (FIG. 5). This attachment may allow for height adjustment and pivoting of gauge wheels 176, 178 as necessary for proper operation of implement 80. The left and right ends of arcuate frame member 168 may be elongated to accommodate the mounting of gauge wheels 176, 178.

Figure 6:
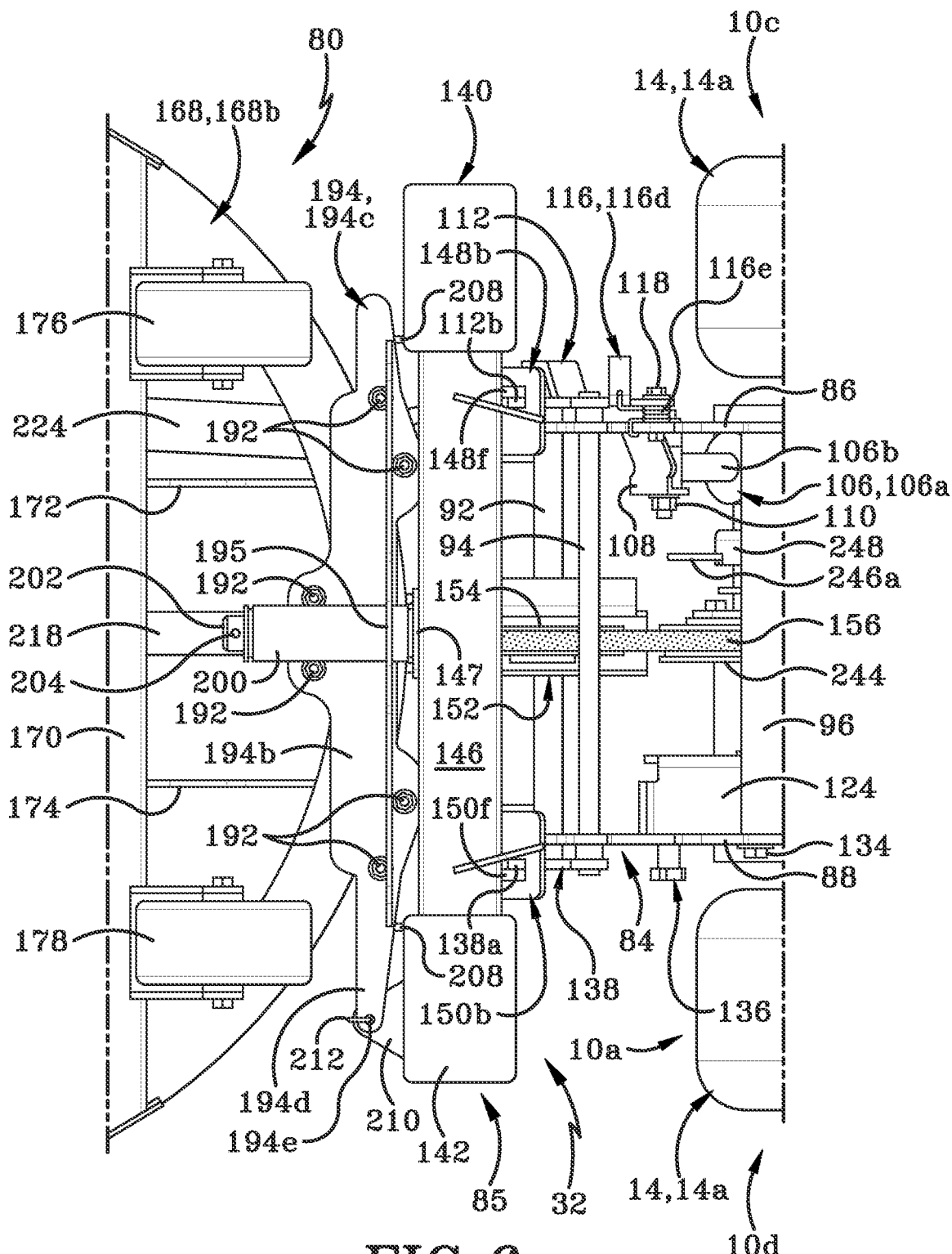
FIG. 6 is a bottom plan view of the attachment assembly.

With reference to FIGS. 5 6, and 12-15, arcuate frame member 176 may further include a first bearing mount 182, a second bearing mount 184, and a third bearing mount 186. Each of the first, second, and third bearing mounts 182, 184, 186 may include one or more bearings 188 (FIG. 12), a top plate 190, one or more bearing bolts 192, and a mounting plate 194 (FIG. 6). According to one aspect, each of first, second, and third bearing mounts 182, 184, 186 may each include two bearings 188. Mounting plate 194 may have a top face 194a (FIG. 13), a bottom face 194b, a first end 194c (FIG. 6), and a second end 194d. Top face 194a may be defined as the face of mounting plate 194 facing in an upward direction when installed, while bottom face 194b may be defined as the face of mounting plate 194 facing downwards toward surface "S" when installed. Mounting plate 194 may extend transversely under a rearmost end of arcuate frame member 176. Mounting plate 194 may comprise a single, unitary component upon which all three bearing mounts 182, 184, and 186 are engaged.

Mounting plate 194 may have a spring attachment 194e on its second end 194d that may connect to spring 212. The opposite end of spring 212 may connect to spring mounting plate 210 on attachment frame 85 and spring 212 may bias implement 80 to level. Further, the inclusion of one or more pivot stops 208 may define rotational limits of implement 80 to prevent over-rotation about the longitudinal axis, similar to left and right support ribs 172, 174 preventing over-rotation about the central axis of power broom 10.

Figure 13:
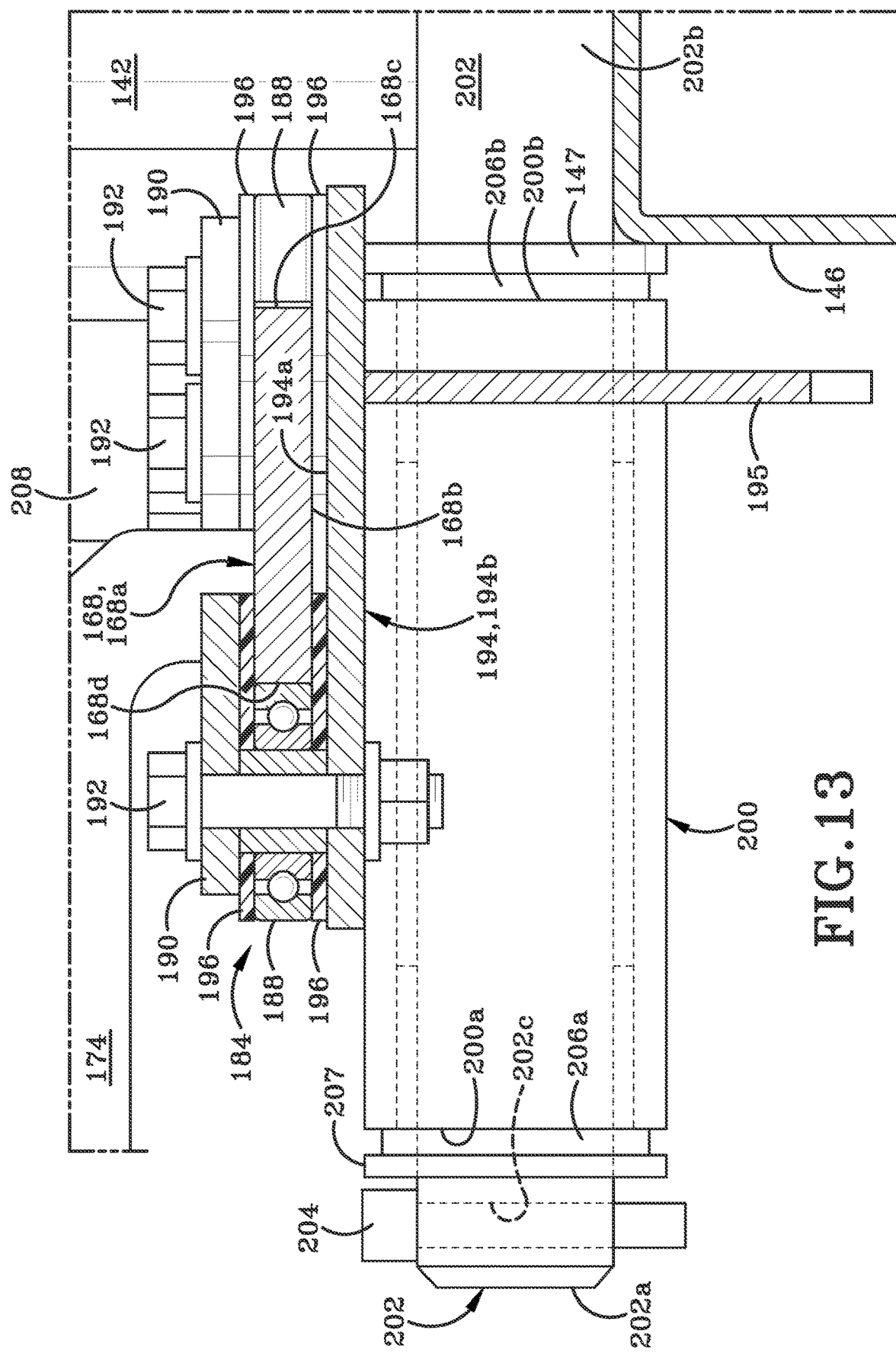
FIG. 13 is a cross-sectional view of a portion of the pivot mechanism taken along the line 13-13 of FIG. 12.

As shown in FIG. 13, bearing mounts 182, 184, 186 are essentially sandwiched between the associated top plate 190 and mounting plate 194. A first low friction pad 196 may be positioned between top plate 190 and an upper surface 168a, lower surface 168b, a rear arcuate edge 168c, and a front arcuate edge 168d of arcuate frame member 168 and an upper surface of the associated bearing 188. A second low friction pad 196 may be positioned between an upper surface 194a of mounting plate 194 and a lower surface 168b of arcuate frame member 168 and a lower surface of the associated bearing 188. Top plate 190 is secured to mounting plate utilizing bearing bolts 192 that are inserted through top plate 190, through low friction pads 196, bearings 188, and mounting plate 194. The combination of bearing mounts 182, 184, and 186, mounting plate 194, the associated top plate 190, and the low friction pads 196 creates a track within which arcuate frame member 168 may be secured and may be rotated. Low friction pads 196 may facilitate movement between bearing mounts 182, 184, 186 and arcuate frame member 176 by reducing friction therebetween. According to one aspect, low friction pads 196 may be plates of high density plastic with a low coefficient of friction. By way of non-limiting example, low friction pads 196 may be constructed of high density polyethylene (HDPE), which is known for its low coefficient of friction, self-lubricating properties, and long wear life.

Figure 12:
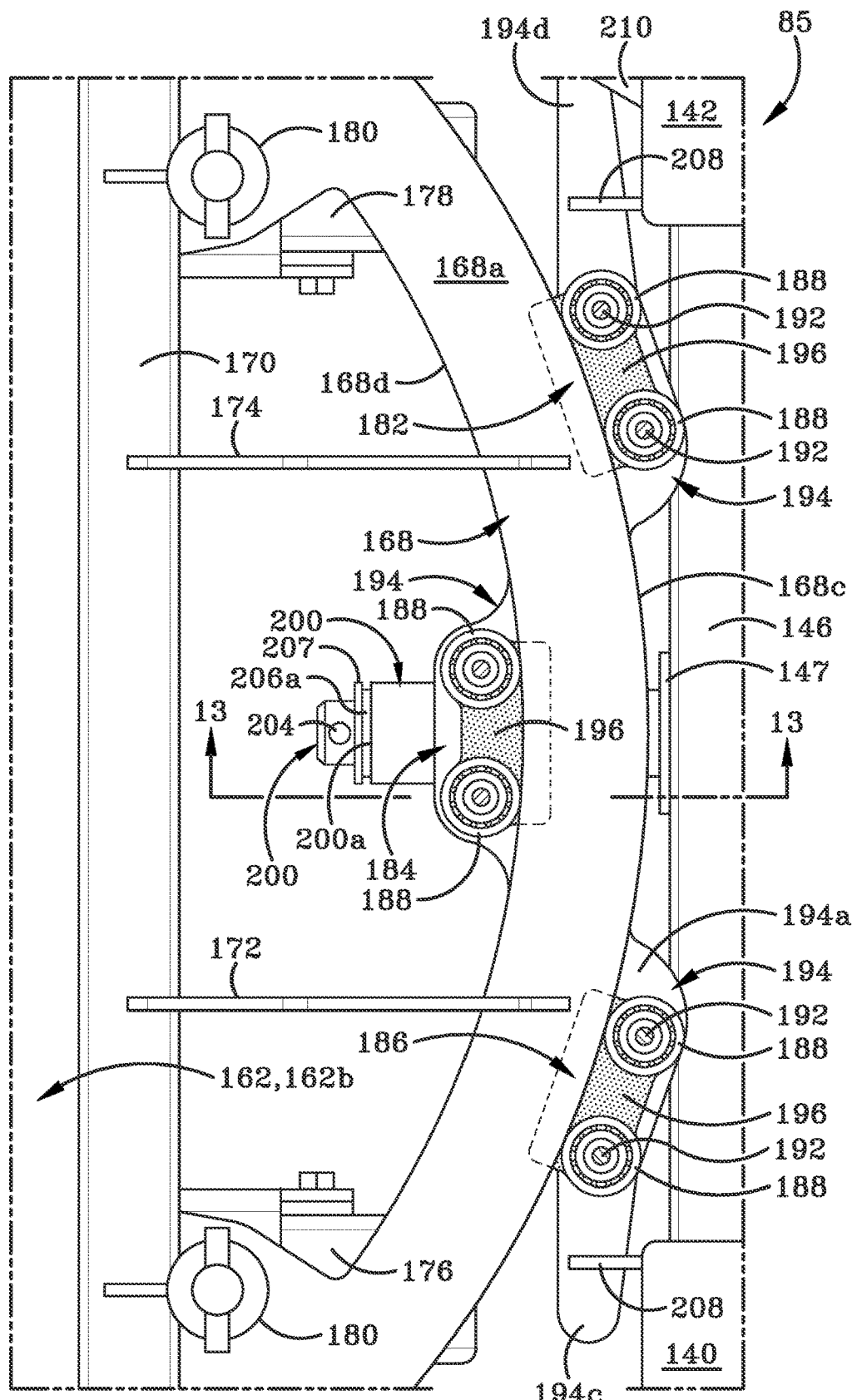
FIG. 12 is a top plan view of the attachment frame with the upper plates thereof removed and cutting through the bolts.

As shown in FIG. 12, bearing mounts 182 and 186 are located towards a rear edge of arcuate frame member 176, (i.e., proximate power unit 10). Bearing mount 184, on the other hand, is positioned towards a front edge of arcuate frame member 176 and is thus offset relative to bearing mounts 182 and 186. This configuration aids in preventing arcuate frame member from moving in a forward direction or a rearward direction as it rotates within the track created by top plate 194, low friction pads 196, bearings 188, and mounting plate 194. Each bearing 188 within bearing mounts 182, 184, 186, may rotate relative to arcuate frame member 176.

With reference to FIGS. 8, 12 and 13 a pivot sleeve 200 may be welded to bottom face 194b of mounting plate 194. Pivot sleeve 200 may be an elongated tube that is open at both ends, with a forward end 200a extending outwardly beyond the second bearing mount 184. A rear end 200b of pivot sleeve 200 sits flush with, or extends slightly beyond a rear edge of mounting plate 194. A support gusset 195 (FIG. and 13) is welded to bottom face 194b of mounting plate 194 and to sleeve 200. Support gusset 195 aids in providing structural rigidity to the engagement of sleeve 200 and mounting plate 194.

A pivot bar 202 is received within a bore defined in pivot sleeve 200. A region of pivot bar 202 extends forwardly beyond first end 200a of sleeve 200 and a distance rearwardly of second end 200b of sleeve 200. Pivot bar 202 may be a solid bar capable of supporting the full weight of implement 80. Pivot bar 202 has a front end 202a and a rear end 202b with rear end 202b being fixedly secured to a rear abutment 147 and to lower cross-member 146. A portion of pulley housing 152 may be seated on top of and be welded to a top region of the rear end 200b of sleeve 200. This is illustrated in FIG. 17A.

As indicated above, pivot bar 202 has a length greater than a length of pivot sleeve 200 such that front end 202a of pivot bar 202 extends outwardly beyond forward end 200a of pivot sleeve 200. Front end 202a of pivot bar 202 may define a bore 202c therein that is oriented at right angles to the length of pivot bar 202 and a cotter pin 204 may be placed through bore 202c to prevent pivot sleeve 200 from sliding off from pivot bar 202.

According to one aspect, pivot bar 202 may have an exterior diameter that is sufficiently small enough relative to an interior diameter of the bore of pivot sleeve 200 that a first bushing 206a and a second bushing 206b may be positioned between the exterior surface of pivot sleeve 200 and the interior surface of pivot sleeve 200 that defines the bore. First bushing 206a is located proximate a free end of pivot sleeve 200 that terminates in forward end 200a. A washer 207 may be located forwarded of forward end 200a and cotter pin 204 may be separated from washer 207 by a gap 203. Second bushing 206b is located proximate rear end 200b of pivot sleeve 200 and abutment plate 147 is provided between bushing 206b and lower cross member 46. Abutment plate 147 may be welded to lower cross member 46. Bushings 206a, 206b may provide a tight fit between pivot bar 202 and pivot sleeve 200 while allowing rotational movement therebetween. According to one aspect, bushings 206a, 206b may be constructed of high density plastic with a low coefficient of friction, such as HDPE, similar to low friction pads 196.

Attachment frame 85 may further include one or more pivot stops 208 (FIG. 8) that extend rearwardly from attachment frame 85, particularly from each of the first and second upright members 140, 142. Pivot stops 208 define left and right rotational limits for implement 80.

Attachment frame 85 may further include a spring mounting plate 210 (FIGS. 5, 6 & 8) and a spring 212. Spring mounting plate 210 may extend outwardly from a front surface of second upright member 142, for example. Spring 212 is operatively engaged at a first end with spring mounting plate 210 and at second end to mounting plate 194. Second end 194d of mounting plate 194 may include a spring attachment 194e. In one aspect, spring attachment point 194e may comprise an aperture that is defined in mounting plate 194 and a hooked end of spring 212 may be inserted through this aperture to secure spring 212 to mounting plate 194. Spring 212 may bias implement 80 to a level/stable position during transport, as discussed with regards to the operation of implement 80 below.

Upper cross-member 144 of attachment frame, as utilized with power broom 80, may include a first rearward mounting point 214 spaced longitudinally apart from the first forward mounting point 166 on mounting attachment plate 164. Similarly, upper cross-member 144 may include a second rearward mounting point 216 on a mounting plate 149 (FIG. 5) that is welded to a forward region of upper cross member 144. Second rearward mounting point 216 is spaced longitudinally apart from second forward mounting point 167 on mounting attachment plant 164.

As shown in FIGS. 4 & 5, implement 80 may include a longitudinal support member 218 that is operatively engaged, at a first end, with first forward mounting point 166 on mounting attachment plate 164 by a connector 220. Connector 220 is inserted through aligned holes defined in longitudinal support member 218 and in mounting attachment plate 164 at the first forward mounting point 166. The connector 220 defines a vertical pivot axis about which the implement 80 may rotate. Longitudinal support member 218 is operatively engaged, at a second end, with first rearward mounting point 214 provided on attachment frame 85 by a connector 222.

Connector 220 engages the first end of longitudinal support member 218 and first forward mounting point 166 to each other in such a manner that longitudinal support member 218 is permitted to flex or rotate about the connector 220. The specific type of connector 220 utilized for securing longitudinal support member 218 to first forward mounting point 166 may be chosen according to the desired application of implement 80. For example, the connector 220 may comprise a modified ball and socket style joint. Alternatively, a diameter of the hole defined in longitudinal support member 218 may be sized to be greater than a diameter of connector 220. This disparity in diameters may allow a degree of "slop" or movement between the hole in longitudinal support member 218 and the connector 220.

By way of yet another non-limiting example, the hole defined in longitudinal support member 210 may include a flexible bushing that may allow relative movement between longitudinal support member 218 and mounting attachment plate 164 while maintaining a tight connection between longitudinal support member 218 and plate 164.

The second end of longitudinal support member 218 may be connected to first rearward mounting point 214 by a similar or identical connector 222 to connector 220. Connector 222 may allow a similar flexing movement of the second end of longitudinal support member 218 as occurs at the first end of longitudinal support member 218. This flexing motion may further facilitate rotational movement of implement 80 about the longitudinal pivot axis defined by pivot bar 202 and pivot sleeve 200, as discussed further herein.

Second forward mounting point 167 and second rearward mounting point 216 may be operationally engaged with each other by way of a hydraulic cylinder and piston 224. The piston is operatively engaged with second forward mounting point 167 and the cylinder may be operative engaged with second rearward mounting point 216, or vice versa. A connector 226 secures piston to second forward mounting point 167. Another connector 228 secures cylinder to second rearward mounting point 216. Hydraulic cylinder and piston 224 may be actuated to cause implement 80 to pivot about the vertical axis "Z" (FIG. 14) defined by the first forward mounting point 166. This pivoting movement is discussed in depth below, but may be best seen in FIGS. 14-15.

With reference to FIG. 16, power transfer system 36 is shown. Power transfer system 36 (commonly known as a power take-off (PTO)) may direct power from engine 26 to implement 80 if power is required to manipulate and/or operate implement 80. Previously known power take-off systems used in skid steer-type vehicles are hydraulically driven or utilize a solid drive shaft. These PRIOR ART systems are costly, difficult to maintain and repair, and in some instances may rob the vehicle of power during operation.

Power transfer system 36 disclosed herein is a belt-driven system that has two cooperating belt-drive sections, namely, a first belt-drive system that is provided on the power unit 10 and a second belt-drive system that is provided on the implement 80. First belt-drive system may be carried on power unit 10 regardless of the presence of implement 80 installed on power unit 10. The first belt-drive system and the second belt-drive system overlap in one region (that will be described below). The first belt-drive system is powered and that power is transferred to the second belt-drive system in the region where the first and second belt-drive systems overlap each other.

First belt-drive system may include an engine pulley 230 that is operatively engaged with engine 26, a power take-off drive belt 232 (PTO drive belt 232), a first pulley 234, a double pulley 236, and a first tensioner pulley 238. PTO drive belt 232 is one of two drive belts disclosed for use with power unit, the other drive belt being attachment belt 156. PTO drive belt 232 is part of the first belt-drive system and is configured to move along a first drive path that is located entirely on power unit 10. Attachment belt 156 is part of the second belt-drive system and is configured to move along a second drive path that is located and operated partially on power unit 10 and partially on implement 80. Double pulley 236 forms part of each of the first belt path and the second belt. Particularly, double pulley 236 is the overlap between first belt path and second belt path and is the component that is utilized to take power from the first belt path and transfer that power to the second belt path. Double pulley 236 may instead be replaced by two single pulleys that are mounted to a jackshaft or any other means of coupling an engine to a pulley and which serves as a means to connect the second drive belt to the first belt path. In other words, double pulley 236 is one example of a connector mechanism that links the first belt path and the second belt path.

PTO drive belt 232 may be a known belt type, including, but not limited to, a flat belt, a v-belt, a round belt, a multi-grooved belt, a toothed belt, or a ribbed belt. PTO drive belt 232 may form a continuous loop and may have a belt path that circles around the engine pulley 230, over first pulley 234, under double pulley 236, over first tensioner pulley 238, and back to engine pulley 230. First pulley 234 may be mounted on frame 12 of power unit 10 in such a manner as to change an orientation of PTO drive belt 232 through an angle of from about seventy degrees up to about eighty degrees. Specifically, when PTO drive belt 232 passes around first pulley 234, PTO drive belt 232 may make a seventy-four degree turn as it passes over first pulley 234, changing the path from horizontal to vertical. This is a first of two turns in the first drive path. First tensioner pulley 238 may also be mounted on frame 12 of power unit 10 in such a manner as to change an orientation of PTO drive belt 232 through an angle of from about seventy degrees up to about eight degrees. Specifically, PTO drive belt 232 may also make a second seventy-four degree turn as it passes over first tensioner pulley 238, placing belt back into a horizontal path as it returns to engine pulley 230. In other words, whatever angle of turn in PTO drive belt 232 by first pulley 234, first tensioner pulley 238 should be mounted to cause same size angle turn to return PTO drive belt 232 to be in the correct orientation to return and move around engine pulley 230.

Each of engine pulley 230, first pulley 234, double pulley 236, and first tensioner pulley 238 may have a groove in which PTO drive belt 232 sits when engaged with each respective component. Double pulley 236 may have a pair of parallel grooves, only one of which engages PTO drive belt 232. The second groove, i.e. the groove not engaged with PTO drive belt 232, is discussed further below.

First tensioner pulley 238 may be operatively engaged with a first tension spring 240 which may bias first tensioner pulley 238 against PTO drive belt 232 to help keep PTO drive belt 232 engaged with all components during operation.

Each component of first belt-drive system may be mounted to tractor frame 12 of power unit 10 utilizing known techniques, including the use of mounting plates or additional frame members as necessary. It will be understood by a person of skill in the art that the mounting of each individual component may be modified according to the desired use.

According to one embodiment, first pulley 234 and first tensioner pulley 238 may be mounted to tractor frame 12 of power unit 10 while double pulley 236 may be mounted to rear support member 96 of hitch 84. In one aspect, double pulley 236 may be mounted on frame 12 in a location that will place double pulley 236 generally between first side plate 86 and second side plate 88. Double pulley 236 is secured to frame 12 via one or more mounting plates 242.

Second belt-drive system may include pulley 154, pulley housing 152, an attachment belt 156, double pulley 236, and a second tensioner pulley 244. Attachment belt 156 may also be any known belt type, however, it is advantageous to utilize similar or identical belt types for both attachment belt 156 and PTO drive belt 232. Attachment belt 156 may form a continuous loop and have a belt path that travels around pulley 154, around the second groove of double pulley 236, and under second tensioner pulley 244 as it makes the loop between pulley 154 and double pulley 236. Second tensioner pulley 244 may be operatively engaged with an adjustable tension spring 246 that includes a spring arm 246a extending therefrom to engage tension adjustment plate 248. Tension adjustment plate 248 may have multiple slots (not shown) defined therein to receive spring arm 246a. Adjustable tension spring 246 and spring arm 246a may also engage a spring catch plate 250 disposed behind adjustable tension spring 246. Therefore, the combination of spring arm 246a, slots, and catch plate 250 may allow adjustment of the amount of tension second tensioner pulley 244 places on attachment belt 156. Specifically, the combination of spring arm 246a, slots, and catch plate 250 may allow an operator to remove all tension from attachment belt 156 to aid when attaching and detaching implement 80 with power unit 10, as discussed further herein. Additionally, the space between pulley 154 and double pulley 236 may vary slightly depending on the implement 80 installed. The ability to adjust the tension placed on the attachment belt 156 by second tensioner pulley 244 may allow attachment belt 156 to remain taut during operation of power unit 10.

Second tensioner pulley 244, adjustable tension spring 246, and tension adjustment plate 248 may be mounted to hitch 84. In one example, second tensioner pulley 244, adjustable tension spring 246, and tension adjustment plate 248 may be mounted to rear support member 96, alongside mounting plate(s) 242 for double pulley 236. While this configuration causes second tensioner pulley 244, adjustable tension spring 246, and tension adjustment plate 248 to be carried by power unit 10 regardless of the presence of an installed implement 80, these components form a part of the second belt-drive system as they are not engaged or operational unless implement 80 requiring power (and thereby having a pulley 154 attached thereto) is installed on power unit 10.

Power is transferred from engine 26 to implement 80 from PTO drive belt 232 to attachment belt 156 through double pulley 236. The use of belt-driven power transfer system 36 lowers manufacturing costs and may reduce maintenance costs and downtime as belts are faster and easier to replace, require little operational maintenance (when compared with a drive shaft or a hydraulic PTO systems). A belt-driven power transfer system 36 is also less expensive to install on power unit 10 and/or to replace at the end of the usable life of the belts.

With reference to FIGS. 18A and 18B, implement 80 may be a snowplow 82 instead of a rotatable broom. According to the embodiment shown in FIGS. 18A and 18B, arcuate frame member 168 may be omitted and the attachment frame 85 may include a central upper mounting plate 348d and central lower mounting plate 354 that extends forwardly therefrom. A second end of each of central upper mounting plate 252 and central lower mounting plate 254 may connect to a vertical support bar 356 provided on the rear end of snowplow blade 358. Support bar 356 may define a vertical pivot axis about which plow 82 may rotate. First end of central upper and central lower mounting plates 348d, 354 may define elongated slots therein that are positioned and configured to receive first and second hitch tabs 86b, 88a, and first and second latches 112b, 138a of hitch 84 therein. Central lower mounting plate 354 may further include an attachment point (not shown) for one end of a hydraulic cylinder and piston 360 to cause rotation of plow 82 about the vertical pivot axis defined by vertical support bar 356. Plow 82 may have other known features and elements as desired by a person of skill in the art, including but not limited to, trip features and mechanisms, adjustable skid shoes, replaceable wear edges, and the like.

Figure 19:
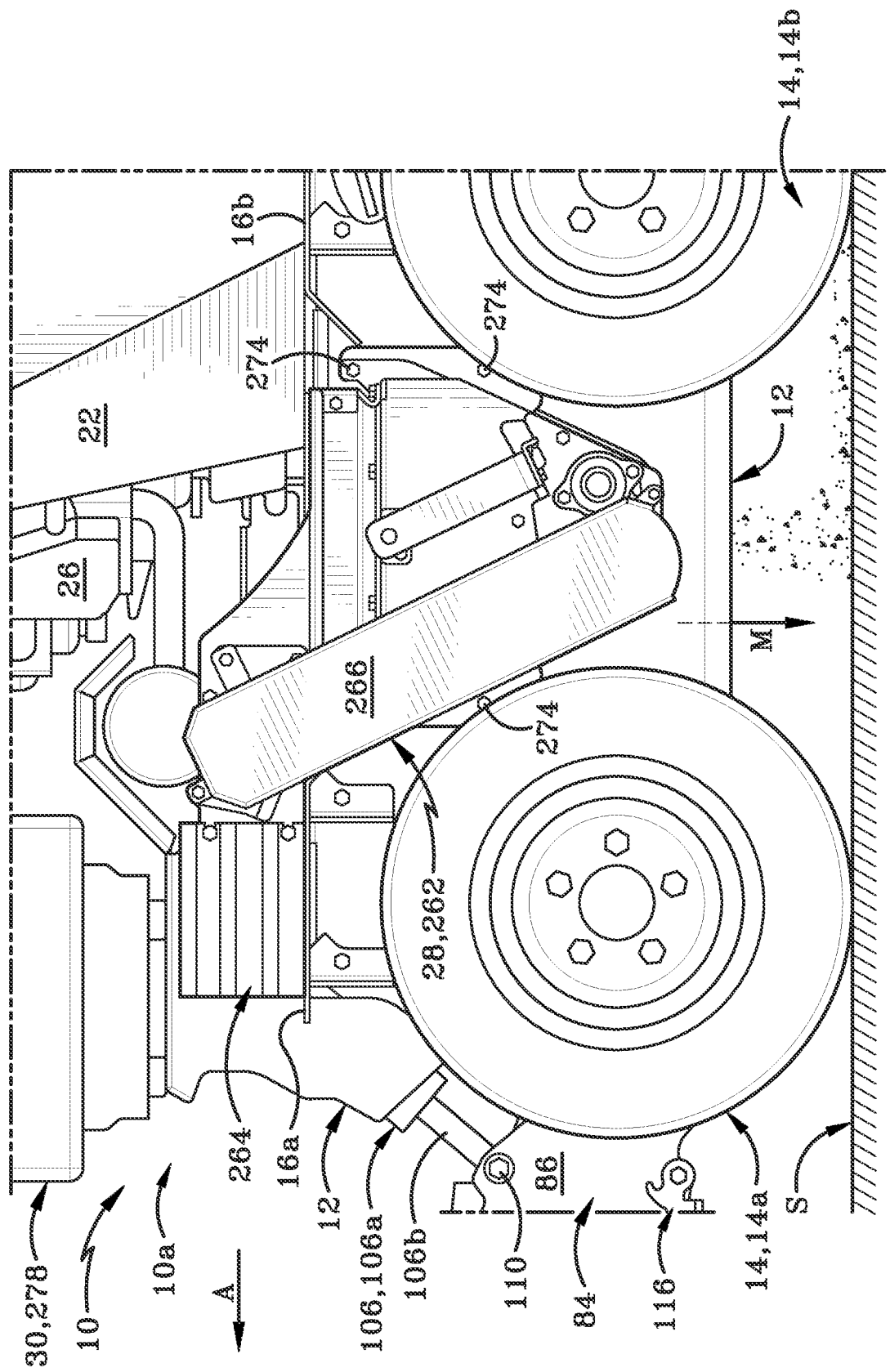
FIG. 19 is a partial, enlarged left side elevation view of power unit showing the location of the particulate material spreader system in accordance with an aspect of the present disclosure.
Figure 20:
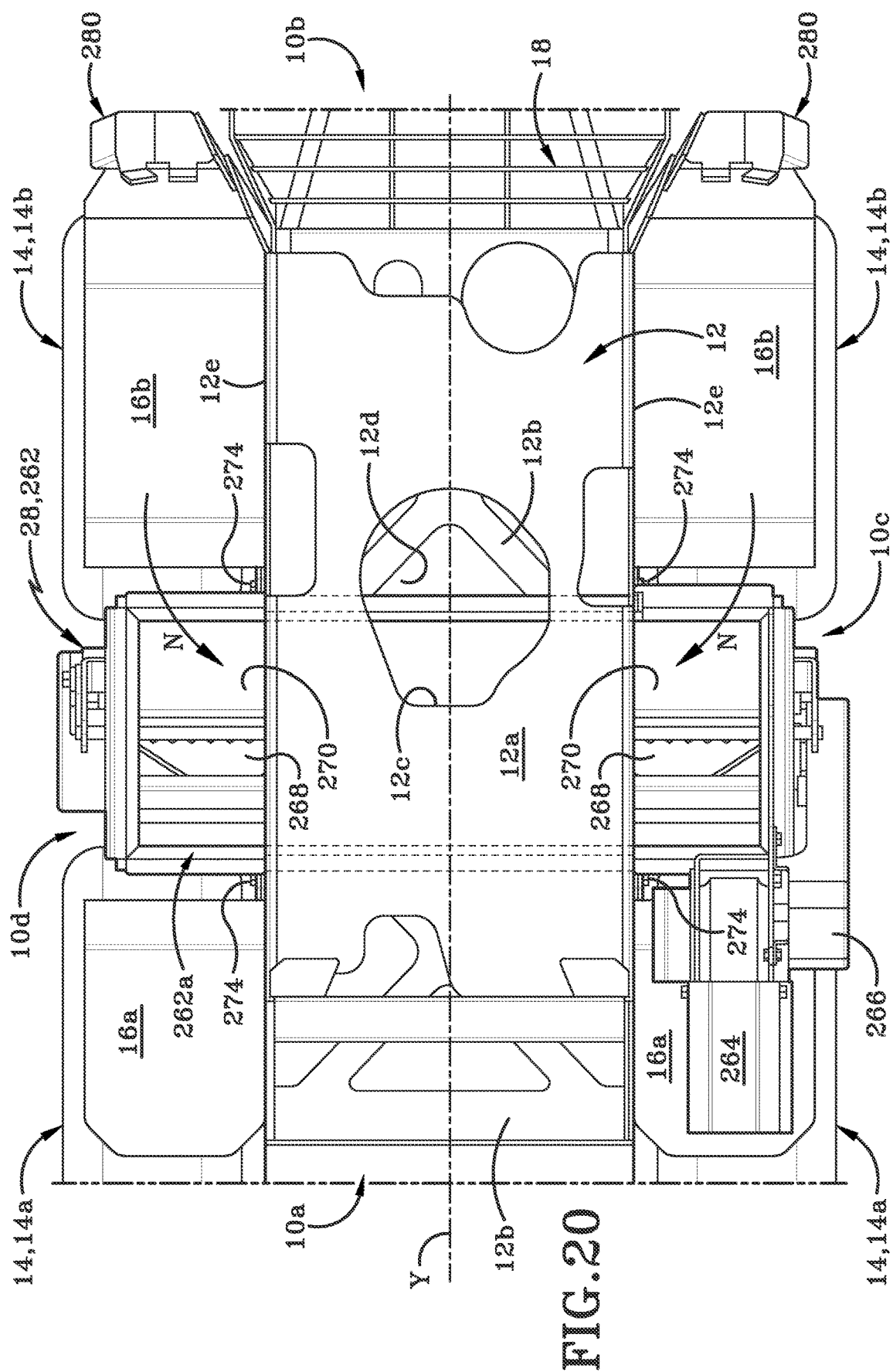
FIG. 20 is a top plan view of the frame similar to FIG. 2, with the left front fender removed and showing the location of the particulate material spreader on the power unit frame.
Figure 21:
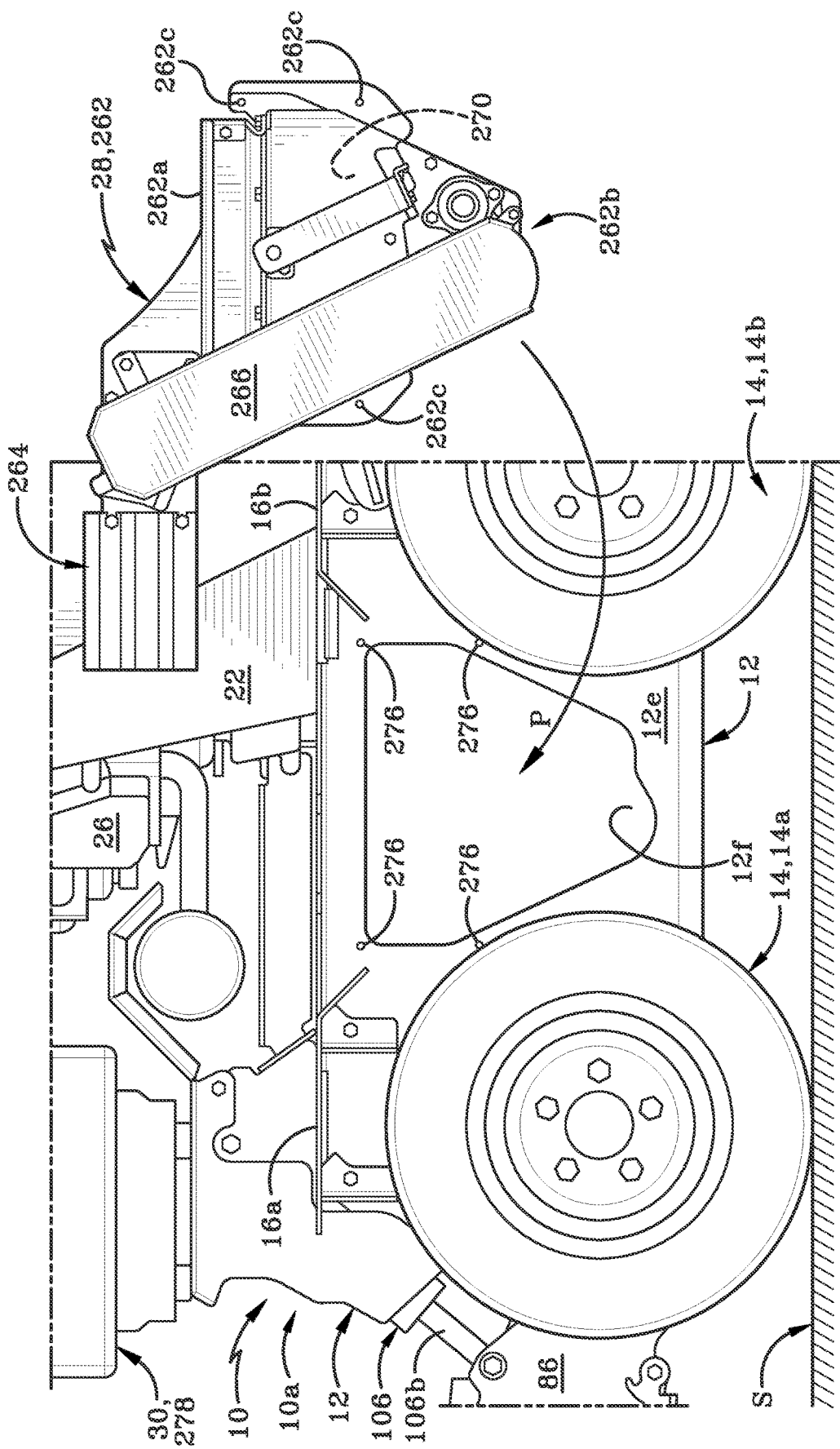
FIG. 21 is a partial, enlarged left side elevation view of the power unit showing the particulate material spreader system exploded away from the power unit.

With reference to FIGS. 19-21, particulate material spreader system 28 is shown. Particulate material spreader system 28 comprises a drop spreader 262. Drop spreader 262 may be a completely independent unit that is separate from power unit 10 and is selectively engaged therewith. Drop spreader 262 may also be omitted from power unit or in other instances may be selectively removed from power unit 10 (as shown in FIG. 21). Drop spreader 262 may include a motor 264, a drive chain that is located beneath a shroud 266, an auger 268, and a material trough 270. The drive chain is driven by motor 264 to rotate auger 268 in order to move particulate materials through trough 270. An entrance opening is provided proximate a top end 262a of spreader 262 and as indicated by arrows "N", particulate materials may be loaded into trough 270 from either side of power unit 10. A slot is provided proximate a bottom end 262b of spreader 262 to allow particulate materials to exit trough 270 and drop directly downwardly and onto surface "S". Drop spreader 262 may hold and distribute particulate matter such as salt, sand, cinders, or the like, therefrom when in operation.

As shown and described herein and in connection with power unit 10, drop spreader 262 may be adapted to fit within an opening 272 (FIG. 21) defined in tractor frame 12 of power unit 10. Drop spreader 262 may extend transversely through tractor frame 12 and extend beyond the outer limits of tractor frame 12, as seen in FIG. 18. This may allow the operator access to the trough 270 to replenish particulate matter as it is depleted. This extension also provides easy access to parts of the drop spreader for maintenance and/or repair when required. At least shroud 266 and possibly motor 264 of drop spreader 262 may also at least partially rest on the left front fender 16a of power unit 10.

As is evident from FIG. 21, opening 272 is located between front wheels 14a and rear wheels 14b. In PRIOR ART devices, broadcast-type particulate spreaders are typically located proximate the rear end of a vehicle. Furthermore, the location of opening 272 is located below the upper mounting platform 12a. The position of opening 272 therefore results in drop spreader 262 being located relative close to the surface "S". The location of drop spreader 262 between front and rear wheels 14a, 14b and the spreader's low placement on power unit 10 helps to lower the center of gravity of power unit 10 when drop spreader 262 is filled with salt. Furthermore, the location of drop spreader 262 between front wheels 14a and rear wheels 14b results in the weight of the spreader 262 being more evenly distributed over the four wheels 14a, 14b. This may have the effect of providing additional traction to power unit 10 in snowy and icy conditions. Further, the position of opening 272 places drop spreader 262 between the front and rear wheels 14 relatively close to the surface "S" to be treated with particulate materials and provides a direct path for the particulate materials to reach the surface "S". Furthermore, particulate materials are dropped onto the surface "S" ahead of rear wheels 14b and this may further enhance the traction of power unit 10 on surface "S".

Drop spreader 262 may be bolted onto tractor frame 12 by inserting fasteners 274 (FIG. 19) through aligned apertures 262c on spreader 262 and 276 (FIG. 21) on frame 12. The use of fasteners 274 may allow spreader 262 to be quickly and easily detached from power unit 10 when not needed or when it is necessary to perform additional maintenance on spreader 262 or power unit 10. The plate that initially covered hole 12f may be replaced when desired. When it is desired to reinstall spreader 262, the operator will remove the plate to expose hole 12f and will then insert drop spreader 262 through the hole (or trough) in the direction of arrow "P" (FIG. 21). Fasteners 274 are then used to quickly and easily attach spreader 262 to power unit 10.

Drop spreader 262 may be operatively engaged with power unit 10 so that the distribution of particulate material therefrom is dependent on the speed of power unit 10 traveling across surface "S" to be treated for its rate of spreading. In this instance, the operator may simply turn the drop spreader 262 on and make no adjustments to the flow of materials from the spreader during operation of power unit. When the task is completed, the operator will then turn drop spreader 262 off.

With reference to FIG. 1, power unit 10 may include a liquid dispensing system 30. Liquid dispensing system 30 may be a known liquid dispensing system that includes a pressurized storage tank 278, one or more spray nozzles 280, pressurized hoses (not shown), and one or more pumps (not shown). Tank 278 is utilized to hold a quantity of brine that may be used to treat surface "S" for snow and ice removal. Alternatively, the brine may be utilized as a preventative coating to pre-treat surface "S" to prevent snow and ice buildup. Storage tank 278 may be mounted anywhere on power unit 10. As illustrated in FIG. 1, storage tank 278 may be mounted to frame 12 at a location that is generally vertically above front wheels 14a and forwardly of control panel 24. Tank 278 may be a top-loading tank that has a cap 278a in an upper region thereof. The cap 278a may be unscrewed to permit brine to be added to tank 278 and may be replaced when tank 278 is full. In some examples, tank 278 may include a handle 278b that permits tank 278 to be lifted upwardly in order to remove tank 278 from power unit 10 or to place tank 278 onto power unit 10.

It will be understood that hoses connect tank 278 to one or more spray nozzles 280. In one example, spray nozzles 280 may be located at the lower rear end of power unit 10 and on either side of operator platform 18 (FIG. 2). In other examples, the one or more spray nozzles 280 may be mounted underneath the operator platform 18 on the rear 10*b* of power unit 10. This arrangement will allow liquid dispensing system 30 to deliver a brine solution to surface "S" behind power unit 10. In other words, the brine solution is delivered to surface "S" after the power unit 10 has already driven over that surface "S" and moved on.

Locating spray nozzles 280 toward rear 10*b* of power unit 10 allows for brine to be sprayed from nozzles after power unit 10 has already moved on. This ensures that a more consistent coat of brine is left on surface "S" without tread marks from wheels 14*a*, 14*b*. As a result, surface "S" that is treated has a more consistent level of removal of snow and ice therefrom because the brine has been applied more evenly over surface "S" and has not been removed by wheels 14*a*, 14*b*. The placement of spray nozzles 280 toward rear 10*b* of power unit 10 also helps to increase the life of power unit 10 because the salt-water mix will be less likely to adhere to the steel of the undercarriage (i.e., to the underbelly of the frame 12).

Spray nozzles 280 may be configured to have variable spray patterns that can be readily adjusted by the operator according to the desired type and location of application. According to one aspect, multiple nozzles 280 may be operationally connected to liquid dispensing system 30 and shutoff valves may be installed inline to vary the spray pattern and/or a width of the spray path. The operator is able to select whether to place brine on a 36" or a 48" wide ground surface and the spray pattern and/or width of spray nozzles 280 will adjust accordingly. The width of spray from spray nozzles 280 may therefore be varied to substantially suit a narrower sidewalk (36") or a wider sidewalk or surface (48").

A pressure valve may be provided on tank 278, or on spray nozzles 280, or somewhere in the hoses that connect tank 278 and spray nozzles 280 together. The pressure valve helps to eliminate any brine exiting through nozzles 280 after the pump has shut off. This arrangement helps to minimize waste as well as overspray that might kill grass and other vegetation on either side of surface "S" being treated.

Liquid dispensing system 30 may further include a hand sprayer 282 (FIG. 3B) to allow operator to spray surfaces that cannot be covered or reached by spray nozzles 280. For example, steps or walkways that are too narrow to allow passage of power unit 10 or are laterally adjacent to one of the sides 10*c*, 10*d* of power unit 10 may be treated using hand sprayer 282. Hand sprayer 282 may be positioned on power unit 10 so that the end that may be held by the operator extends upwardly from the brine tank and for a short distance over top 22*e* of control panel 24. FIG. 1 shows a support member 284 that holds the end of hand sprayer 282 (that includes a trigger 282*a*) in a ready-position over top 22*e*. When it is needful to use the hand-sprayer, the operator may simply remove the end of the hand sprayer 282 from support member 284, direct a nozzle (not shown) on an end of tube 282*b* in a desired direction, and squeeze the trigger 282*a*. It will be understood that hand sprayer 282 is connected to brine tank 278 by a hose that is not illustrated in the attached figures. Tube 282*b* may be substantially rigid so that the nozzle provided thereon is easily controlled and pointed in a desired direction.

Having thus described the components and elements, the method of operation is now provided herein. Depending on the implement 80 installed on power unit 10, hydraulic control lever 66 may have varying functions which may be chosen by a person of skill in the art to best correlate with the implement 80 chosen. Therefore, the functions described herein may not all be applicable with all foreseeable implements 80 that may be engaged with power unit 10. Additional functions not described herein may likewise be possible and applicable. It will thus be understood that modifications to the control system for hydraulic control lever 66 may be made if appropriate.

Hydraulic control lever 66 may move in multiple directions such as moving along axes such as a left/right axis (x-axis) and a forward/rearward axis (Y-axis). Hydraulic control lever 66 may have a float position that is substantially the point at which the x-axis and the y-axis meet. This float position may be considered neutral for the hydraulic controls and will effect no movement of the corresponding implement 80. According to a "standard" control scheme, moving hydraulic control lever 66 along the x-axis may cause an associated implement 80 to rotate from right to left or vice versa, while movement of hydraulic control lever 66 along the y-axis may cause implement 80 to be raised or lowered, depending on whether the lever 66 is moved forwardly or rearwardly on control panel 24. According to one aspect, implement 80 that is in contact with surface "S" may be raised (lifted off surface "S") by pulling the hydraulic control lever 66 backwards (i.e., in a direction moving from front 10*a* to rear 10*b* of power unit 10. Once the implement 80 has reached a desired height, hydraulic control lever 66 may be allowed to float back to its neutral position, and implement 80 will maintain its position until hydraulic control lever 66 is moved along the y-axis again. To lower implement 80, hydraulic control lever is pushed forwardly (i.e., in a direction moving from rear 10*b* to front 10*a*) until implement 80 rests on the surface "S". Hydraulic control lever 66 may then be allowed to float back to its neutral position. The implement 80 will remain on the surface "S" until the hydraulic control lever 66 is moved along the y-axis again.

Implement 80 control will be discussed further below with regards to the operation thereof.

Control panel 24 may include controls for the drop spreader 262 of the particulate material spreader system 28 described herein, if such a system 28 is provided on power unit 10. Motor 264 of drop spreader 262 may be an electric motor 264 that may be connected to an auxiliary power switch on control panel 24, such as the third auxiliary power switch 58, for example. If the operator determines that operation of drop spreader 262 is desired, third auxiliary power switch 58 may be toggled to the ON position to power motor 264. The activation of motor 264 will cause the drive chain (behind shroud 266) to rotate auger 268. Rotation of auger 268 causes the release of particulate matter under power unit 10 through a transverse slot in bottom 262*b* of drop spreader 262 and in the direction of arrow "M", i.e., directly onto surface "S".

Once the store of particulate matter is depleted, or operation of drop spreader 262 is no longer desirable, operator may toggle third auxiliary power switch 58 to the OFF position. As indicated earlier herein, the operator may replenish the particulate material through the openings in the top 262*a* of drop spreader 262 as indicated by arrows "N" in FIG. 20. It will be understood that covers may be provided to close off access to the trough 270 when drop spreader 262 has been replenished.

In instances where power unit 10 is equipped with liquid dispensing system 30, as described herein, operation thereof may likewise be managed by operator through control panel 24. Specifically, operation of liquid dispensing system may involve delivery of power from engine 26 to brine pumps (not shown) which may in turn deliver liquid from the tank 278 to spray nozzles 280 and/or hand sprayer that is operable through contact with hand sprayer 282. Brine pumps may be operatively connected to an auxiliary power switch on control panel 24, e.g. third auxiliary power switch 58. Switch 58 may be toggled between an ON and OFF position according to the judgment of the operator. If liquid dispensing system 30 is desired to be used, once pumps are powered through operation of third auxiliary power switch 58, spray nozzles 280 may be powered on by placing nozzle toggle switch 52 into the ON position. Fluid pressure within the liquid dispensing system 30 may be monitored via pressure gauge 50 and system may be turned ON or OFF as the operator deems it necessary to spray brine on surface "S" or to cease applying brine to surface "S" according to the conditions present.

In instances where both particulate material spreader system 28 and liquid dispensing system 30 are provided on power unit 10, third auxiliary power switch 58 may control one of these two systems while the other system may be connected to a separate auxiliary power switch. Control panel 24 is described herein as having four auxiliary power switches, (40, 42, 58, and 60), any of which may be assigned to control any of optional electrical components and/or systems. For example, on a power unit equipped with headlights 48, rear work lights 46, particulate matter spreader system 28, and liquid dispensing system 30, each of the first through fourth auxiliary power switches 40, 42, 58, 60 may be assigned to one of these components/systems.

By way of a second non-limiting example, if each of the previous four optional components are provided on power unit 10, and a fifth component, e.g. a powered implement 80, such as power broom 80, is also installed, a fifth auxiliary power switch (not shown) may be installed on control panel 24. It will be understood that each system and/or component provided on power unit 10 should preferably have its own dedicated power control switch on control panel 24.

Power transfer system 36 may be controlled from control panel 24 by operation of the PTO switch 56. Specifically, if implement 80 utilizing power transfer system 36 is engaged with power unit 10, the operator may pull up on PTO switch 56 to engage power transfer system 36. The engagement of power transfer system 36 may cause an electric clutch (not shown) to engage to rotate engine pulley 230 (FIG. 16) of the first belt-drive system of system 36, thereby operating PTO drive belt 232 to engage with first pulley 234, double pulley 236, and first tensioner pulley 238 and causing them to rotate. The rotation of double pulley 236 causes attachment belt 156 in the second belt-drive system of system 36 to power pulley 154 on implement 80, thereby providing power to the implement 80. To disengage the power transfer system 36, the operator may depress the PTO switch 56. This disengages the electric clutch and causes the PTO drive belt 232 to stop operation. This, in turn, stops power from being transferred to implement 80 and attachment ceases to operate. So, in the case of powered broom 80, activation of the PTO transfer system 36 causes brush wheel 158 to be rotated to clear snow from surface "S". Deactivation of PTO transfer system 36 causes brush wheel 158 to stop rotating.

PTO switch 56 may include a safety mechanism wherein the engine 26 cannot be started if power transfer system 36 is engaged. Therefore, if PTO switch 56 is engaged and the operator steps off the operator platform 18 or otherwise turns off the engine 26, PTO switch 56 must be depressed to disengage power transfer system 36 before the engine 26 may be restarted.

Having thus described the general operation of power unit 10 and control panel 24, operation of the individual systems and components of power unit 10 will now be described.

With reference to FIGS. 7-10, weight transfer system 34 may transfer weight rearwardly from implement 80 to front wheels 14a of power unit 10. This rearward weight transfer may increase traction of front wheels 14a, aid in lifting the implement 80 off surface "S", and tends to reduce resistance between the implement 80 and surface "S" while power unit 10 is in operation. The operator may select three different transfer rates, represented by a first position 120e of adjustment bolt 136 in first slot 120, a second position 120c of adjustment bolt 136 in first slot 120, and a third position 120b of adjustment bolt 136 in first slot 120. The first position, 120e, represents a zero weight transfer, the third position 120b represents a maximum weight transfer, and the second position 120c represents a weight transfer rate halfway between zero weight transfer and the maximum weight transfer. The total representative weight transferred by weight transfer system 34 will vary dependent upon the implement 80 provided on power unit 10. The heavier the implement 80, the more the transfer of weight onto front wheels 14a may be beneficial, i.e., provides a most efficient and safest operation of power unit 10 and implement 80.

To utilize weight transfer system 34, the operator makes sure the power unit is switched off and then raises the hitch 84 and implement 80 to their highest position off surface "S" using hydraulic control lever 66 as previously described herein. The operator will then loosen adjustment bolt 136 and slide it along first slot 120 to the desired one of the first, second and third positions. Once in the desired position, the adjustment bolt 136 is then tightened so that the selected position is maintained. Once the desired position is locked in, the operator may continue with normal operation of power unit 10.

Figure 14:
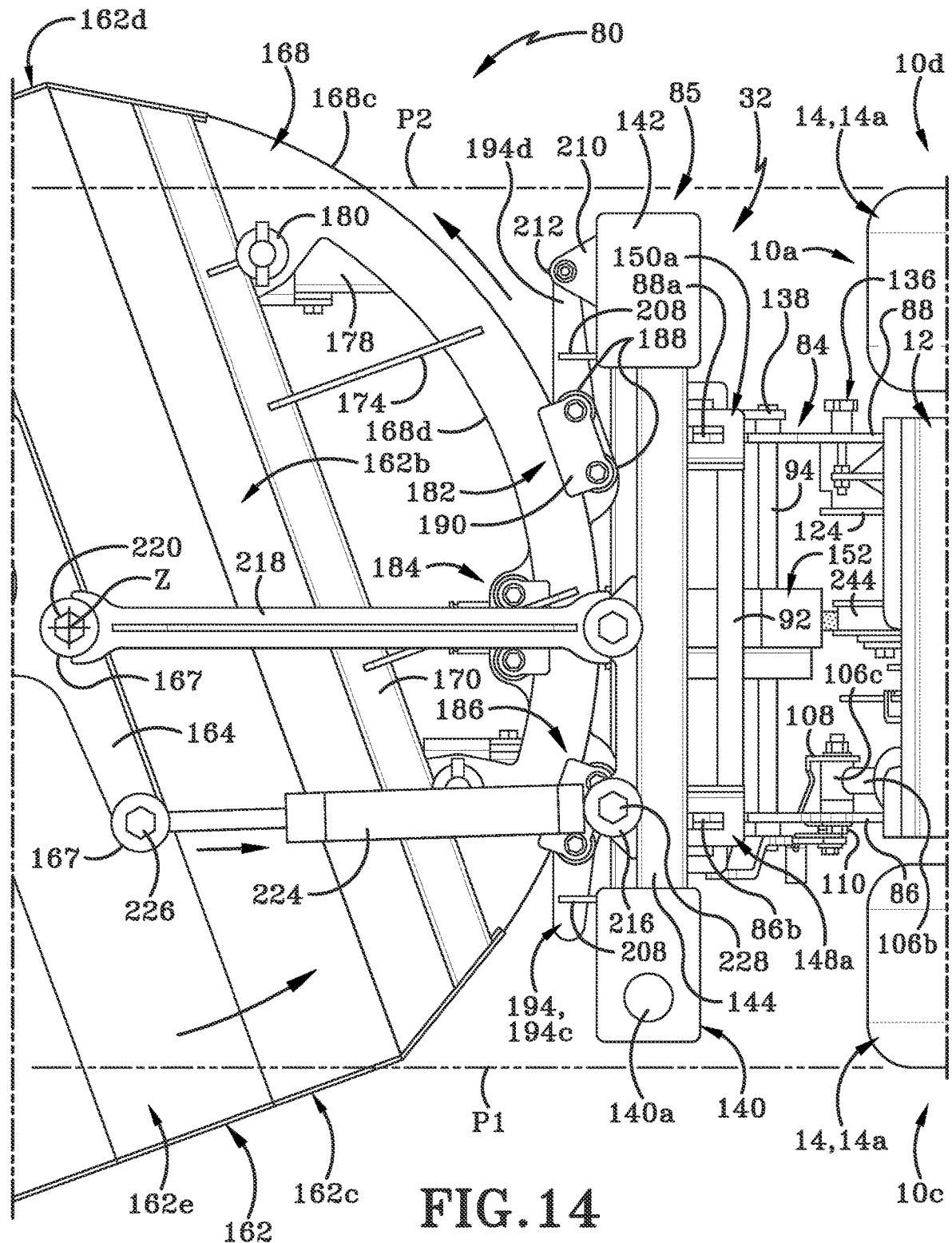
FIG. 14 is a top plan view of the attachment assembly pivoting the implement in a counter-clockwise direction during use.
Figure 15:
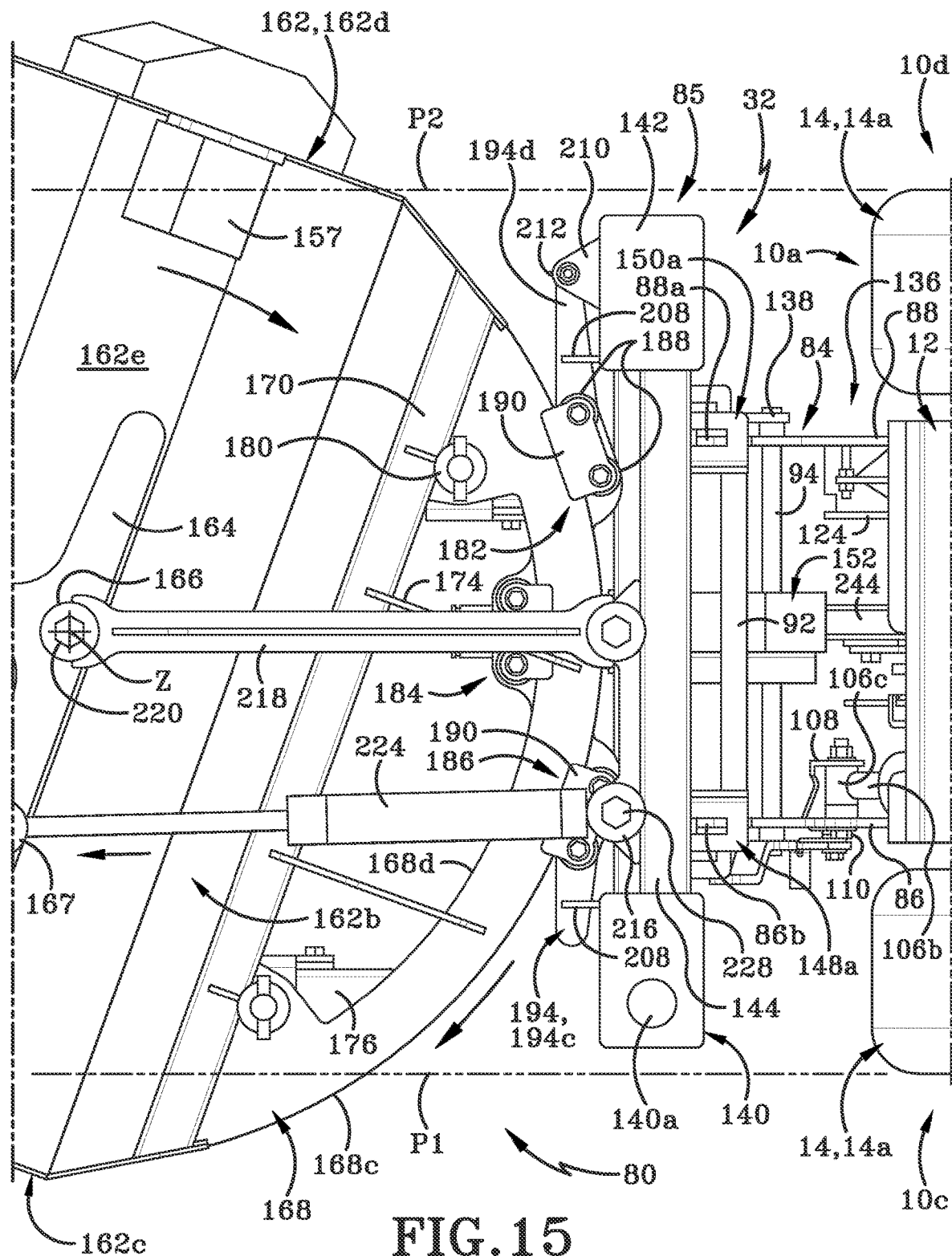
FIG. 15 is top plan view of the attachment assembly pivoting the implement in a clockwise direction during use.

With reference now to FIGS. 14 and 15, the rotation of attachment frame 85 (and therefore the movement of implement 80 to the left or right) is illustrated. While rotating an attachment from side-to-side is known, the left/right rotation of implement 80 herein is believed to be unique in that the rotation of implement 80 occurs about a central axis defined by the first forward mounting point 166 on the brush wheel housing 162. The unique semi-circular shape of arcuate frame member 168 and its interaction with other frame components further facilitates this unique rotation about the central axis and provides benefits discussed herein relative to the operation of implement 80.

The rotation of implement 80 may be controlled by operator using control panel 24, specifically hydraulic control lever 66, as discussed previously herein. Hydraulic control lever 66 is operatively engaged with hydraulic cylinder 224. Rotation of implement 80 is hydraulically controlled through hydraulic cylinder 224 that may be actuated to retract the piston thereof and pull implement 80 to the left or to extend the piston thereof and thereby push implement 80 to the right when the operator moves the hydraulic control lever 66 along the x-axis.

In PRIOR ART implement control, particularly those devices that may rotate between the left and the right, the axis of rotation is typically located at a rear of the attachment. This placement may cause the entire PRIOR ART attachment, including all frame members connected therewith, to rotate in unison. In turn, the rotation of the entire PRIOR ART attachment causes the leading edge thereof, i.e. the edge pointed most forward once rotation has occurred, to move forward in front of the vehicle, and into the path of travel. For example, if a PRIOR ART implement, such as a snowplow blade or a broom is pivoted to the left according to known operations, the right edge of the blade or broom moves forward and towards the center of the vehicle's path. The movement towards the center of the vehicle's path exposes the vehicle's right side wheels to a travel path that is not intended for snow and ice removal and causes the PRIOR ART attachment to clear a path of snow and/or ice that is narrower than the full width of the PRIOR ART attachment. This results in the machine have to move through additional passes to clear the same area, or results in leaving a portion of the area un-cleared. This may be dangerous as most of these areas are roadways and/or sidewalks where people may be injured due to unsafe driving or walking conditions if snow or ice is not adequately removed therefrom.

The operation of the presently described power unit 10 in pivoting the implement 80 to the left or to the right differs from the PRIOR ART devices in that the provision of a centralized axis of rotation "Z" is forward of most of the attachment frame 85. This configuration allows for rotation of the implement 80 to occur with a nearly zero degree radius. Accordingly, as clearly seen in FIGS. 14 and 15, the edges of implement 80 remain outside of a plane "P1" that extends along left side 10*c* of power unit and outside of plane "P2' that extends along right side 10*d* of power unit 12 when attachment 10 is turned to the left (FIG. 14) and when implement 80 is turned to the right (FIG. 15, respectively). As a consequence, the implement 80 clears a pathway through snow and ice on surface "S" that is at least as wide as the width of implement 80 if facing straight forward such as in FIG. 5.

Furthermore, the semi-circularly shaped arcuate frame member 168 is located entirely behind the axis of rotation and turns within the track created by the combination of first, second, and third bearing mounts 182, 184, and 186, mounting plate 194, and top plates 190. As hydraulic cylinder and piston 224 pushes or pulls brush wheel housing 162 to the left or to the right, arcuate frame member 168 turns, causing bearings 188 to rotate about their associated axes (defined by bearing bolts 192) to permit movement of arcuate frame member 168. Stops 208 function to limit the extremes to which arcuate frame member 168 may rotate, which in turn defines the limits to which implement 80 may rotate. The provision of stops 208 ensures that implement 80 does not over-rotate and cause damage to any components thereof, nor does it direct snow, ice, and debris in any undesired or unanticipated direction.

Keeping the edges of implement 80 outside the left and right sides 10*c*, 10*d* of power unit 10 ensures that wheels 14*a*, 14*b* have the best possible traction with surface "S" as they travel over surface "S" behind implement 80 and therefore travel on a part of surface "S" that has already been cleared of snow and ice by implement 80. This further ensures clearing of the desired area of snow and ice in as few passes as possible and therefore minimizes the operational time and cost of power unit 10.

Implement 80 may further be rotated about a longitudinal axis that is substantially parallel to the direction of travel of power unit 10. The longitudinal axis of rotation in question is defined by pivot bar 202 and pivot sleeve 200. Specifically, pivot sleeve 200, as discussed above, is fixedly attached to the bottom face 194*b* of mounting plate 194. Pivot bar 202 is inserted into the bore of pivot sleeve 200, and the junction of pivot bar 202 and pivot sleeve 200 provides the only connection between implement 80 and attachment frame 85. The ability to pivot implement 80 about this longitudinal axis may allow implement 80 to more closely follow the contours of surface "S" over which power unit 10 is used. Again, this allows for a more complete snow and ice removal from surface "S". Furthermore, when in raised transport, the longitudinal pivot feature allows the implement 80 to remain level, preventing any snag accidents which may occur when one side of an attachment drops below the opposite side when an obstacle on the surface "S" is encountered.

The inclusion of slop or movement in the first and second forward mounting points 166, 168, as previously discussed herein, further facilitates rotation about the longitudinal axis. This movement in mounting points 166, 168 allows the hydraulic cylinder and piston 224 and longitudinal support member 218 to move relative to the mounting points 166, 168. This aids in preventing damage that could otherwise be caused by rotation of implement 80.

Although described in relation to implement 80, it will be understood that the arcuate frame member 168, central axis, and associated components may be adapted to allow similar rotation with attachments other than the powered broom 80 or snowplow blade 82. Similar advantages would be recognized in adapting this unique configuration to other implements that operate under similar constraints.

With reference to FIGS. 17A-D, the process of detaching implement 80 from power unit 10 is shown. FIG. 17A shows the rearward section of implement 80 in engagement with power unit 10 i.e., in a locked position where hitch 84 is locked to attachment frame 85. Specifically, FIG. 17A shows hitch tab 86*b* engaged within the slot 148*a* (FIG. 5) of first support member 148. This figure also shows first latch 112*b* engaged in slot 148*f* (FIG. 5) defined in second lower hitch plate 148*b*. The attachment latch handle 112 is in the forward and locked position, and lock tab 112*d* is engaged with handle lock 116 in the locked position. This may be considered to be the "normal" operating position for the attachment frame 85, i.e., where implement 80 is engaged and may be operated.

In order to disconnect the implement 80 from the hitch 84, the first step is to make sure power unit 10 is parked on a level surface with parking brake 62 engaged and the implement 80 in a lowered position where it rests on surface "S". Once power unit 10 is in the aforementioned position, the engine 26 is shut off and any power to the implement 80 (if provided) should be disengaged. Next, the operator may release hydraulic pressure within the system by moving the hydraulic control lever 66 left and right on the x-axis and any hydraulic lines going to the implement 80 from power unit 10 may be disconnected. Next, if the implement 80 is engaged with power transfer system 36, the adjustable tension spring 246 may be disengaged from the mounting plate 242 and engaged with spring catch plate 250. This may serve to release all tension on the attachment belt 156 thereby allowing attachment belt 156 to be removed from the double pulley 236. If implement 80 does not utilize power transfer system 36, the operator may skip the steps of disengaging the adjustable tension spring 246 and removing the attachment belt 156 as the components of power transfer system 36 are not being utilized.

Next, as seen moving from FIG. 17A to FIG. 17B, the operator may rotate the handle lock 116 counter-clockwise in the direction of arrow "F" (FIG. 17B) to disengage first lock member 116b from lock tab 112d. Simultaneously, operator may rotate attachment latch handle 112 rearward (clockwise and in the direction indicated by arrow "E") about the axis defined by lower crossbar 94 and engage locking tab 112d with second lock member 116c. This removes first latch 112b and second latch 140 from engagement with elongated lower slots 148f, 150f (FIG. 11) within first and second lower hitch plates 148, 150. The bottom portion of hitch 84 is now disengaged from attachment frame 85, and thereby disengaged from implement 80. The operator may then restart engine 26 of power unit 12 and lower the hitch 84 down while slowly reversing power unit 10 away from the implement 80. The lowering of hitch 84 tends to cause implement 80 to rotate in the direction of arrow "G" (FIG. 17C); pivoting around upper crossbar 92 as it rotates. Additionally, walls 148g and 150g rotate about the curved forward edges of first and second hitch tabs 86b, 88a, thereby disengaging the first and second hitch tabs 86b, 88a from the elongated upper slots 148e, and 150e within first and second upper hitch plates 148a, 150a. Implement 80 may then be lifted off hitch 84 in the direction of arrow "H" (FIG. 17D) to complete the disconnection of implement 80 from power unit 10.

With reference to FIGS. 18A-B, attaching a different implement 80 such as snowplow blade 82 to power unit 10 may follow a similar process as detaching implement 80, the rotating broom, therefrom. The attachment steps are essentially the detachment steps performed in reverse.

As depicted in FIGS. 18A-18B, a snowplow 82 is shown being attached to power unit 10. As indicated earlier herein, snowplow 82 includes a blade 358 that has a centrally located, vertically extending support 356 mounted on the blade's rear surface. The first step in the attachment process is to align power unit 10 with the implement 80 and drive power unit 10 slowly forwardly and towards the attachment, stopping when the hitch 84 is in close proximity to attachment frame 385. Next, the operator lowers the hitch 84 in the direction of arrow "I" (FIG. 18A) using hydraulic control lever 66 on the control panel 24 until the first and second hitch tabs 86b, 88a are located below the slots (such as slot 348e in upper plate 348d and the associated slot that is provided on the second support member. The operator may then drive power unit 10 forward slowly. This motion causes hitch 84 to pivot about upper crossbar 92 and the curved surfaces on the forward edge(s) 86c, 88c of first side plate 86 and second plate 88 until the first and second hitch tabs 86b, 88a are aligned with and under the elongated upper slots 348e and the slot in second support member.

Next, the operator may raise the hitch 84 a distance from the ground surface. This will cause implement to rotate in the direction of arrow "J" and causes the hitch tabs 86b, 88a to be received within the elongated upper slots 348e and the equivalent slot in the second support member. The hitch 84 should continue to be raised until the implement 80 begins to rise off surface "S". The lifting of implement 80 causes hitch 84 to rotate about upper crossbar 92 so that the lower region of implement 80 moves towards hitch 84. The lower region of the implement 80 will move into a proper position to engage first and second latches 112b, 138a in slot 348f, and the similar slot in the second support member of attachment frame 385.

At this point, the operator may shut off engine 26 and engage parking brake 62 to prevent any undesired movement of power unit 10. The operator then may rotate handle lock 116 in the opposite direction of arrow "L" (FIG. 18b) to disengage lock tab 112d from second lock member 116c while simultaneously rotating attachment latch handle 160 forwardly (i.e., counterclockwise in the direction of arrow "K" (FIG. 18B). This engages first and second latches 112b, 138a within elongated lower slots 348f, and the slot in the second support member. Handle lock 116 may then be rotated clockwise in the direction of arrow "L" to engage lock tab 112d with first lock member 116b in order to prevent attachment latch handle 112 from rotating out of the latched position.

If the implement 80 being attached to the power unit 10 is to be engaged with power transfer system 36 components, the next step is to place the attachment belt 156 around the open groove on double pulley 236. The operator will then secure attachment belt 156 on implement 80 in place by engaging tension spring 246 and spring arm 246a with tension adjustment plate 248. This causes second tensioner pulley 244 to put attachment belt 156 under tension. Next, the attachment belt 156 should be inspected visually to ensure proper engagement within grooves of double pulley 236 and second tensioner pulley 244 before proceeding. If attachment belt 156 is not properly engaged, tension may be released so attachment belt 156 may be re-seated. If implement includes hydraulic and/or electrical components, the hoses for the hydraulics and the electrical systems may be connected to corresponding outlets on power unit 10. The power unit may then be operated.

As discussed further herein, attachment frame 85 may include additional elements dependent upon the implement 80 installed therewith. Additionally, if the specific implement 80 installed does not require an element previously discussed herein, such elements may be omitted according to the judgment of a person of skill in the art.

It will be further understood that the implements and operation described herein need not be limited to snow and ice removal and treatment, but could also be modified for use in earth or sand movement/removal, or in other similar and/or related endeavors. It will be appreciated by a person of skill in the art therefore, that this technology has applications beyond the snow and ice removal industry and may be readily adapted for other uses without undue experimentation or modification.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "Comprising," "including," "Carrying," "having," "Containing," "involving," "holding," "Composed of," and the like are to be understood to be open-ended, i.e., to mean including but not limited to. Only the transitional phrases "Consisting of" and "Consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A powered vehicle comprising:
    a powered vehicle having differential steering composed of left and right drive control levers;
    a frame having a front end and a rear end;
    a pair of front wheels mounted proximate the front end of the frame;
    a pair of rear wheels mounted proximate the rear end of the frame, wherein the left drive control lever controls wheels on a left side of the powered vehicle and the right drive control lever controls wheels on a right side of the powered vehicle;
    a weight transfer system provided on the powered vehicle;
    a hitch assembly provided as a part of the weight transfer system;
    wherein the hitch assembly is located proximate the front end of the frame and is adapted to engage an attachment to the powered vehicle and to position the attachment forwardly of the pair of front wheels, and wherein said engaged attachment has a weight;
    wherein the weight transfer system is operable to selectively transfer at least some of the weight from the attachment and in a direction moving rearwardly towards the rear end of the frame; and
    wherein the at least some of the weight of the attachment is moved onto the pair of front wheels.

2. The powered vehicle according to claim 1, wherein a center of gravity of the powered vehicle is moved rearwardly by the transfer of the at least some of the weight from the attachment onto the pair of front wheels.

3. The powered vehicle according to claim 1, wherein the weight transfer system includes a rate transfer mechanism.

4. The powered vehicle according to claim 3, wherein the rate transfer mechanism is selectively movable between a first position, a second position, and a third position;
    wherein when the rate transfer mechanism is in the first position, substantially none of the weight of the attachment is transferred from the attachment and onto the pair of front wheels;
    wherein when the rate transfer mechanism is in the third position, a maximum weight of the attachment is transferred from the attachment and onto the pair of front wheels of the powered vehicle, and
    wherein when the rate transfer mechanism is in the second position, an intermediate amount of the weight of the attachment is transferred from the attachment and onto the pair of front wheels of the powered vehicle.

5. The powered vehicle according to claim 1, further comprising:
    a drop spreader engaged with the frame between the pair of front wheels and the pair of rear wheels;
    wherein a bottom wall of the drop spreader defines an opening therein and the drop spreader is adapted to hold a quantity of particulate materials therein; and
    wherein the opening allows the particulate materials to drop downwardly therethrough and directly onto the surface over which the powered vehicle is traveling.

6. The powered vehicle according to claim 5, wherein the weight transfer system lowers a center of gravity of the powered vehicle after the particulate materials are loaded into the drop spreader.

7. The powered vehicle according to claim 1, further comprising:
    a brine tank engaged with the frame between the pair of front wheels and the pair of rear wheels, wherein a width of spray is selected to be delivered from one or more spray nozzles engaged with the brine tank, wherein the width of spray selected is based upon a width of the surface over which the powered vehicle is to travel.

8. The powered vehicle according to claim 7, further comprising:
    spray nozzles to deliver the width of the spray selected, wherein the width is based on one of a 36" wide region of the surface and a 48" wide region of the surface.

9. The powered vehicle according to claim 1, further comprising:
    a semi-circular mounting connected to the front end of the frame; and
    a rotatable broom connected to the semi-circular mounting, wherein the rotatable broom is pivotably relative to the frame via the semi-circular mounting.

10. A powered vehicle comprising:
    a powered vehicle having differential steering;
    a frame having a front end and a rear end;
    a pair of front wheels mounted proximate the front end of the frame;
    a pair of rear wheels mounted proximate the rear end of the frame;
    a weight transfer system provided on the powered vehicle;
    a hitch assembly provided as a part of the weight transfer system;

wherein the hitch assembly is located proximate the front end of the frame and is adapted to engage an attachment to the powered vehicle and to position the attachment forwardly of the pair of front wheels, and wherein said engaged attachment has a weight;

wherein the weight transfer system is operable to selectively transfer at least some of the weight from the attachment and in a direction moving rearwardly towards the rear end of the frame;

wherein the at least some of the weight of the attachment is moved onto the pair of front wheels; and wherein the hitch assembly is selectively pivotable about a pivot axis, and wherein the weight transfer mechanism is operable to selectively change a position of the pivot axis relative to a longitudinal axis of the frame of powered vehicle, where the longitudinal axis extends between the front end and the rear end of the frame.

11. The powered vehicle according to claim 10, wherein a center of gravity of the powered vehicle is moved rearwardly by the transfer of the at least some of the weight from the attachment onto the pair of front wheels.

12. The powered vehicle according to claim 10, wherein the weight transfer system includes a rate transfer mechanism.

13. The powered vehicle according to claim 12, wherein the rate transfer mechanism is selectively movable between a first position, a second position, and a third position;

wherein when the rate transfer mechanism is in the first position, substantially none of the weight of the attachment is transferred from the attachment and onto the pair of front wheels;

wherein when the rate transfer mechanism is in the third position, a maximum weight of the attachment is transferred from the attachment and onto the pair of front wheels of the powered vehicle, and wherein when the rate transfer mechanism is in the second position, an intermediate amount of the weight of the attachment is transferred from the attachment and onto the pair of front wheels of the powered vehicle.

14. The powered vehicle according to claim 12, wherein the rate transfer mechanism includes:

a slot defined in a side plate of the hitch assembly, said slot including a first recess, a second recess and a third recess; and an adjustment bolt selectively receivable through the slot; and wherein the adjustment bolt is selectively movable between the first recess, the second recess, and the third recess to select one of the first position, the second position, and the third position of the rate transfer mechanism, respectively.

15. The powered vehicle according to claim 10, further comprising:

a brine tank engaged with the frame between the pair of front wheels and the pair of rear wheels, wherein a width of spray is selected to be delivered from one or more spray nozzles engaged with the brine tank, wherein the width of spray selected is based upon a width of the surface over which the powered vehicle is to travel.

16. The powered vehicle according to claim 15, further comprising:

spray nozzles to deliver the width of the spray selected, wherein the width is based on one of a 36" wide region of the surface and a 48" wide region of the surface.

17. The powered vehicle according to claim 10, further comprising:

a semi-circular mounting connected to the front end of the frame; and a rotatable broom connected to the semi-circular mounting, wherein the rotatable broom is pivotably relative to the frame via the semi-circular mounting.

18. A powered vehicle comprising:

a powered vehicle having differential steering;

a frame having a front end and a rear end;

a pair of front wheels mounted proximate the front end of the frame;

a pair of rear wheels mounted proximate the rear end of the frame;

a weight transfer system provided on the powered vehicle;

a hitch assembly provided as a part of the weight transfer system;

wherein the hitch assembly is located proximate the front end of the frame and is adapted to engage an attachment to the powered vehicle and to position the attachment forwardly of the pair of front wheels, and wherein said engaged attachment has a weight;

wherein the weight transfer system is operable to selectively transfer at least some of the weight from the attachment and in a direction moving rearwardly towards the rear end of the frame;

wherein the at least some of the weight of the attachment is moved onto the pair of front wheels;

wherein the weight transfer system includes a rate transfer mechanism and the rate transfer mechanism includes:

a slot defined in a side plate of the hitch assembly, said slot including a first recess, a second recess and a third recess; and an adjustment bolt selectively receivable through the slot; and wherein the adjustment bolt is selectively movable between the first recess, the second recess, and the third recess to select one of the first position, the second position, and the third position of the rate transfer mechanism, respectively.

19. A skid steer comprising:

a frame;

a ground-contacting translation assembly provided on the frame;

differential steering composed of left and right drive control levers, wherein the left drive control lever controls a portion of the ground-contacting translation assembly on a left side of the skid steer and the right drive control lever controls a portion of the ground-contacting translation assembly on a right side of the skid steer;

a weight transfer system provided on the skid steer;

a hitch assembly provided as a part of the weight transfer system;

wherein the hitch assembly is located proximate a front end of the frame and is adapted to engage an attachment to the skid steer and to position the attachment forwardly of the translation assembly, and wherein said engaged attachment has a weight;

wherein the weight transfer system is operable to selectively transfer at least some of the weight from the attachment and in a direction moving rearwardly towards a rear end of the frame; and wherein the at least some of the weight of the attachment is moved onto the translation assembly.

20. The skid steer according to claim 19, wherein the ground-contacting translation assembly includes a plurality of ground-contacting rotatable elements.

* * * * *